US012563638B2

(12) United States Patent
Adjakple et al.

(10) Patent No.: US 12,563,638 B2
(45) Date of Patent: Feb. 24, 2026

(54) METHOD AND APPARATUSES FOR NR SIDELINK DISCONTINUOUS RECEPTION

(71) Applicant: INTERDIGITAL PATENT HOLDINGS, INC., Wilmington, DE (US)

(72) Inventors: Pascal Adjakple, Great Neck, NY (US); Rocco Di Girolamo, Laval (CA); Jerome Vogedes, Milwaukee, WI (US); Yifan Li, Conshohocken, PA (US); Kyle Pan, Saint James, NY (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 329 days.

(21) Appl. No.: 18/552,720

(22) PCT Filed: Mar. 31, 2022

(86) PCT No.: PCT/US2022/022798
§ 371 (c)(1),
(2) Date: Sep. 27, 2023

(87) PCT Pub. No.: WO2022/212687
PCT Pub. Date: Oct. 6, 2022

(65) Prior Publication Data
US 2024/0172325 A1 May 23, 2024

Related U.S. Application Data

(60) Provisional application No. 63/168,845, filed on Mar. 31, 2021, provisional application No. 63/185,872, filed on May 7, 2021.

(51) Int. Cl.
*H04W 76/28* (2018.01)
*H04W 72/25* (2023.01)

(52) U.S. Cl.
CPC ........... *H04W 76/28* (2018.02); *H04W 72/25* (2023.01)

(58) Field of Classification Search
USPC .... 370/229, 230, 230.1, 236, 252, 311, 328, 370/329, 330, 431
See application file for complete search history.

(56) References Cited

U.S. PATENT DOCUMENTS

2021/0051587 A1    2/2021  Wu et al.
2022/0046746 A1*   2/2022  Yang ................. H04W 72/0446
(Continued)

FOREIGN PATENT DOCUMENTS

WO    2018/064477 A1    4/2018
WO    2020/218892 A1    10/2020
WO    2021/002723 A1    1/2021

OTHER PUBLICATIONS

3rd Generation Partnership Project; Technical Specification Group Radio Access Network; NR; Medium Access Control (MAC) protocol specification (Release 16); 3GPP TS 38.321 V16.3.0; Jan. 2021, pp. 1-156.

(Continued)

*Primary Examiner* — Nguyen H Ngo
(74) *Attorney, Agent, or Firm* — Flaster Greenberg P.C.

(57) ABSTRACT

A first apparatus receives, from a second apparatus via a sidelink (SL) transmission, first configuration parameters for a first SL DRX group and second configuration parameters for a second SL DRX group. The first configuration parameters for the first SL DRX group comprise: a common SL DRX parameter set that is shared with the second configuration parameters for the second SL DRX group, and a first dedicated SL DRX configuration parameter set. The first dedicated DRX parameter set comprises: a first on duration at the beginning of a SL DRX cycle of the first apparatus, and a first duration: after an occasion of a PSCCH carrying (Continued)

a first-stage SL control information (SCI) indicates a new SL transmission for a MAC entity of the first apparatus, or after an occasion of a PSSCH carrying a second-stage SCI indicates a new SL transmission for the MAC entity of the first apparatus. The first apparatus determines that the first apparatus is in a first SL active time for receiving information on the SL based on the first configuration parameters for the first SL DRX group, and in a second SL active time for receiving information on the SL based on the configuration parameter for the second SL DRX group.

20 Claims, 19 Drawing Sheets

(56)                 References Cited

U.S. PATENT DOCUMENTS

2022/0394810 A1*  12/2022  Hong ................... H04W 72/23
2023/0014303 A1*   1/2023  Di Girolamo ........ H04W 72/20
2023/0104340 A1*   4/2023  Park ....................... H04L 69/28
                                                        370/329

OTHER PUBLICATIONS

3rd Generation Partnership Project; Technical Specification Group Radio Access Network; NR; Radio Resource Control (RRC) pro-tocol specification (Release 16); 3GPP TS 38.331 V16.3.1; Jan. 2021, pp. 1-932.

3rd Generation Partnership Project; Technical Specification Group Services and System Aspects; Study on enhancement of 3GPP Support for 5G V2X Services (Release 16); 3GPP TR 22.886 V16.2.0; Dec. 2018, pp. 1-76.

Apple: "Discussion On Remaining Issues on SL DRX Configuration", 3GPP Draft; R2-2100862, 3rd Generation Partnership Project (3GPP), Mobile Competence Centre; 650, Route Des Lucioles ; F-06921 Sophia-Antipolis Cedex ; France vol. RAN WG2, No. Online; Jan. 25, 2020-Feb. 5, 2020, Jan. 15, 2021, pp. 1-4.

Fraunhofer Iis et al., "General Principle of NR SL DRX", 3GPP Draft; R2-2100573, 3rd Generation Partnership Project (3GPP), Mobile Competence Centre ; 650, Route Des Lucioles; F-06921 Sophia-Antipolis Cedex ; France vol. RAN WG2, No. Online; Jan. 25, 2021-Feb. 5, 2021, Jan. 14, 2021, pp. 1-4.

Huawei, "Consideration on the Sidelink DRX for Unicast, Groupcast and Broadcast", 3GPP TSG-RAN WG2 Meeting #112 Electronic, R2-2009413, Nov. 2-13, 2020, pp. 1-8.

Interdigital Inc: "Initial Discussion on SL DRX" 3GPP Draft; R2-2009210, 3rd Generation Partnership Project (3gpp), Mobile Competence Centre; 650, Route Des Lucioles ; F-06921 Sophia-Antipolis Cedex ; France vol. RAN WG2, No. Electronic; Nov. 1, 2020 Oct. 23, 2020 (Oct. 23, 2020), pp. 1-3.

RP-202846, NR Sidelink Enhancement Work Item Description; 3GPP TSG RAN Meeting #96, Budapest, Hungary, Jun. 6-9, 2022, pp. 1-6.

* cited by examiner

Delivers Internet Access
to Vehicle

Vehicle Relays Internet Access to
Occupants & Pedestrains

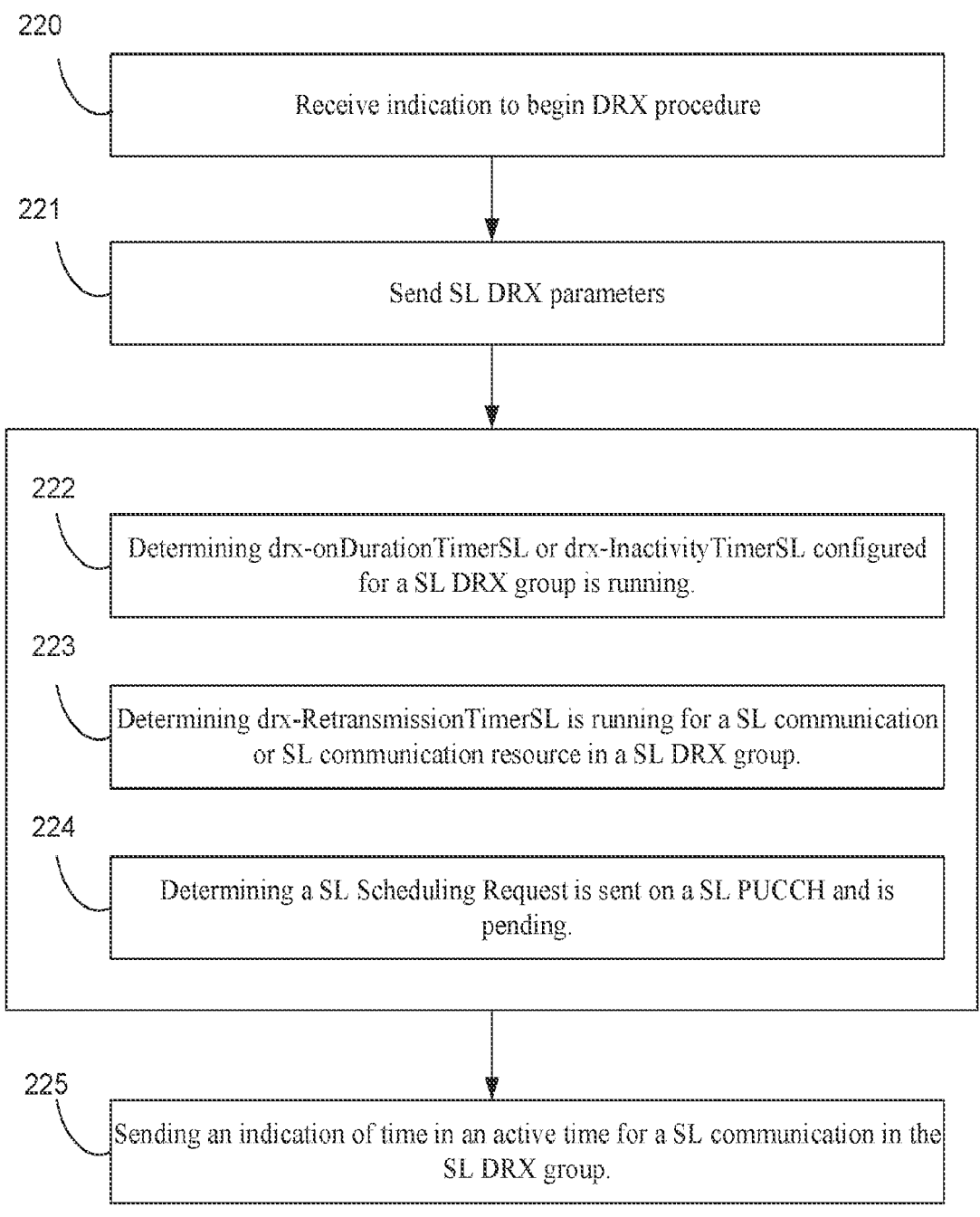

220

Receive indication to begin DRX procedure

221

Send SL DRX parameters

222

Determining drx-onDurationTimerSL or drx-InactivityTimerSL configured for a SL DRX group is running.

223

Determining drx-RetransmissionTimerSL is running for a SL communication or SL communication resource in a SL DRX group.

224

Determining a SL Scheduling Request is sent on a SL PUCCH and is pending.

225

Sending an indication of time in an active time for a SL communication in the SL DRX group.

FIG. 11

230 Receive a first dedicated SL DRX configuration parameter set for the first SL DRX group 231 Receive a second dedicated SL DRX configuration parameter for the second SL DRX group 232 Determine that WTRU should be in a sidelink active time 233 WTRU listens based on being in the active time

METHOD AND APPARATUSES FOR NR SIDELINK DISCONTINUOUS RECEPTION

CROSS-REFERENCE TO RELATED APPLICATIONS

This application is the National Stage Application of International Patent Application No. PCT/US2022/022798, filed Mar. 31, 2022, which claims the benefit of U.S. Provisional Patent Application No. 63/185,872, filed on May 7, 2021, entitled "Methods And Procedures For NR Sidelink Discontinuous Reception," and U.S. Provisional Patent Application No. 63/168,845, filed on Mar. 31, 2021, entitled "Methods And Procedures For Nr Sidelink Discontinuous Reception," the contents of which are hereby incorporated by reference herein.

BACKGROUND

New radio (NR) Sidelink (SL) is envisioned for a number of use cases, such as NR Vehicle-to-Everything (V2X) sidelink, NR Commercial (non-V2X) sidelink, or NR Critical (non-V2X) sidelink.

NR V2X sidelink: In one use case information is to be provided to vulnerable road users, e.g., pedestrian or cyclist, about the presence of moving vehicles in case of dangerous situation.

NR Commercial (non-V2X) sidelink: In one use case (Proximity based applications Augmented Reality/Virtual Reality (AR/VR)), sidelink communications with high throughput and low latency will be required. For example, a head mounted device VR unit may have a sidelink to offload computing to a gateway device.

NR Critical (non-V2X) sidelink: Some critical/emergency situations will require SL communications with little or no cellular coverage, and with first responders using their user equipment (UEs) for extended periods of time to communicate with each other and to send out location information. Power savings for first responders is an important factor.

Some of the use cases from the three categories of NR sidelink use cases above are use cases where the UE operates from the battery power and therefore power saving become a critical feature. Example of such use cases include vehicle-to-pedestrian (V2P) sidelink communication, commercial use cases such a tethering via vehicle, interactive services for AR/VR, gaming, User Virtualization, enhanced eMBB Indoor experience, and public safety use case, such as proximity services or video surveillance dynamic ride sharing, etc.

This background information is provided to reveal information believed by the applicant to be of possible relevance. No admission is necessarily intended, nor should be construed, that any of the preceding information constitutes prior art.

SUMMARY

Disclosed herein are methods, systems, and devices associated with Sidelink discontinuous reception (DRX) mechanisms. Sidelink DRX related procedures may include controlling sidelink DRX (taking into account one or more SL DRX groups), handling sidelink DRX timers, which sidelink RNTI to monitor, or use of sidelink wake-up signal. Sidelink DRX related procedures may include specification of UE behaviors that accounts for sensing impact on sidelink DRX and MAC resource allocation procedure. Sidelink DRX related procedures may include specification of UE behaviors when a TX UE or an RX UE receives SL resource allocation from gNB which is not within the active time of the TX UE or the RX UE. Sidelink DRX related procedures may include rules for a UE or for a UE in coordination with its serving base station, to select among a plurality of assistance information or assistant information sets, the assistance information of assistance information set to use, for deciding which DRX configuration or DRX configuration parameter set to use. Sidelink DRX related procedures may include rules for a UE or for a UE in coordination with its serving base station, to select among a plurality of DRX configuration parameters or parameter sets, a DRX configuration parameter, or DRX configuration parameter set to use.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein.

Figure 10A:
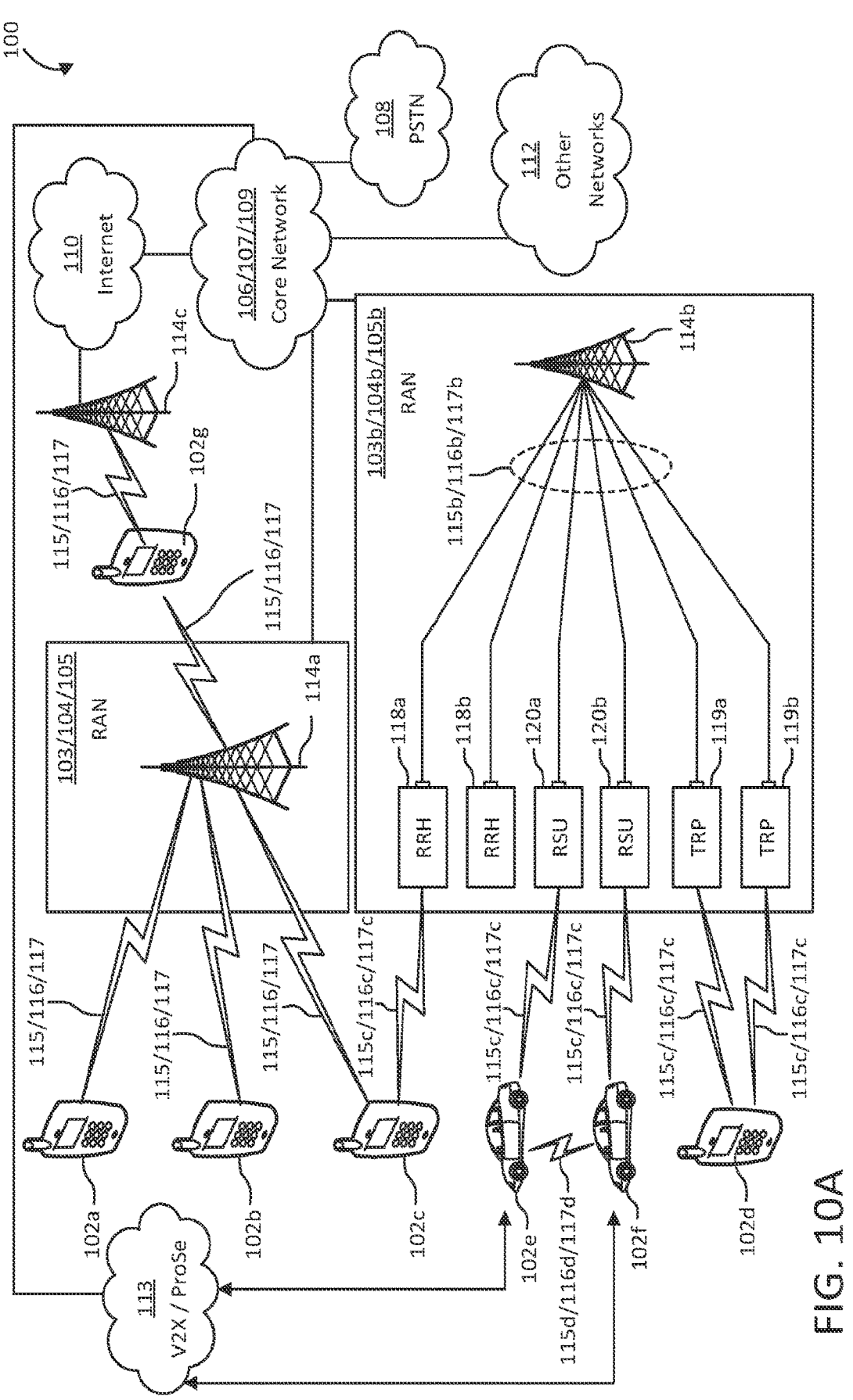
Figure 10B:
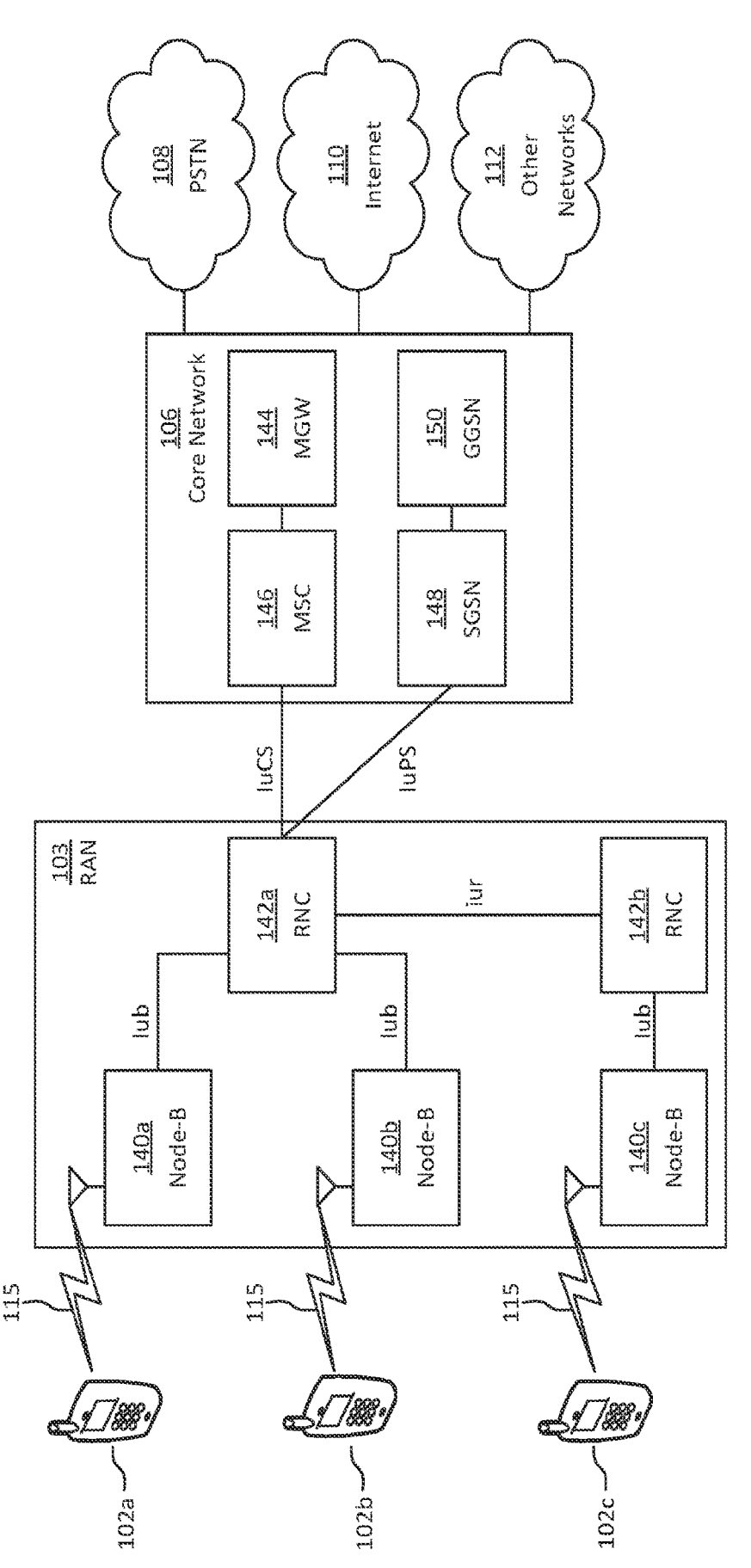
Figure 10C:
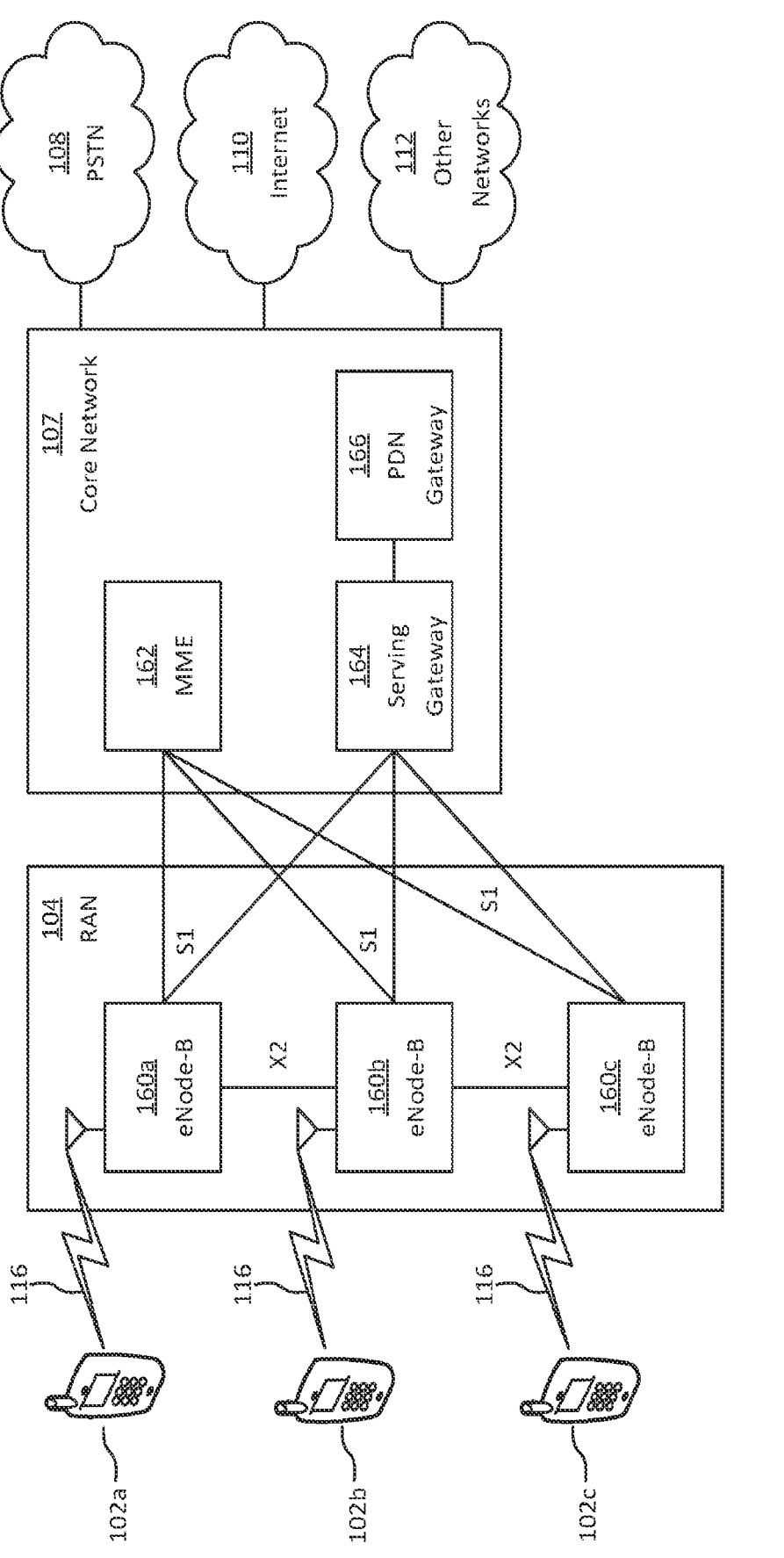
Figure 10D:
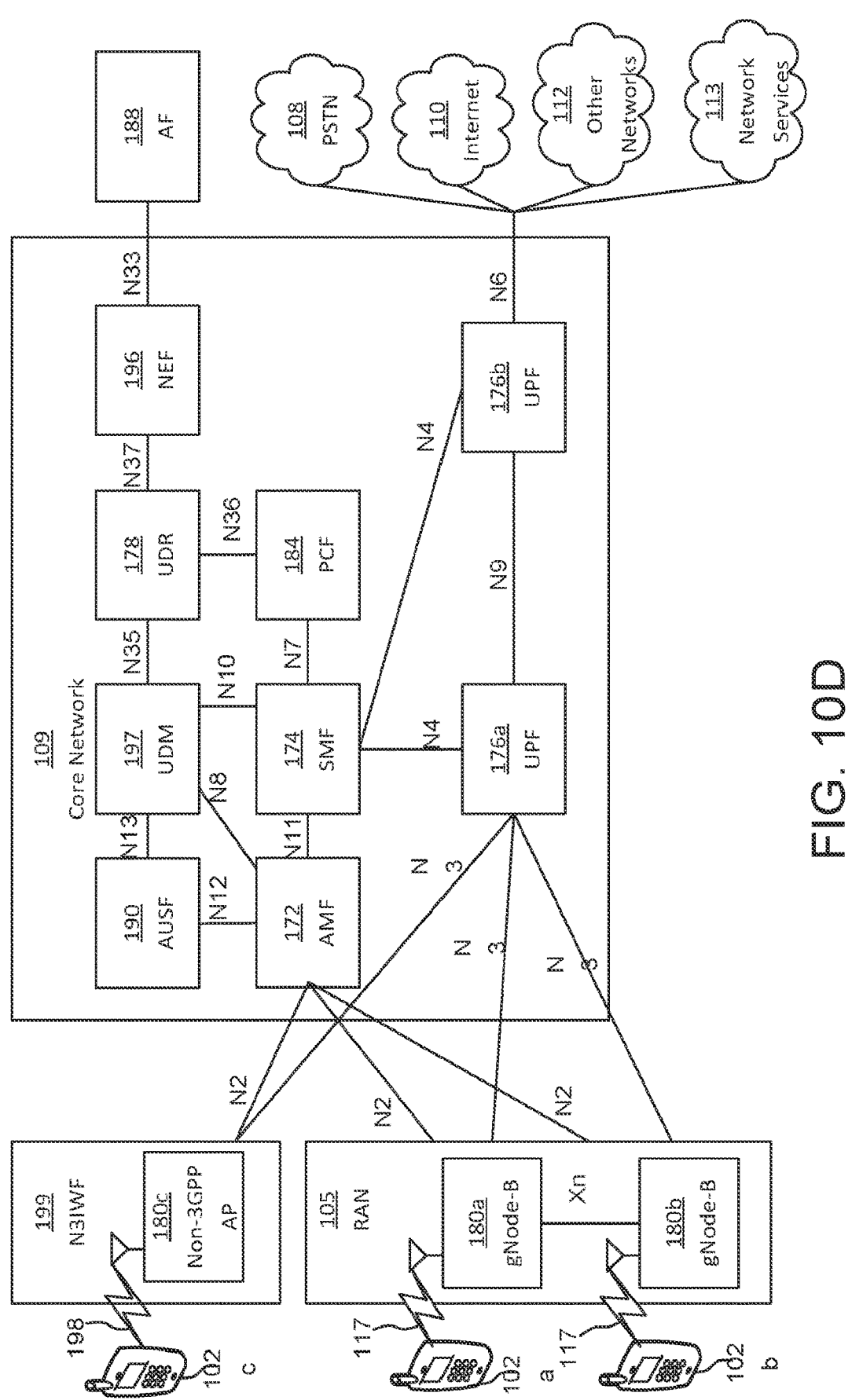
Figure 10E:
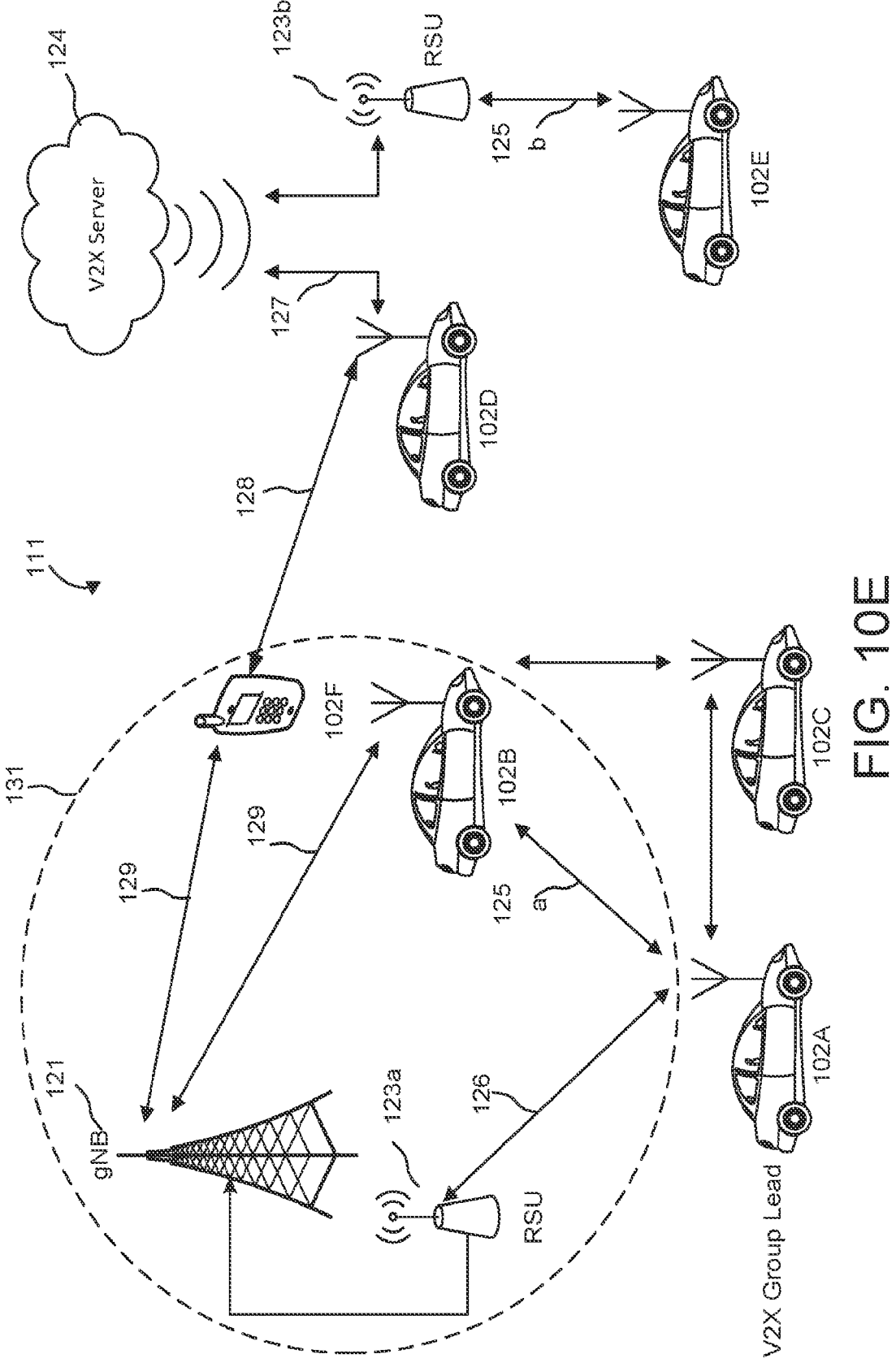
Figure 10F:
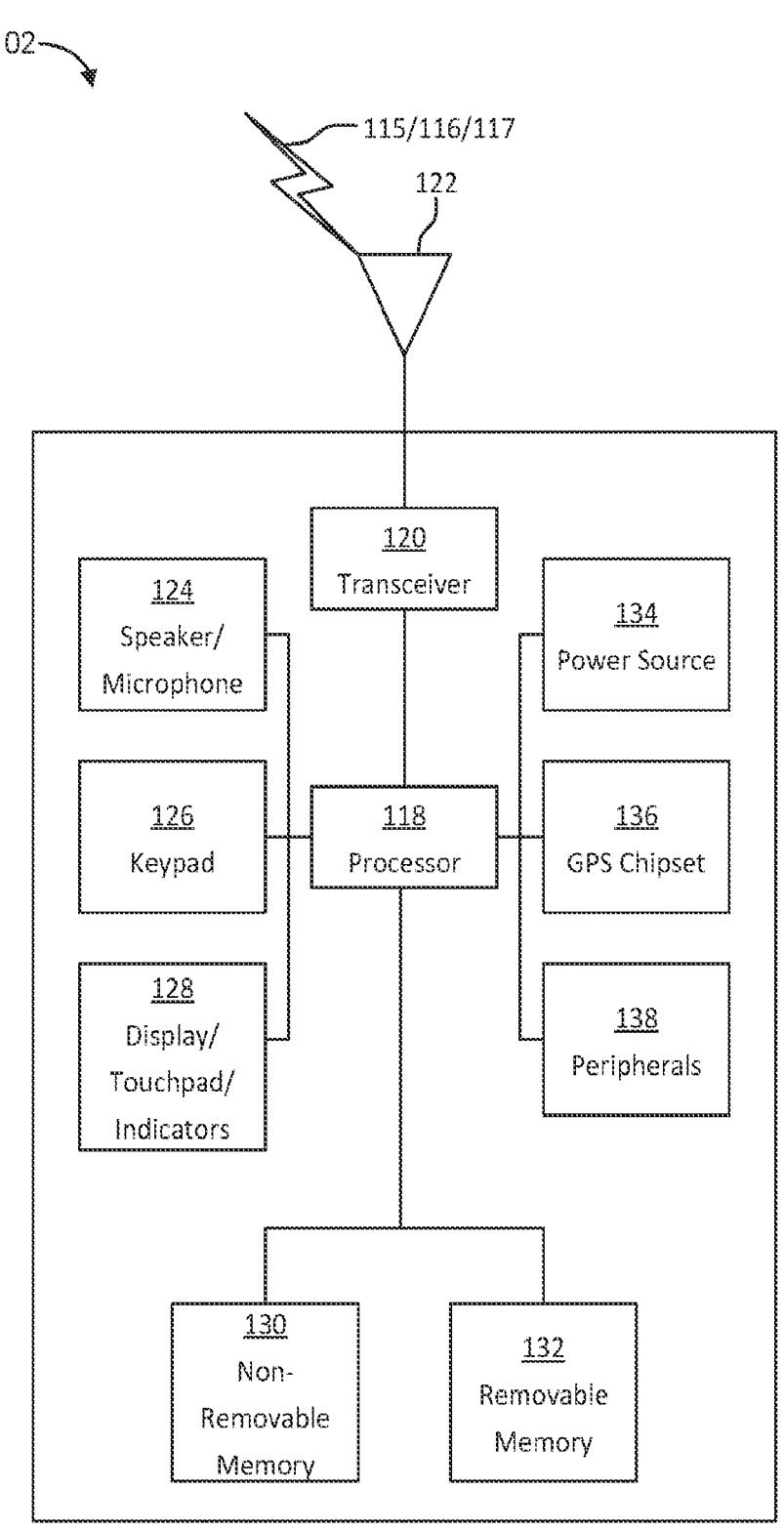
Figure 10G:
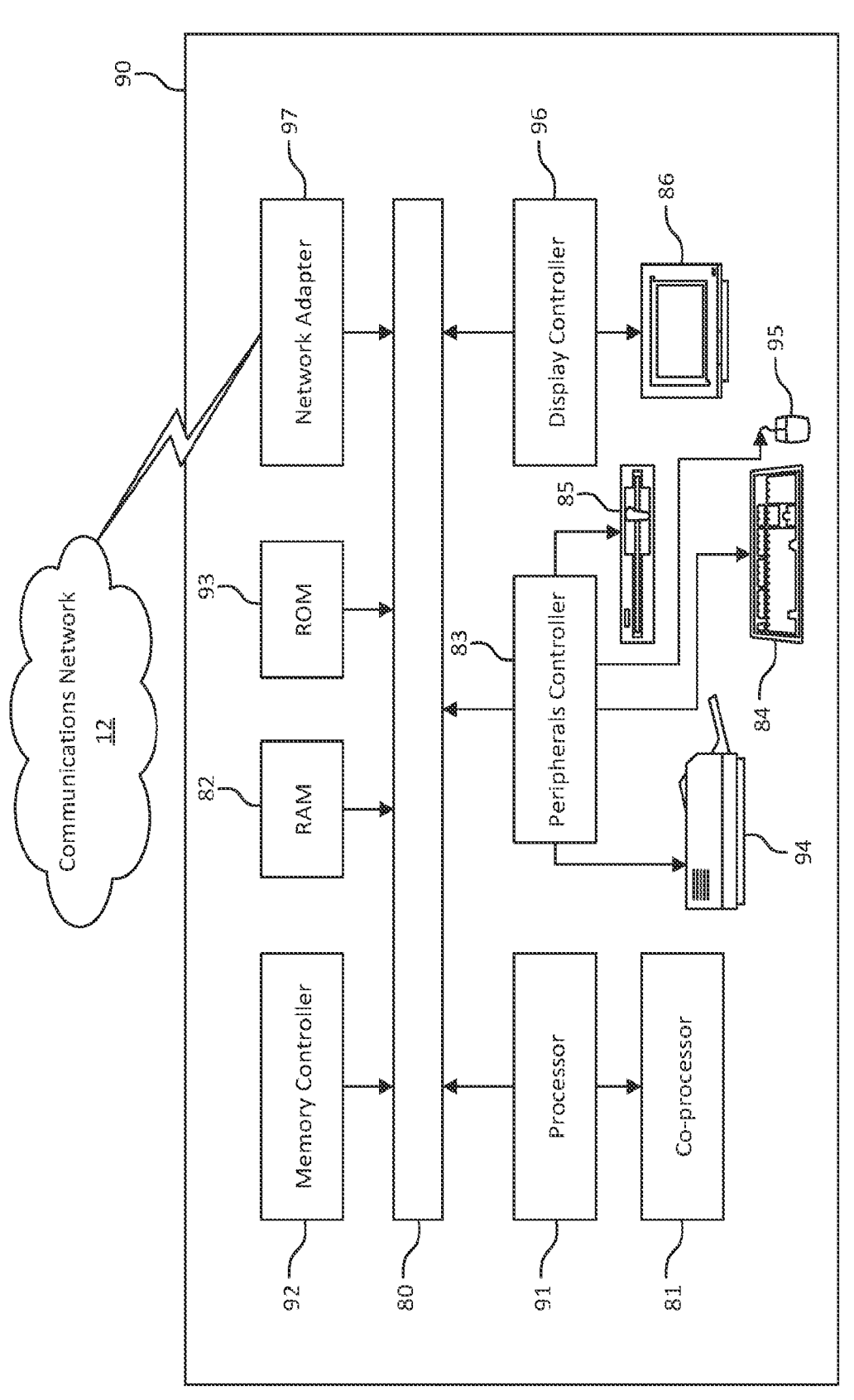

FIG. TOA illustrates an example communications system;

FIG. 10B illustrates an exemplary system that includes RANs and core networks;

FIG. 10C illustrates an exemplary system that includes RANs and core networks;

FIG. 10D illustrates an exemplary system that includes RANs and core networks;

FIG. TOE illustrates another example communications system;

FIG. 10F is a block diagram of an example apparatus or device, such as a WTRU; and FIG. 10G is a block diagram of an exemplary computing system.

FIG. 11 is an exemplary method for NR sidelink DRX.

Figure 12:
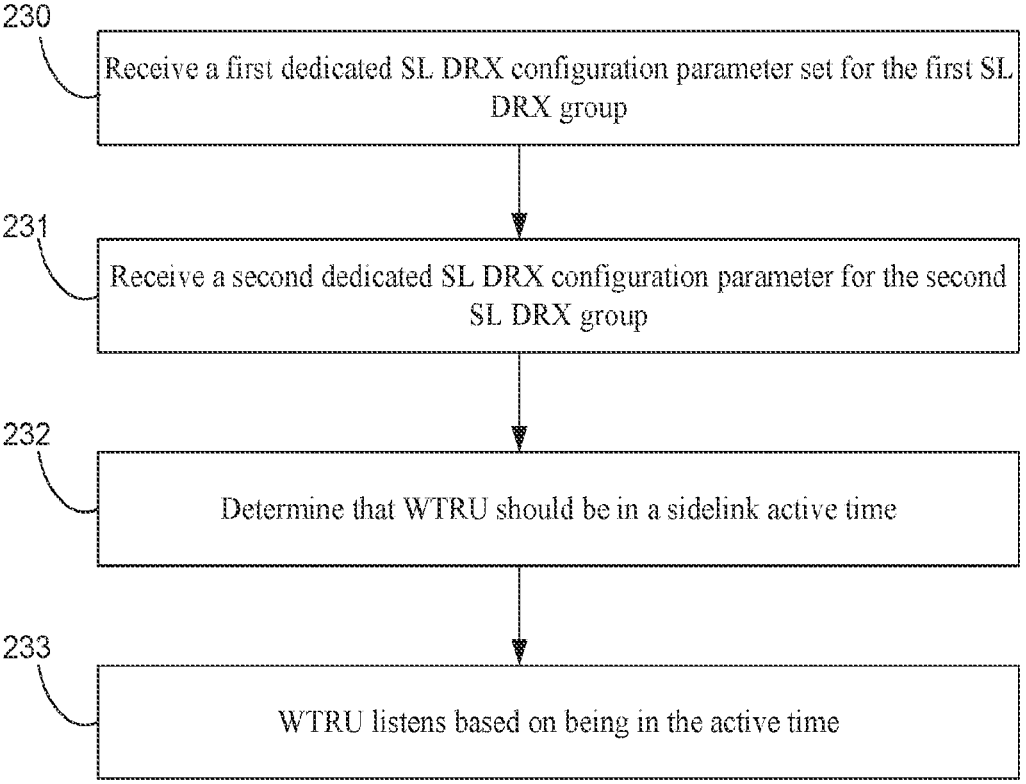

FIG. 12 is an exemplary method for NR sidelink DRX.

DETAILED DESCRIPTION

Figure 1:
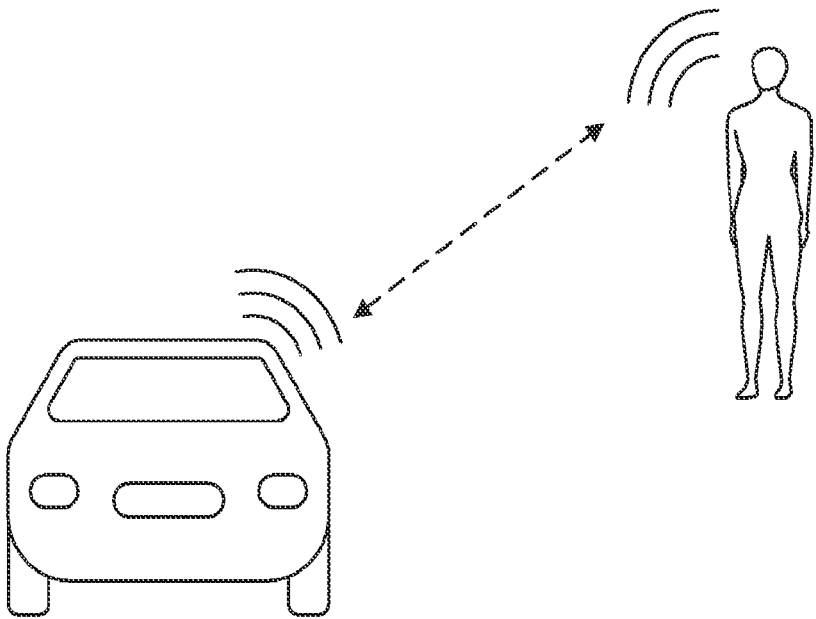
FIG. 1 illustrates an example of dynamic ride sharing.

FIG. 1 illustrates an example of dynamic ride sharing. A UE supporting V2X application dynamic ride sharing shall be able to discover other such UEs in proximity supporting the same application. Such a UE shall be able to establish direct unicast communication with another such UE based on discovery results.

Figure 2:
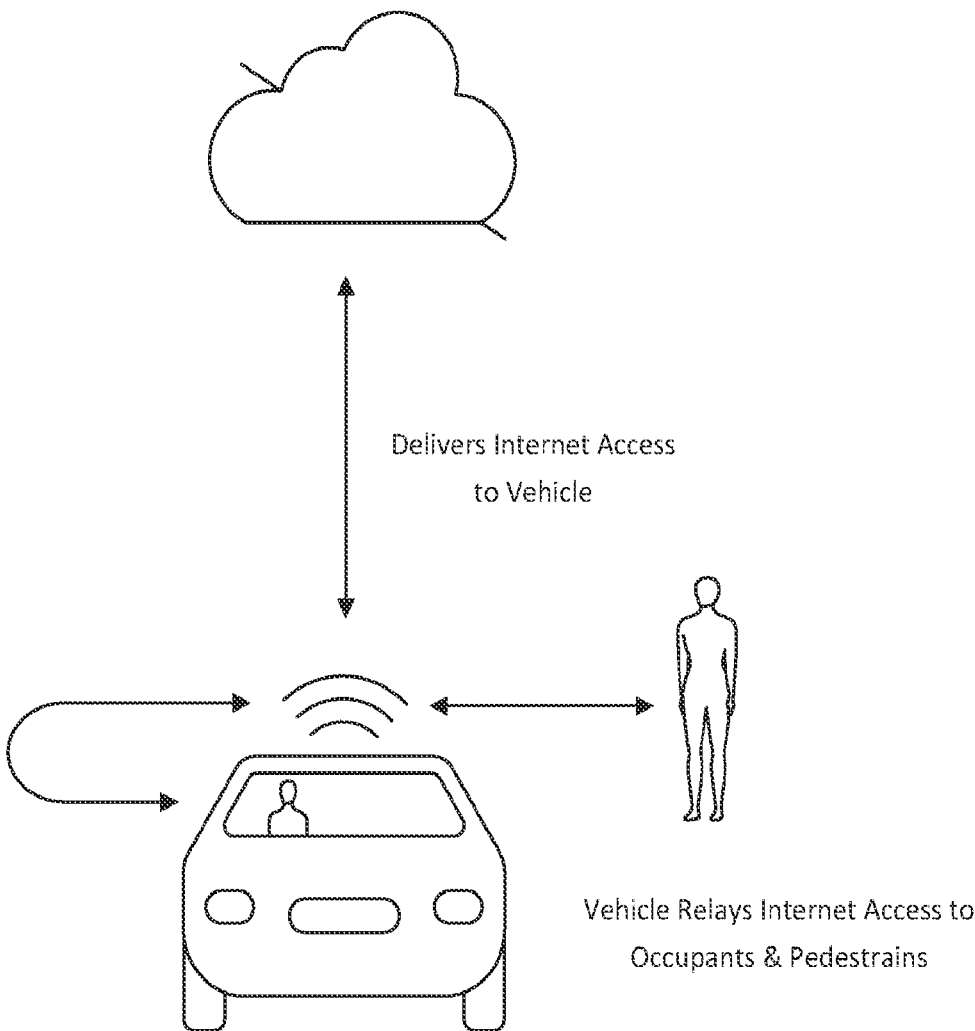
FIG. 2 illustrates an example of tethering via vehicle.

FIG. 2 illustrates an example of tethering via vehicle. A high category device may be used to proxy network connectivity to occupants of the vehicle, or pedestrians surrounding the vehicle. The benefits provided to the handset users are centered on significantly reduced battery consumption but may also include higher throughput. Battery consumption reduction is achieved by lower transmission power at the handset and lower receive sensitivity and increased throughput may be achieved by reduction of network overhead through bundling of multiple individual users under a single context. Even in this case, power consumption for the sidelink component of the communication might still be a challenge. When the UE is engaged in both reception and transmission activities.

Figure 3:
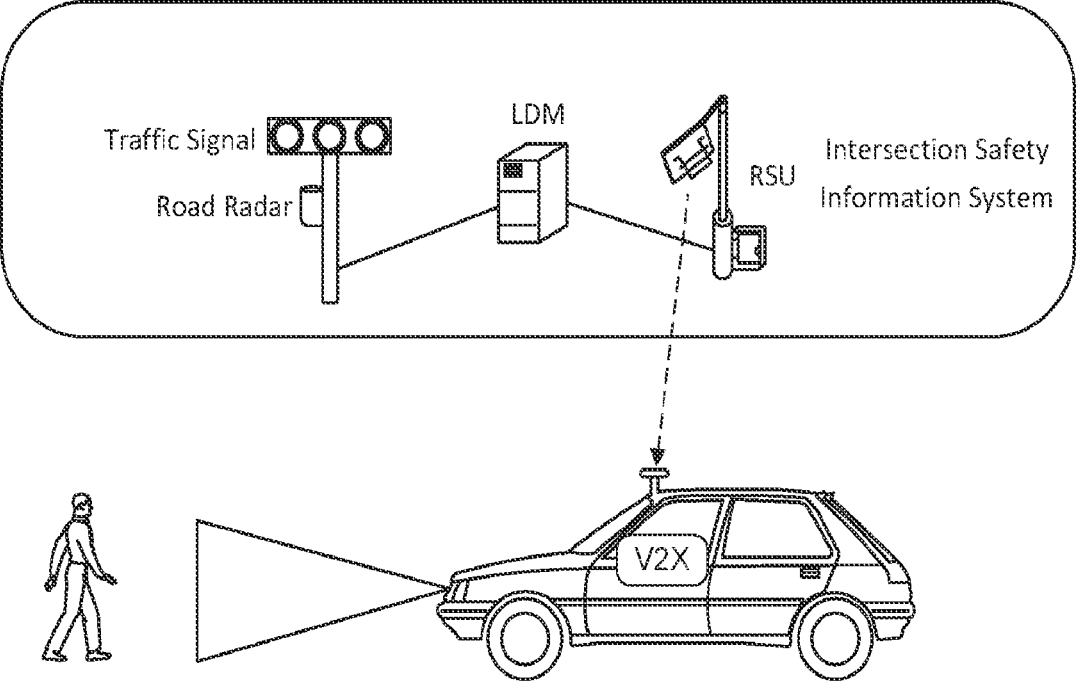
FIG. 3 illustrates an example of vehicle to pedestrian (V2P) communication.

FIG. 3 illustrates an example of vehicle to pedestrian (V2P) communication. The traffic load generated by transmission of pedestrian alert warnings and reception of vehicle alert warnings by the pedestrian device might be challenging from the UE battery life perspective in comparison to the scenario where no sidelink communication is supported.

SL DRX may have configuration parameters or parameter sets. The parameters associated with a SL DRX group may control the SL DRX operation, related to the On duration timer, inactivity timer, retransmission timers, HARQ RTT timers, short and long cycles, etc. As further disclosed herein, there may be an outside DRX Active time. This time is when the UE is not in DRX Active time. It should be noted that herein, the terms groupcast and multicast may be used interchangeably. In order to monitor for possible downlink/uplink data, a UE is allowed to wake up periodically and stay 'awake' (On duration) for a certain amount of time (e.g., a predetermined period) before going to 'sleep' again. Additionally, the UE may be required to wake up occasionally to monitor PDCCH, this is for example to receive a possible re-transmission.

Connected mode NR DRX Operation is discussed below.

Figure 4:
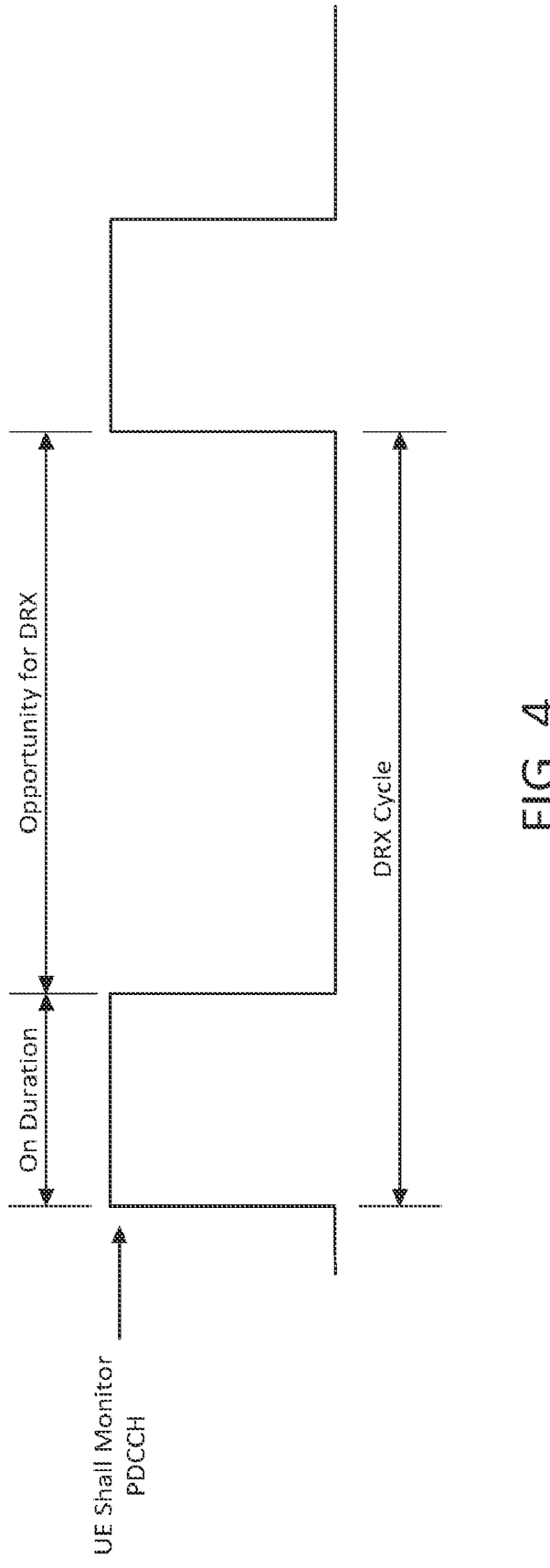
FIG. 4 illustrates an exemplary C-DRX.

The MAC technical specification 38.321 described the connected mode DRX as follows. Connected Mode DRX (C-DRX) controls when the UE may monitor or may not monitor PDCCH, in order to save power. FIG. 4 illustrates an exemplary C-DRX. When DRX is configured, the UE does not have to continuously monitor PDCCH. The MAC entity may be configured by RRC with a DRX functionality that controls the UE's PDCCH monitoring activity for the MAC entity's C-RNTI, CI-RNTI, CS-RNTI, INT-RNTI, SFI-RNTI, SP-CSI-RNTI, TPC-PUCCH-RNTI, TPC-PUSCH-RNTI, TPC-SRS-RNTI, and AI-RNTI. When using DRX operation, the MAC entity shall also monitor PDCCH according to requirements found in other clauses of this specification. When in RRC_CONNECTED, if DRX is configured, for all the activated Serving Cells, the MAC entity may monitor the PDCCH discontinuously using the DRX operation specified in this clause; otherwise, the MAC entity shall monitor the PDCCH as specified in TS 38.213.

RRC controls DRX operation by configuring the following parameters as shown in Table 1.

TABLE 1

| Parameter | Description |
| --- | --- |
| drx-onDuration Timer | the duration at the beginning of a DRX cycle; |
| drx-SlotOffset | the delay before starting the drx-onDurationTimerSL |
| drx-Inactivity Timer | the duration to be inactive after the PDCCH occasion in which a PDCCH indicates a new UL or DL transmission for the MAC entity |
| drx-Retransmission TimerDL | the maximum duration until a DL retransmission is received; (per DL HARQ process except for the broadcast process) |
| drx-RetransmissionTimerUL | the maximum duration until a grant for UL retransmission is received; (per UL HARQ process) |
| drx-LongCycleStartOffset | the Long DRX cycle and drx-StartOffset which defines the subframe where the Long and Short DRX cycle starts |
| drx-ShortCycle | the Short DRX cycle |
| drx-ShortCycleTimer | the duration the UE shall follow the Short DRX cycle |
| drx-HARQ-RTT-TimerDL | the minimum duration before a DL assignment for HARQ retransmission is expected by the MAC entity; (per DL HARQ process except for the broadcast process) |
| drx-HARQ-RTT-TimerUL | the minimum duration before a UL HARQ retransmission grant is expected by the MAC entity; (per UL HARQ process) |
| ps-Wakeup | the configuration to start associated drx-onDurationTimer in case DCP is monitored but not detected |
| TransmitOtherPeriodicCSI | the configuration to report periodic CSI that is not L1-RSRP on PUCCH during the time duration indicated by drx-onDurationTimer in case DCP is configured but associated drx-onDurationTimer is not started |
| 1-RSRP | the configuration to transmit periodic CSI that is L1-RSRP on PUCCH during the time duration indicated by drx-onDurationTimer in case DCP is configured but associated drx-onDurationTimer is not started |

Serving Cells of a MAC entity may be configured by RRC in two DRX groups with separate DRX parameters. When RRC does not configure a secondary DRX group, there is only one DRX group and all Serving Cells belong to that one DRX group. When two DRX groups are configured, each Serving Cell is uniquely assigned to either of the two groups. The DRX parameters that are separately configured for each DRX group are: drx-onDurationTimer, drx-InactivityTimer. The DRX parameters that are common to the DRX groups are: drx-SlotOffset, drx-RetransmissionTimerDL, drx-RetransmissionTimerUL, drx-LongCycleStartOffset, drx-ShortCycle, drx-ShortCycleTimer, drx-HARQ-RTT-TimerDL, and drx-HARQ-RTT-TimerUL.

When a DRX cycle is configured, the Active Time for Serving Cells in a DRX group includes the time while: 1) drx-onDurationTimer or drx-InactivityTimer configured for the DRX group is running; 2) drx-RetransmissionTimerDL or drx-RetransmissionTimerUL is running on any Serving Cell in the DRX group; 3) ra-ContentionResolutionTimer (as described in clause 5.1.5) or msgB-ResponseWindow (as described in clause 5.1.4a) is running; 4) a Scheduling Request is sent on PUCCH and is pending (as described in clause 5.4.4); or 5) a PDCCH indicating a new transmission addressed to the C-RNTI of the MAC entity has not been received after successful reception of a Random Access Response for the Random Access Preamble not selected by the MAC entity among the contention-based Random Access Preamble (as described in clauses 5.1.4 and 5.1.4a).

DRX may be configured with a short cycle and a long cycle. The UE uses the short cycle for a maximum amount of occurrences, after which the long cycle is used.

Connected mode DRX is a capability of a UE (it is signaled to the network), and it is configured by the network. Once configured through RRC signaling, DRX is active for the UE.

The Network can cut short an Active time, by sending a "DRX Command" MAC control element or a "Long DRX Command" MAC control element. This will trigger the UE to fall back into sleep mode. The DRX Command MAC control element triggers the UE to start a short DRX cycle (if one is configured) or start a long DRX cycle otherwise. The long DRX Command MAC control element triggers the UE to start a long DRX cycle.

Resource Allocation Overview is discussed below.

Transmission resources may be allocated to the UE by the gNB (for e.g., NR mode 1 resource allocation) or may be autonomously selected by the UE (for e.g., NR mode 2 resource allocation). Autonomous resource selection by the UE may be performed randomly or may be based on sensing. From hereinafter, UE autonomous resource selection will be denoted sensing-based resource selection and will be interchangeably denoted mode 2 resource allocation or mode 2 sensing-based resource allocation.

Figure 5A:
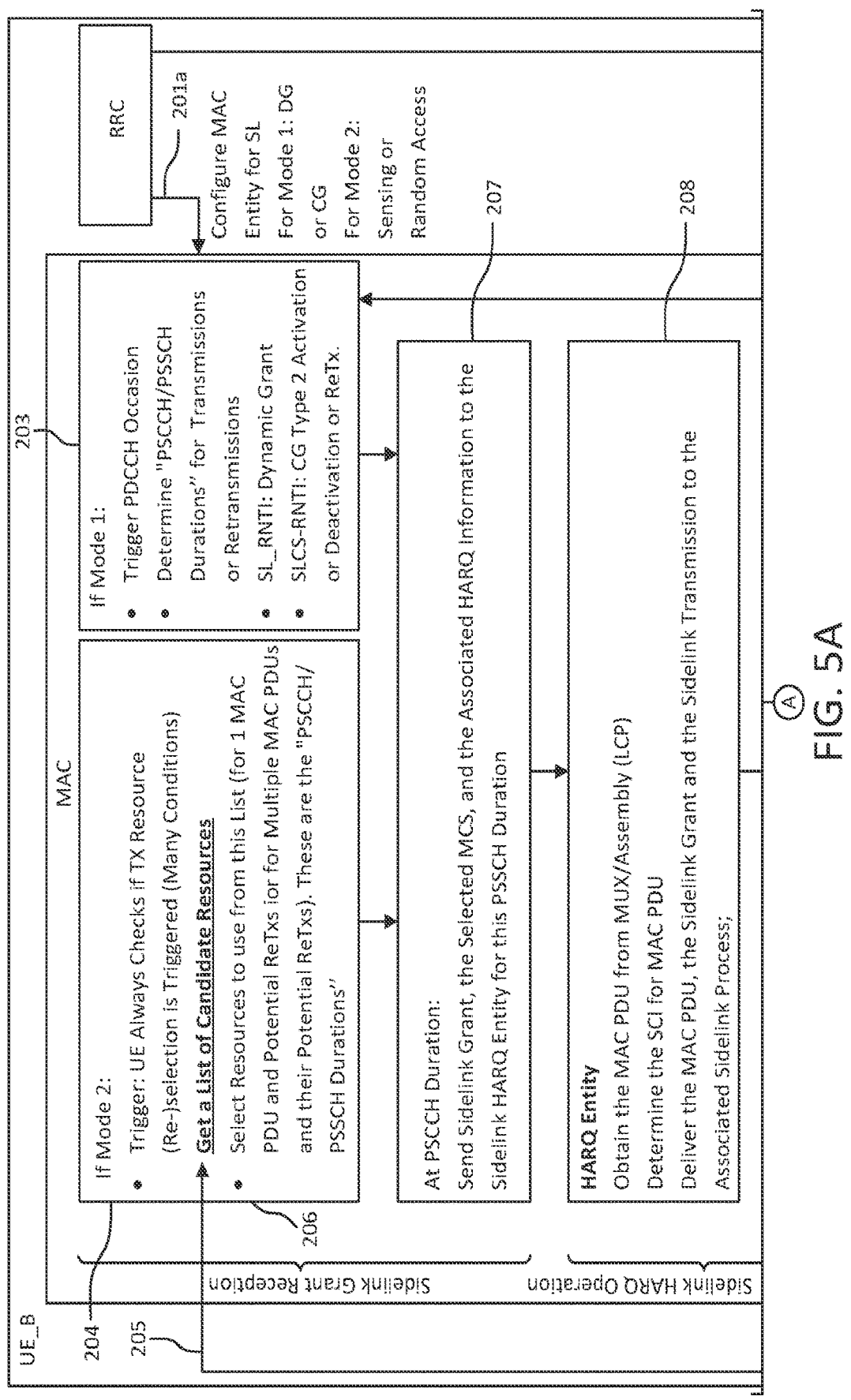
FIG. 5 illustrates an exemplary sidelink resource allocation overview.
Figure 5B:
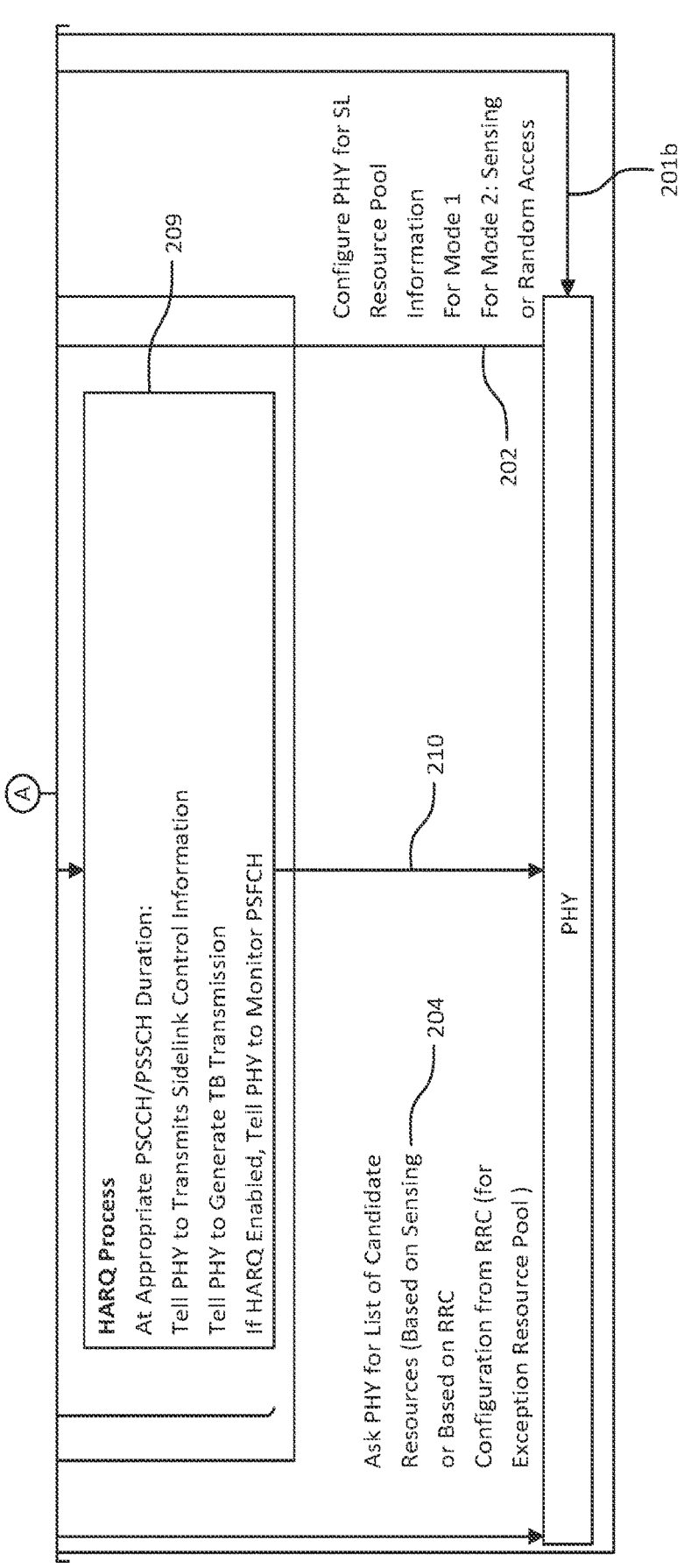

The basic process for resource allocation is shown in FIG. 5 and described below:

Step 201a: The RRC configures the MAC entity for sidelink operation. This includes if the MAC entity is to use resource allocation mode 1 (either dynamic grants or configured grants) or resource allocation mode 2 (either sensing based on random access based). The random access based is targeting exception resource pools.

Step 201b: The RRC configures the PHY entity for sidelink operation. This includes the TX resource pool configuration, as well as mode 1 configuration, and mode 2 configuration. For the latter, the RRC may include the sensing configuration.

Step 202: The PHY informs the MAC layer when it receives DCI in the PDCCH occasion. The Sidelink Grant Reception determines the sidelink grant for UE_B. At the MAC layer, the transmission opportunities for these sidelink grants are referred to as PSCCH/PSSCH durations.

If configured for mode 1 Operation then Step 203.

Step 203: The Sidelink Grant Reception determines if the PDCCH occasion has a sidelink grant. This is determined if the DCI is destined for SL-RNTI or SLCS-RNTI. The former is used for dynamic grants, while the latter is used for configured grant Type 2—namely activation, deactivation, or to schedule a retransmission for a Configured grant transmission If configured for mode 2 Operation, step 204-step 206.

Step 204: In mode 2, the transmitting UE needs to continually evaluate which PSCCH/PSSCH durations may be used for a single MAC PDU transmission, for multiple MAC PDU transmissions, and the potential retransmissions of these MAC PDUs. To accomplish this, the Sidelink Grant Reception continually evaluates if TX resource (re)selection is necessary. Many triggers can tell the MAC layer that it needs to find new PSCCH/PSSCH durations. For example, there is a reconfiguration of the Tx resource pools, there is new traffic that has no opportunity to be transmitted on sidelink, the PSCCH/PSSCH durations have not been used for an extended period of time, etc.

Step 205: In order to assist the Sidelink Grant Reception, the MAC layer asks the PHY layer to provide a set of potential resources. These are provided by the PHY layer (e.g., based on sensing or based on the configured exception resource pool). This is referred to as the Candidate Resource set.

Step 206: The Sidelink Grant Reception randomly selects from this provided set of potential resources—in order to satisfy the transmission of one MAC PDU, multiple MAC PDUs, and the potential retransmissions of these MAC PDUs. The selected set denote the PSCCH/PSSCH durations for transmission.

Step 207: At the PSCCH/PSSCH duration, the Sidelink Grant Reception selects the MCS for the sidelink grant, and then sends the sidelink grant, the selected MCS, and the associated HARQ information to the Sidelink HARQ Entity for this PSSCH duration.

Step 208: The Sidelink HARQ entity obtains the MAC PDU from Multiplexing and Assembly process. This is where Logical Channel Prioritization (LCP) occurs. The Sidelink HARQ entity, also determines the sidelink control information for MAC PDU, and then delivers the MAC PDU, the sidelink grant and the Sidelink transmission information to the associated Sidelink process Step 209-Step 210: The Sidelink Process, at appropriate PSCCH/PSSCH duration, tells the PHY to transmit SCI, then tells the PHY to generate a transport block transmission. If HARQ is enabled, Sidelink Process also tells PHY to monitor PSFCH.

Sensing and resource allocation is discussed below.

Resource pools are (pre-)configured to a UE separately from the transmission perspective (TX pools) and the reception perspective (RX pools). This allows a UE to monitor for PSCCH, and hence receive PSSCH transmissions, in resource pools other than those in which it transmits, so that it can attempt to receive transmissions made by other UEs in those RX pools. PSCCH and PSSCH resources are defined within resource pools for the respective channels. This concept is used because in general PSCCH/PSSCH cannot be transmitted (and thus are not expected to be received) in all RBs and slots in the NR system bandwidth, nor within the frequency span configured for V2X sidelink. The notion of a resource pool also reflects, in resource allocation mode 2, that a UE will make its resource selections based on sensing within the pool.

In NR, a resource pool is divided into sub-channels in the frequency domain, which are consecutively non-overlapping sets of ≥10 PRBs in a slot, the size depending on (pre-)configuration. Resource allocation, sensing, and resource selection are performed in units of a sub-channel. The UE's PSCCH occupies a (pre-)configurable number of PRBs within one sub-channel, starting from the lowest PRB of the PSSCH it schedules.

The UE autonomous resource selection basic structure is a of a UE sensing within a (pre-)configured resource pool, which resources are not in use by other UEs with higher priority traffic and choosing an appropriate amount of such resources for its own transmissions. Having selected such resources, the UE can transmit and re-transmit in them a certain number of times, or until a cause of resource reselection is triggered.

The mode 2 sensing procedure can select and then reserve resources for a variety of purposes reflecting that NR V2X introduces sidelink HARQ in support of unicast and groupcast in the physical layer. It may reserve resources to be used for a number of blind (re-)transmissions or HARQ-feedback-based (re-)transmissions of a transport block, in which case the resources are indicated in the SCI(s) scheduling the transport block. Alternatively, it may select resources to be used for the initial transmission of a later transport block, in which case the resources are indicated in an SCI scheduling a current transport block, in a manner similar to the LTE-V2X scheme (clause 5.2.2.2). Finally, an initial transmission of a transport block can be performed after sensing and resource selection, but without a reservation.

The first-stage SCIs transmitted by UEs on PSCCH indicate the time-frequency resources in which the UE will transmit a PSSCH. These SCI transmissions are used by sensing UEs to maintain a record of which resources have been reserved by other UEs in the recent past. It should be noted that sidelink control information (SCI) in NR V2X is transmitted in two stages. The first-stage SCI is carried on PSCCH and may include information to enable sensing operations, as well as information about the resource allocation of the PSSCH. PSSCH transmits the second-stage SCI and the SL-SCH transport channel. The second-stage SCI carries information needed to identify and decode the associated SL-SCH, as well as control for HARQ procedures, and triggers for CSI feedback, etc. SL-SCH carries the TB of data for transmission over SL.

When a resource selection is triggered (e.g., by traffic arrival or a re-selection trigger), the UE considers a sensing window which starts a (pre-)configured time in the past and finishes shortly before the trigger time. The window can be 1100 ms or 100 ms wide, with the intention that the 100 ms option is particularly useful for aperiodic traffic, and 1100 ms particularly for periodic traffic. A sensing UE also measures the SL-RSRP in the slots of the sensing window, which implies the level of interference which would be caused and experienced if the sensing UE were to transmit in them. In NR-V2X, SL-RSRP is a (pre-)configurable measurement of PSSCH-RSRP or PSCCH-RSRP.

The sensing UE then selects resources for its (re-)transmission(s) from within a resource selection window. The window starts shortly after the trigger for (re-)selection of resources, and cannot be longer than the remaining latency budget of the packet due to be transmitted. Reserved resources in the selection window with SL-RSRP above a threshold are excluded from being candidates by the sensing UE, with the threshold set according to the priorities of the traffic of the sensing and transmitting UEs. Thus, a higher priority transmission from a sensing UE can occupy resources which are reserved by a transmitting UE with sufficiently low SL-RSRP and sufficiently lower-priority traffic.

If the set of resources in the selection window which have not been excluded is less than a certain proportion of the available resources within the window, the SL-RSRP exclusion threshold set according to the priorities (PPPP) of the traffic of the sensing and transmitting UE, is relaxed in 3 dB steps. The proportion is set by (pre-)configuration to 20%, 35%, or 50% for each traffic priority. The UE selects an appropriate amount of resources randomly from this non-excluded set. The resources selected are not in general periodic. Up to three resources can be indicated in each SCI transmission, which can each be independently located in time and frequency. When the indicated resources are for semi-persistent transmission of another transport block, the range of supported periodicities is expanded compared to LTE-V2X, in order to cover the broader set of envisioned use cases in NR-V2X.

Shortly before transmitting in a reserved resource, a sensing UE re-evaluates the set of resources from which it can select, to check whether its intended transmission is still suitable, taking account of late-arriving SCIs due, typically, to an aperiodic higher-priority service starting to transmit after the end of the original sensing window. If the reserved resources would not be part of the set for selection at this time (T3), then new resources are selected from the updated resource selection window. The cut-off time T3 is long enough before transmission to allow the UE to perform the calculations relating to resource re-selection.

Figure 6:
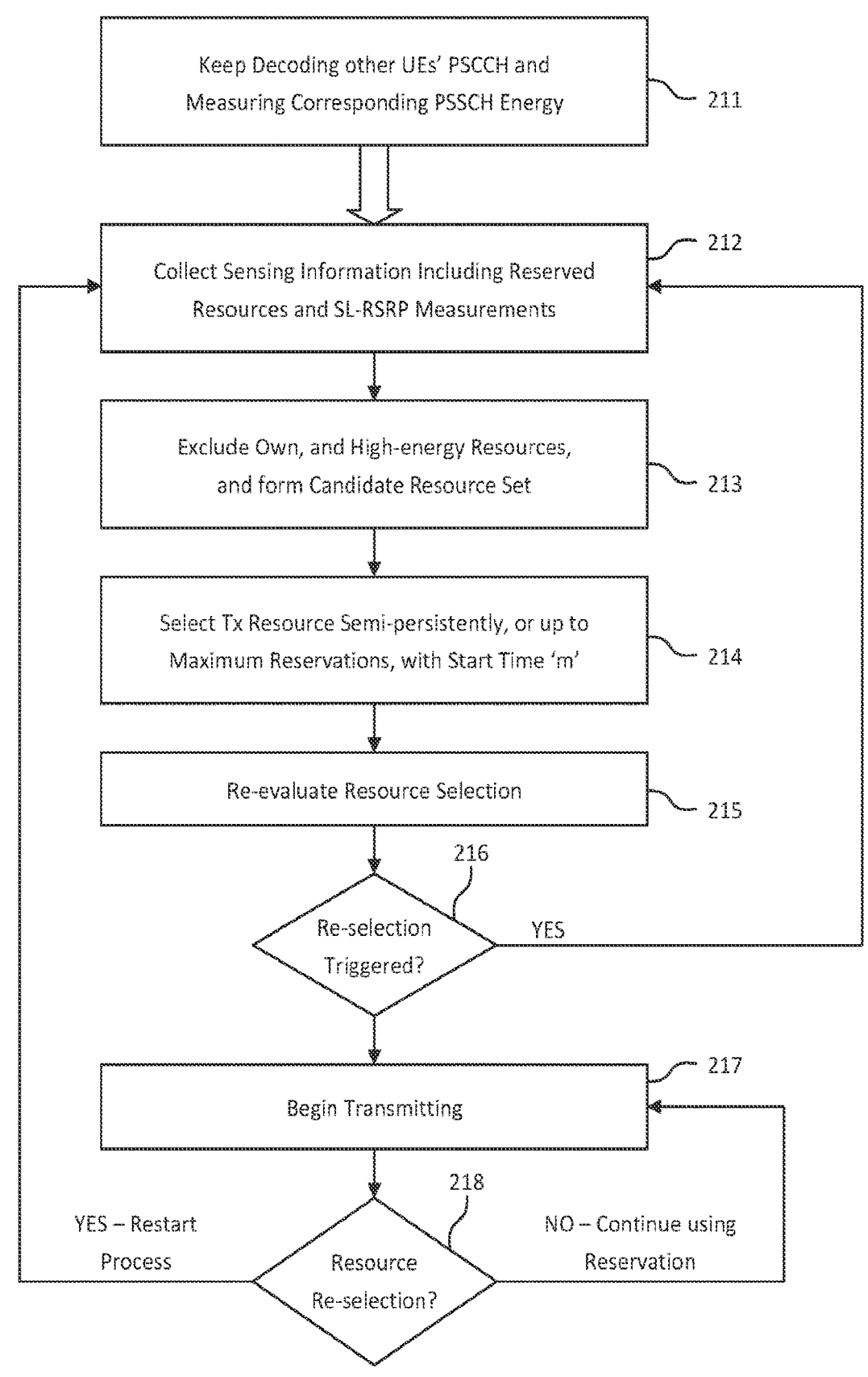
FIG. 6 illustrates an exemplary summary of sensing and resource (re-)selection procedures.
Figure 7:
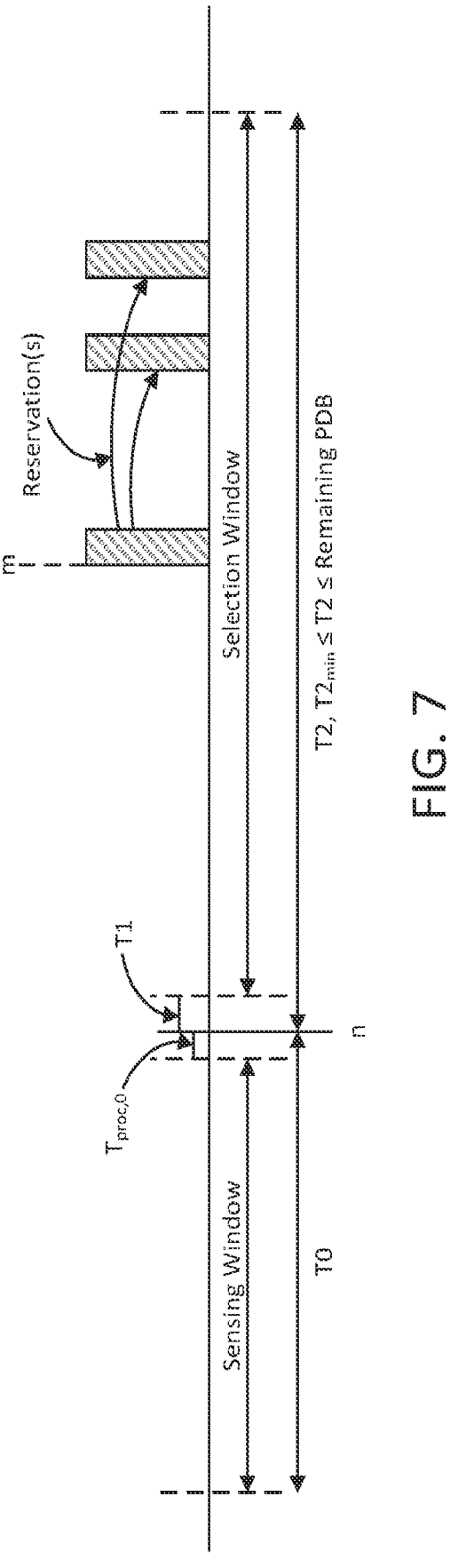
FIG. 7 illustrates an exemplary Timeline of sensing and resource (re-)selection procedure triggered at time n, without re-evaluation before (m-T3). Its first reserved resource is at time m.

The timeline of the sensing and resource (re-)selection windows with respect to the time of trigger n, are shown in FIG. 6, and the effect of the possibility of re-evaluation before first use of the reservation in FIG. 7. With reference to FIG. 6, at step 211, keep decoding other UEs' PSCCH and measuring corresponding PSSCH energy. At step 212, collect sensing information including reserved resources and SL-RSRP measurements. At step 213, exclude own, and high-energy resources, and form candidate resource set. At step 214, select Tx resource semi-persistently, or up to maximum reservations, with start time 'm'. At step 215, re-evaluate resource selection. At step 216, proceed to step 217 to begin transmitting, if no re-selection triggered. At step 217, proceed to step 217 if no resource selection, otherwise proceed to step 212.

There are a number of triggers for resource re-selection. They are designed to support high mobility and ensure that a UE cannot assume occupation of a resource for an excessive period, nor when the selected resource is insufficient or excessive for what is needed by the UE's traffic, amongst other causes. In addition, there is the possibility to configure a resource pool with a pre-emption function designed to help accommodate aperiodic sidelink traffic, so that a UE reselects all the resources it has already reserved in a particular slot if another nearby UE with higher priority indicates it will transmit in any of them, implying a high-priority aperiodic traffic arrival at the other UE, and the SL-RSRP is above the exclusion threshold. The application of pre-emption can apply between all priorities of data traffic, or only when the priority of the pre-empting traffic is higher than a threshold and higher than that of the pre-empted traffic. A UE does not need to consider the possibility of pre-emption later than time T3 before the particular slot including the reserved resources.

Sidelink Congestion Control—In LTE—is discussed below.

For LTE, each sidelink packet is associated with a PPPP and PPPR passed down ultimately to the physical layer from upper layers, which determine the values based on the QoS requirements of the message. PPPR allows management of reliability with sidelink PDCP duplication, where a PDCP PDU is duplicated into two instances and transmitted on two different sidelink carriers. The PPPP of a packet is indicated dynamically in the SCI which schedules the PSSCH for the packet. A physical measurement of CBR is also defined in each subframe TS 36.214 [12, clause 5.1.30], which measures the portion of the resource in a resource pool which has a high received signal energy (S-RSSI) in the most recent 100 subframes. CBR is a measurement of the congestion present recently in the resource pool. Another measurement, CR defined in TS 36.214 [12, clause 5.1.31], counts the total number of subchannels a UE has and will transmit in during a window of up to 1000 ms including the current subframe. CR is thus a measurement of how much resource a UE has recently, and will soon, claim.

A UE can be (pre-)configured with a set of CBR ranges to each of which is linked a CR-limit. When a UE finds its CR exceeds the CR-limit for the CBR range it currently measures, it must reduce its CR to not exceed the limit. How this is done is up to UE implementation, and can include increasing MCS to reduce resource occupation, dropping (re-)transmissions, etc. PPPP can also be (pre-)configured with a mapping to the UE's maximum permitted transmit power, the limitation on which acts to reduce the CBR measured by sufficiently distant UEs.

PPPP is used during autonomous resource allocation to aid distributed sidelink congestion control based on the relative priorities of traffic from UEs that consider occupying a given resource. PPPP and CBR can each also be (pre-)configured with mappings to ranges of values of transmission parameters, e.g., a range of MCS values, and/or a range of numbers of subchannels, etc. In this case, the UE has to choose its transmission parameters from within the range corresponding to the prevailing PPPP or CBR.

Sidelink Congestion Control—In NR—is discussed below.

Congestion control for NR-V2X is similar to that of LTE-V2X, and it likewise is used in resource allocation mode 2 in NR. The main differences are that each packet is associated with a single 'priority' value, passed down to the physical layer from upper layers, which is comparable to PPPP in LTE-V2X. The priority value is transmitted in the first-stage SCI associated with each transport block. Broadly equivalent measurements of CBR and CR, together with CR-limits are defined, which can be used similarly to constrain the ranges of transmission parameters. NR V2X sets a shorter time of 1 ms or 2 ms in which the UE must calculate the CR and CBR than LTE-V2X's 4 ms, with the aim of adapting to faster fluctuations in congestion due to aperiodic traffic.

Issues

Issue 1 is associated with Sidelink DRX Procedures and handling of SL DRX timers for both TX UE and RX UE. What are the UE behaviors for sidelink DRX, and specifically the handling sidelink DRX timers, for example start, stop, reset or expiry of DRX timers? What are the triggers for the start, stop, reset of these timers?

Issue 2 is associated with SL sensing impact to SL DRX and MAC resource allocation procedure. Sidelink DRX is not specified for LTE with the understanding that LTE P-UE might not support sidelink reception, so that it is only broadcasting packets relating to its own location and direction. This type of P-UE is allowed to select transmission resources randomly, with no sensing procedure. However, for LTE P-UE which does support sidelink reception, it can be (pre-)configured to perform partial sensing, where in only a subset of the subframes in the typically 1000 ms sensing window have to be monitored, but even in this case, sidelink DRX was not specified either. In NR, the assumption that the UE might not support sidelink reception does not appear realistic and will only apply to a very limited number of use cases. Considering the diverse sidelink use cases being considered for NR release 17 onward, a support for DRX to mitigate UE power consumption, ensuring that a potential UE battery drain and resulting shortage of UE battery life, becomes critical to ensure that NR sidelink communication is a feature that is widely deployed. Full sensing aka sensing or partial sensing is expected to continuously run in the background, such that resource (re)selection anytime this is triggered can be performed while meeting packet delay budget. Sensing is expected to affect DRX procedure, and similarly DRX is expected to impact sensing-based resource selection. This disclosure focuses on the interactions between DRX and sensing base resource (re)selection and the resulting impact on MAC procedures and the supporting RRC configurations. Specifically, the following aspects are considered in this disclosure: 1) UE's own Sensing & resource selection impact to UE's own SL DRX procedure; 2) UE's own SL DRX procedure to UE's own sensing and resource selection; 3) UE's own sensing & resource selection impact to peer UE SL DRX procedure; 4) Peer UE SL DRX impact to UE's own sensing & resource selection procedure; 5) Peer UE's sensing & resource selection impacts on UE's own sidelink DRX procedure; 6) UE's own sidelink DRX impact on Peer UE's sensing & resource selection; 7) How to distribute DRX timings such that traffic load in sensing window is representative of the traffic load in DRX active time, including specification of relation between sensing parameters versus DRX configuration parameters; or 8) Handling of impact of pre-emption of resources or re-evaluation of resources on DRX including the handling of sidelink DRX HARQ RTT timer and sidelink DRX Retransmission timer.

Additionally, this disclosure also considers the issue of the modeling of sidelink DRX versus SL sensing, and whether these two procedures should be decoupled or should there be some level of coupling. For example, should SL DRX operate independently of sensing and resource (re)selection, or should they be coordinated?

Issue 3 is associated with behavior when TX UE is (pre)configured with SL resource allocation which is not within the active time of the TX/RX UE. What are the UE behaviors when the TX UE receives SL resource allocation from a network node which is not within the active time of the TX/RX UE? These behaviors may be defined and specified.

Issue 4 is associated with use of assistance information for the determination of SL DRX configuration. How is the assistance information from peer UEs, the gNB or the RSU used by a UE (e.g., TX UE or RX UE) for the determination of sidelink DRX configuration. For example, when a TX UE is engaged in sidelink communication over multiple unicast sidelinks toward one or more several RX UEs, wherein a DRX configuration assistance parameter set is configured or received for each of the unicast sidelink, how does the UE decide which of the DRX configuration assistance parameter set among the multiple received DRX configuration assistance parameter set(s) to use, or which one(s) not to use.

Mechanisms that may enhance sidelink discontinuous reception is discussed below.

Disclosed herein are mechanisms that may enhance sidelink discontinuous reception mechanisms. FIG. 10A-FIG. 10F illustrates example devices and communications system in which the systems, methods, apparatuses that implement NR sidelink discontinuous reception, described herein, may be used. Communications system 111 may include Wireless Transmit/Receive Units (WTRUs) 102A, 102B, 102C, 102D, 102E, 102F (also referred herein as UE 102), a base station gNB 121, a V2X server 124, and Road Side Units (RSUs) 123a and 123b. In practice, the concepts presented herein may be applied to any number of UEs, base stations, V2X networks, or other network elements.

Sidelink DRX procedures may include control of sidelink DRX taking into account one or more SL DRX groups, handling of sidelink DRX timers, which sidelink RNTI to monitor, as well as the use of sidelink wake-up signal.

A first device may include instructions stored in the first device which, when executed cause the first device to perform Discontinuous Reception (DRX) procedure. The first device may receive from a second device, configuration parameters for the control of DRX procedure. The configuration parameters may include: drx-onDurationTimerSL, drx-SlotOffsetSL, drx-InactivityTimerSL, drx-RetransmissionTimerSL (per SL HARQ process), drx-LongCycleStartOffsetSL, drx-ShortCycleSL, drx-ShortCycleTimerSL, drx-CycleSL, drx-HARQ-RTT-TimerSL, ps-WakeupSL, ps-TransmitOtherPeriodicCSI-SL, or ps-TransmitPeriodicL1-RSRP-SL. The first device may be a UE 102 or an RSU 123a. The second device may be a base station 121, a relay, an RSU 123a, a UE 102, or a core network node such as an AMF node 172, V2X control function node, a prose function node or equivalent sidelink like service control function node.

The first device may further be configured with a common SL DRX parameter set, and one or more dedicated SL DRX configuration parameter sets. The first device may be configured with one or more SL DRX group, with a SL DRX group being a group of sidelink communications (for e.g., unicast communication or unicast link, or multicast communication, or broadcast communication), or a group of sidelink communication resources (for e.g., or a group of component carriers, a group of carrier frequencies, a group of services, a group of resource pools, or a group of BWPs, etc.) with the same SL DRX Active time. The configuration parameters for the control of DRX procedure are preconfigured in the first devices, the configuration parameters comprising one or more of the following: drx-onDurationTimerSL, drx-SlotOffsetSL, drx-InactivityTimerSL, drx-RetransmissionTimerSL (per SL HARQ process), drx-LongCycleStartOffsetSL, drx-ShortCycleSL, drx-ShortCycleTimerSL, drx-CycleSL, drx-HARQ-RTT-TimerSL, ps-WakeupSL, ps-TransmitOtherPeriodicCSI-SL, or ps-TransmitPeriodicL1-RSRP-SL. The first device may be further preconfigured with a common SL DRX parameter set, and one or more dedicated SL DRX configuration parameter sets.

The first device may be preconfigured with one or more SL DRX group, with a SL DRX group being a group of sidelink communications (for e.g., unicast communication or unicast link, or multicast communication, or broadcast communication), or a group of sidelink communication resources (for e.g., or a group of component carriers, or a group of carrier frequencies, or a group of services, or a group of resource pools, or a group of BWPs, etc.) with the same SL DRX Active time. The DRX active time for a SL communication or SL communication resource in a SL DRX group may include the time while the drx-onDurationTimerSL, or drx-InactivityTimerSL, configured for the SL DRX group is running; or drx-RetransmissionTimerSL is running for any sidelink communication; or drx-RetransmissionTimerSL is running for any sidelink communication resource in the SL DRX group; or a SL Scheduling Request configured for a SL communication or for a SL communication resource in the DL DRX group is sent on SL PUCCH and is pending. If a MAC PDU is received in a configured sidelink assignment, the first device may start the drx-HARQ-RTT-TimerSL for the corresponding SL HARQ process in the first symbol after the end of the corresponding transmission carrying the SL HARQ feedback; and stop the drx-RetransmissionTimerSL for the corresponding HARQ process.

If a MAC PDU is transmitted in a configured sidelink grant, and LBT failure indication is not received from lower layers, the first device may start the drx-HARQ-RTT-TimerSL for the corresponding SL HARQ process in the first symbol after the end of the corresponding transmission (within a bundle) of the corresponding PSSCH transmission; and stop the drx-RetransmissionTimerSL for the corresponding HARQ process at the first transmission (within a bundle) of the corresponding PUSCH transmission. If a drx-HARQ-RTT-TimerSL expires, and if the data of the corresponding SL HARQ process was not successfully decoded, the device (herein the device may be the first device, second device, or third device) may start the drx-RetransmissionTimerSL for the corresponding SL HARQ process in the first symbol after the expiry of drx-HARQ-RTT-TimerSL. If [(SFN×10)+subframe number] modulo (drx-CycleSL)=(drx-StartOffsetSL) modulo (drx-CycleSL) for a SL DRX group, the device starts the drx-onDuration-TimerSL for this SL DRX group after drx-SlotOffsetSL from the beginning of the subframe.

If a SL DRX Command MAC CE is received, the first device may stop drx-onDurationTimerSL and drx-InactivityTimerSL (if configured) for each SL DRX group; in another alternative, the first device may stp drx-onDuration-TimerSL and drx-InactivityTimerSL (if configured) for the corresponding DRX group. If drx-InactivityTimer (if configured) for a SL DRX group expires, the device may sleep if no activity for other sidelink communications or Uu communication prevent a sleep. If SL DRX group is in Active Time, monitor the PSCCH resources (first-stage SCI), or second-stage SCI PSSCH resources in this SL DRX group, and if the PSCCH (first-stage SCI) of the second-stage SCI indicate a SL transmission, start the drx-HARQ-RTT-TimerSL for the corresponding SL HARQ process in the first symbol after the end of the corresponding transmission carrying the SL HARQ feedback, and stop the drx-RetransmissionTimerSL for the corresponding SL HARQ process. if SL DRX group is in Active Time, the device (e.g., the first device) may monitor the PSCCH—and if the PSCCH indicates a SL transmission, start the drx-HARQ-RTT-TimerSL for the corresponding SL HARQ process in the first symbol after the end of the corresponding transmission carrying the SL HARQ feedback, and stop the drx-RetransmissionTimerSL for the corresponding SL HARQ process.

If SL DRX group is in Active Time, and if the PSCCH (first-stage SCI) or second-stage SCI indicate a new SL transmission on SL communication or SL communication resource in this SL DRX group, start or restart drx-InactivityTimerSL (if configured) for this SL DRX group in the first symbol after the end of the PSCCH (first-stage SCI) or second-stage SCI reception. If a SL HARQ process receives sidelink feedback information and acknowledgement is indicated, there may be a stop of the drx-RetransmissionTimerSL for the corresponding SL HARQ process.

If SCP monitoring is configured for the active SL BWP; if the current symbol n occurs within drx-onDurationTimerSL duration; if drx-onDurationTimerSL associated with the current DRX cycle is not started; and if the MAC entity would not be in Active Time considering grants/assignments/DRX Command MAC CE/Long DRX Command MAC CE received and Scheduling Request sent until 4 ms prior to symbol n when evaluating all SL DRX Active Time conditions, then the device may not transmit periodic SL CSI-RS and SL semi-persistent CSI-RS, the device may not report semi-persistent SL CSI configured on PSSCH.

If SCP monitoring is configured for the active SL BWP; if the current symbol n occurs within drx-onDurationTimerSL duration; if drx-onDurationTimerSL associated with the current DRX cycle is not started; if the MAC entity would not be in Active Time considering grants/assignments/DRX Command MAC CE/Long DRX Command MAC CE received and Scheduling Request sent until 4 ms prior to symbol n when evaluating all SL DRX Active Time conditions; and if ps-TransmitPeriodicL1-RSRP-SL is not configured with value true, then the device may not report periodic SL CSI that is SL L1-RSRP on PSCCH.

If SCP monitoring is configured for the active SL BWP; if the current symbol n occurs within drx-onDurationTimerSL duration; if drx-onDurationTimerSL associated with the current DRX cycle is not started; if the MAC entity would not be in Active Time considering grants/assignments/DRX Command MAC CE/Long DRX Command MAC CE received and Scheduling Request sent until 4 ms prior to symbol n when evaluating all SL DRX Active Time conditions; and if ps-TransmitOtherPeriodicCSI-SL is not configured with value true, then the device may not report periodic SL CSI that is not L1-RSRP on PSCCH.

Aforementioned subject matter provides a first consideration that if SCP monitoring is configured for the active SL BWP; if the current symbol n occurs within drx-onDurationTimerSL duration; and if drx-onDurationTimerSL associated with the current DRX cycle is not started, among other things, then some action may be taken. Here, when the combinations of the first consideration are not true then there are further considerations in which in current symbol n, if a SL DRX group would not be in Active Time considering grants/assignments scheduled on Serving Cell(s) in this SL DRX group and DRX Command MAC CE/Long DRX Command MAC CE received and Scheduling Request sent until 4 ms prior to symbol n when evaluating all SL DRX Active Time conditions, then the device may not transmit periodic SL CSI-RS and SL semi-persistent CSI-RS in this SL DRX group.

Aforementioned subject matter provides a first consideration that if SCP monitoring is configured for the active SL BWP; if the current symbol n occurs within drx-onDurationTimerSL duration; and if drx-onDurationTimerSL associated with the current DRX cycle is not started, among other things, then some action may be taken. Here, when the combinations of the first consideration are not true then there are further considerations in which in current symbol n, if a SL DRX group would not be in Active Time considering grants/assignments scheduled on Serving Cell(s) in this SL DRX group and DRX Command MAC CE/Long DRX Command MAC CE received and Scheduling Request sent until 4 ms prior to symbol n when evaluating all SL DRX Active Time conditions, then the device may not report SL CSI on PSCCH and semi-persistent SL CSI configured on PSSCH in this SL DRX group.

Aforementioned subject matter provides a first consideration that if SCP monitoring is configured for the active SL BWP; if the current symbol n occurs within drx-onDurationTimerSL duration; and if drx-onDurationTimerSL associated with the current DRX cycle is not started, among other things, then some action may be taken. Here, when the combinations of the first consideration are not true then there are further considerations in which if SL CSI masking (csi-Mask) is setup by upper layers, and in current symbol n, if drx-onDurationTimerSL of a SL DRX group would not run considering grants/assignments scheduled on sidelink communication resources in this SL DRX group and DRX Command MAC CE/Long DRX Command MAC CE received until 4 ms prior to symbol n when evaluating all DRX Active Time conditions, then the device may not CSI on SL PSCCH in this DRX group.

Specification of UE 102 behaviors that accounts for sensing impact on sidelink DRX and MAC resource allocation procedure are disclosed below. In summary, a first device may include instructions stored in the first device which, when executed, cause the first device to perform sensing outside DRX active time.

The first device may use information collected during DRX active time, such as sensing information, reserved resources, candidate resources, SL RSRP measurement, CBR measurement, CR measurement, resource exclusion decision, resource preemption information, resource selection re-evaluation decision, transmit resources, or candidate resources to select transmit resource grant during outside DRX active time. The information collected during DRX active time or used by the first device to select transmit resource grant selection during outside DRX active time may have a validity time or timer. At the expiry of the validity timer, the first device may start the DRX on duration timer.

Figure 8:
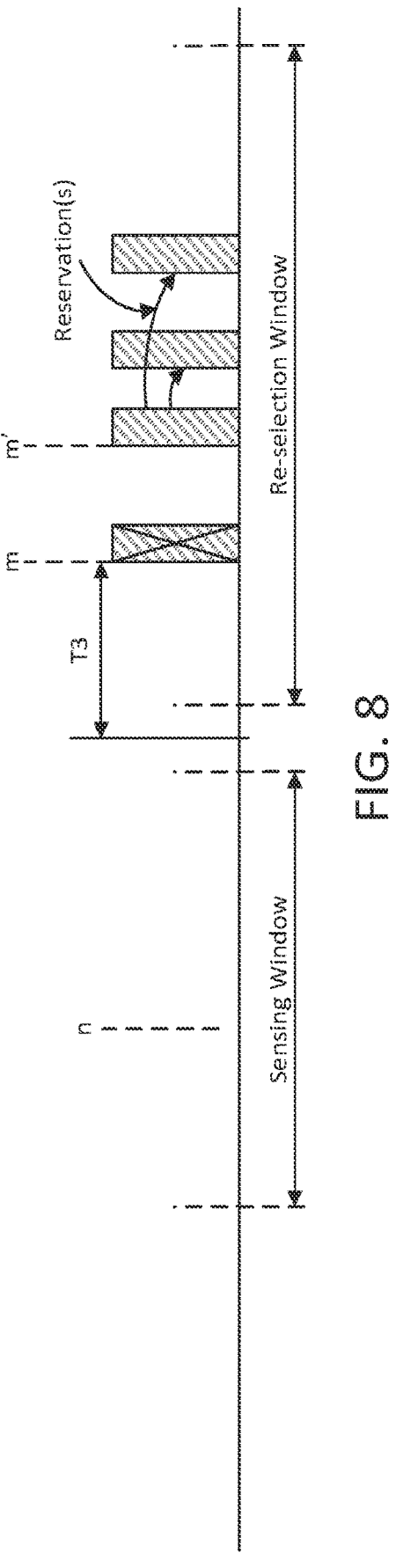
FIG. 8 illustrates an exemplary Timeline of sensing and resource (re-)selection procedure originally triggered at time n, which has a first reserved resource at time m, when re-evaluation occurring at m-T3 determines the resources are no longer selectable. The new re-evaluation cut-off becomes (m'-T3)

A first device may include instructions stored in the first device which, when executed cause the first device to perform sensing during DRX active time. After the first device starts the DRX on-duration timer, or at the expiry of SL Hybrid Automatic Repeat request (HARQ) Round Trip Time (RTT) Timer, the first device may do one or more of resource selection re-evaluation, transmission resource assignment SCI, cancel reserved resources whose occasions in time domain are within T3 duration after the start of the on-duration timer, or equal to T3 duration after the start of the on-duration timer. In an example, T3 may be the same as defined in FIG. 8. If a sensing procedure or resource (re-)selection is underway, there may be instructions sent to complete the procedure before entering outside DRX active time. At the expiration of the SL on-duration timer, or the SL DRX inactivity timer, or the SL retransmission timer, the first device may clear the one or more of the following information: sensing information, reserved resources, candidate resources, SL RSRP measurement, CBR measurement, CR measurement, resource exclusion decision, resource preemption information, resource selection re-evaluation decision, transmit resources, or candidate resources.

After a pre-emption event or re-evaluation of SL transmission or resources, the first device may extend SL HARQ RTT timer, wherein the extension may be equal or greater than the amount of time between the occasion in time domain of the SL HARQ retransmission resource that was pre-empted or discarded as a result of resource selection re-evaluation, and the occasion in time domain of the next available resource for SL HARQ retransmission. After a pre-emption event or re-evaluation of SL transmission or resources, the first device may restart SL HARQ RTT time or timer, or starts SL HARQ RTT time or timer at expiry of SL HARQ RTT timer for each occurrence in time domain, where SL HARQ retransmission resource is pre-empted or discarded, or until SL retransmission timer expires. The first device may shorten the SL retransmission timer, for example by the amount of time the SL HARQ RTT timer has been extended or the additional amount of time the SL HARQ RTT timer has run for to account for the impact of pre-emption or discarding of SL HARQ retransmission resources.

Specification of UE behaviors when a TX UE or an RX UE receives SL resource allocation from gNB or a scheduling node, which is not within the active time of the TX or the RX UE.

The first device may receive SL resource grant from a third device, the received SL resource grant being outside DRX active time. The first device may ignore DRX (e.g., the first device wakes up or remains awake), may use the resource grant, and then may transition back to outside DRX active time. The first device may ignore DRX (e.g., the first device wakes up or remains awake), may use the resource grant, and then may remain awake until the next SL DRX cycle. The first device may ignore the received SL grant.

The first device may ignore the received SL resource grant which may belong to the outside DRX active time based on the priority, the traffic, signaling, or MAC CE associated with the SL grant. The first device may be a UE 102 or an RSU 123a. The second device may be a base station 121, a relay, an RSU 123a, a UE 102, or a core network node such as an AMF node 172, V2X control function node, a prose function node, or equivalent sidelink like service control function node. All combinations in this paragraph and the previous paragraphs (including the removal or addition of steps) are contemplated in a manner that is consistent with the other portions of the detailed description.

Rules for a UE 102 or for a UE 102 in coordination with its serving base station, to select among a plurality of assistance information or assistant information sets, the assistance information of assistance information set to use, for deciding which DRX configuration or DRX configuration parameter set to use. Rules for a UE 102 or for a UE 102 in coordination with its serving base station 121, to select among a plurality of DRX configuration parameters or parameter sets, a DRX configuration parameter or DRX configuration parameter set to use.

A first device including instructions stored in the first device which, when executed cause the first device to receive from a fourth device SL assistance information or SL DRX configuration, wherein the first device may use the received SL assistance information or the SL DRX configuration in the determination of the first device SL DRX configuration to use. The first device may select as SL assistance information or SL DRX configuration to use for the determination of the first device SL DRX configuration, the received assistance information or SL DRX configuration with the highest priority. In case of a tie of the priority value, the device may randomly select a SL assistance information or DRX configuration set with the highest priority value as the SL assistance information or a SL DRX configuration to use for the determination of the first device SL DRX configuration.

The first device may select SL assistance information or SL DRX configuration to use for the determination of the device SL DRX configuration, the received assistance information or SL DRX configuration with a priority above a threshold. In case of a tie, the first device may select SL assistance information or SL DRX configuration to use for the determination of SL DRX configuration, the received SL assistance information or SL DRX configuration with the highest priority among the SL assistance information or SL DRX configurations with a priority above the priority threshold for the determination of the device SL DRX configuration. If none of the SL assistance information or configuration information has a priority above the priority threshold, or none of the SL assistance information or DRX configuration has an associated priority, the first device may randomly select a SL assistance information or SL DRX configuration, among the received SL assistance information or SL DRX configurations for the determination of the first device SL DRX configuration.

The first device may assign a default priority value to a SL assistance information or a SL DRX configuration if the SL assistance information or SL DRX configuration is not configured with a priority value. The first device may select SL assistance information or DRX configuration information to use for the determination of the first device SL DRX configuration, based on pre-defined rules, such as rules that are captured in the specification. The first device may select SL assistance information or DRX configuration information to use for the determination of the first device SL DRX configuration, a common SL assistance information, or common SL DRX configuration configured into the UE. For example, the common SL assistance information or common SL DRX configuration may be associated with a common reception resource or a common transmit resource pool. The first device may select SL assistance information or a DRX configuration information to use for the determination of the first device SL DRX configuration, on the basis of communication cast type, wherein the first device prioritizes the SL assistance information or DRX configuration information associated with the higher priority cast type.

The first device may determine the priority associated with a SL assistance information or DRX configuration, based on priority values (pre)configured into the first device, or priority values provisioned into the first device. The first device may implicitly determine the priority associated with a SL assistance information or SL DRX configuration, based on one or more of the priorities of Layer-2 Destination ID, the priority of a cast type, the priority of a resource pool, the priority of a PC5 5QI (PQI), the priority of a service or service type, or the priority of a unicast link associated with the SL assistance information or SL DRX configuration. The fourth device may be a base station 121, a relay, an RSU 123a, a UE 102, or a core network node such as an AMF node 172, V2X control function node, a prose function node, or equivalent sidelink like service control function node.

Unless otherwise specified, the DRX behaviors described herein may apply to RX UE or TX UE.

Sidelink DRX Procedures and handling of SL DRX timers for TX UE or RX UE is discussed below.

An example MAC DRX procedure is captured herein. For SL DRX, the MAC entity may be configured by RRC, pre-configured or provisioned with a SL DRX functionality that controls the UE's first-stage SCI over PSCCH monitoring activity, and the stage-2 SCI over PSSCH monitoring for the MAC entity's first-stage SCI-RNTI, Second-stage SCI-RNTI, SL CSI-RNTI, or SL SP-CSI-RNTI. In another example, the MAC entity may also be configured by RRC, pre-configured or provisioned with a SL DRX functionality that controls the UE's monitoring activities of the other RNTIs captured in Table 3. When using SL DRX operation, the MAC entity may also monitor first-stage SCI over PSCCH or second-stage SCI over PSSCH according to requirements found herein. When in sidelink communication, if SL DRX is configured, the MAC entity may monitor the PSCCH or SCI over PSSCH or PSSCH addressed to SL CSI-RNTI or to any of the RNTIs defined in Table 3 discontinuously, using the DRX operation specified in this clause. The MAC entity may monitor the PSCCH or SCI over PSSCH or PSSCH addressed to SL CSI-RNTI or to any of the RNTIs defined in Table 3 discontinuously on the basis of one or more of the followings: per sidelink communication resource pool subject, wherein for example a sidelink communication resource pool configured into the UE in support of DRX operation; per activated sidelink resource pool, wherein for example a resource pool configured into the UE in support of DRX operation may be in an activated state or a deactivated state; or per sidelink communication.

RRC may control DRX operation by configuring one or more of the following parameters as provided in Table 2.

TABLE 2

| Parameter | Description |
| --- | --- |
| drx-onDurationTimerSL | the on duration (e.g., awake duration) at the beginning of a SL DRX cycle |
| drx-SlotOffsetSL | the delay before starting the drx-onDurationTimerSL |
| drx-InactivityTimerSL | the duration (e.g., inactivity duration) after the PSCCH occasion carrying the first-stage SCI as further described herein. |
| drx-RetransmissionTimerSL (per SL HARQ process) | the maximum duration until a SL retransmission is received; This timer may also be specified for the transmitter UE, as the maximum duration until SL retransmission is performed. Separate values of this timer may be configured for the received UE, and the transmitter UE. |
| drx-LongCycleStartOffsetSL (conditional e.g., if drx-ShortCycleSL is configured) | SL Long DRX cycle and drx-StartOffsetSL which defines the subframe where the SL Long and Short DRX cycle starts |
| drx-ShortCycleSL | the SL Short DRX cycle |
| drx-ShortCycleTimerSL | the duration the UE shall follow the SL Short DRX cycle |
| drx-CycleSL | the SL DRX cycle; The SL DRX may be specified to use only drx-CycleSL. In that case, no short or long DRX cycle is used or configured in that case. In such case, the drx-ShortCycleTimerSL may not be used or configured either |
| drx-StartOffsetSL | the SL DRX cycle start offset. If the SL DRX is specified to use only drx-CycleSL, this defines the subframe where the SL DRX cycle starts; It should be noted that the drx-CycleSL and the drx-StartOffsetSL may be defined as a combined parameter drx-CycleStartOffsetSL which include both the parameters drx-CycleSL and parameter drx-StartOffsetSL. It should be noted that the parameter drx-StartOffsetSL is used here in reference to where the SL DRX cycle starts, or where the Long DRX cyle and the short DRX cycle starts. |
| drx-HARQ-RTT-TimerSL (per SL HARQ process except for the broadcast process) | the minimum duration before a SL assignment for SL HARQ retransmission is expected by the MAC entity; This timer may also be specified for the transmitter UE, as the minimum duration before a SL retransmission is performed. Separate values of this timer may be configured for the received UE, and the transmitter UE |
| ps-WakeupSL | the configuration to start associated SL-drx-onDurationTimer in case SCP (SCI with CRC scrambled by SL Power Saving RNTI (SL-PS-RNTI)) is monitored but not detected |
| ps-TransmitOtherPeriodicCSI-SL | the configuration to report periodic SL-CSI that is not SL L1-RSRP on PSCCH during the time duration indicated by SL-drx-onDurationTimer in case SCP is configured but associated drx-onDurationTimer is not started |
| ps-TransmitPeriodicLI-RSRP-SL | the configuration to transmit periodic SL-CSI that is SL L1-RSRP on PSCCH during the time duration indicated by drx-onDurationTimerSL in case SCP is configured but associated drx-onDurationTimerSL is not started. |

With reference to drx-InactivityDimerSL, it may be associated with the duration after the PSCCH occasion. In an example, to drx-InactivityTimerSL may be the duration after the PSCCH occasion carrying the first-stage SCI in which a PSCCH indicates a new sidelink transmission for the MAC entity, or the duration after the PSSCH occasion carrying the second-stage SCI in which the second-stage SCI indicates a new sidelink transmission for the MAC entity. From the perspective of the RX UE, the statement "PSCCH indicates a new sidelink transmission" may mean "reception of PSCCH announcing a new sidelink transmission from the TX UE," while from the TX perspective, this may mean "transmission of a PSCCH announcing a sidelink transmission." Similarly, "PSSCH occasion carrying the second-stage SCI in which the second-stage SCI indicates a new sidelink transmission" may mean from RX UE perspective, "reception of second-stage SCI that carries information needed to identify or decode the associated SL-SCH that carries the TB of data transmitted over SL, as well as control for HARQ procedures or triggers for CSI feedback, etc."

While from the TX perspective, this may mean "transmission of a PSSCH carrying a second-stage SCI that carries information needed to identify or decode the associated SL-SCH that carries the TB of data transmitted over SL, as well as control for HARQ procedures or triggers for CSI feedback, etc."

In one example, UE 102 may be configured with a common SL DRX configuration parameter set, and one or more dedicated or separate SL DRX configuration parameter sets. The common SL DRX parameters or common SL DRX parameter set is common to two or more SL DRX groups. The dedicated or separate DL DRX configuration parameter set, or SL DRX configuration parameters is specific to a SL DRX group. UE 102 may be (pre)configured or provisioned, with one or more SL DRX groups (e.g., on the basis of Network Slice, SL Slice, UE capabilities or UE type (e.g., UE type may be REDCAP based SL DRX group), unicast communication or unicast link, unicast communication or unicast link per sidelink communication direction, or multicast communication, or broadcast communication, QoS attributes such as PQI (e.g., standardized PQI or non-standardized PQI), with separate DRX parameters. In one example, the configuration of a SL DRX group may include a common SL DRX configuration parameter set and one or more dedicated or separate SL DRX configuration parameter sets.

In another example, the configuration of a SL DRX group may include only separate SL DRX configuration parameters meaning there is no SL DRX configuration parameter configured as a parameter common to two or more SL DRX groups. In one example, a SL DRX group may be defined as a group of sidelink communications (e.g., unicast communication or unicast link, unicast communication, or unicast link per sidelink communication direction, or multicast communication, or broadcast communication). In another example, a SL DRX group may be defined as a group of sidelink communication resources (e.g., or a group of component carriers, or a group of carrier frequencies, or a group of services, or a group of resource pools, or a group of BWPs, etc.) with the same SL DRX Active time. For example, a SL DRX communication group may include one or more unicast links, wherein a unicast link is characterized by one or more pairs of Source Layer-2 (L2) ID and Destination L2 ID. Alternatively, a SL DRX communication group may include one or more destination L2 IDs, wherein a destination L2 ID is associated with unicast service. In another example, a SL DRX communication group may include one or more unicast links, wherein a unicast link is characterized by one or more pairs of L2 IDs with no consideration for the direction of the SL communication (e.g., no differentiation of which L2 ID is a source L2 ID and which one is a destination L2 ID for a given pair of L2 IDs). In another example, a SL DRX group may include one or more pairs of Source Layer-2 (L2) ID and Destination L2 ID, wherein a destination L2 ID is associated with a groupcast communication. Alternatively, a SL DRX group may include one or more destination L2 IDs, wherein a destination L2 ID is associated with a groupcast communication.

In yet another example, a SL DRX group may include one or more pairs of Source Layer-2 (L2) ID and Destination L2 ID, wherein a destination L2 ID is associated with a broadcast communication. Alternatively, a SL DRX group may include one or more Destination L2 IDs, wherein a destination L2 ID is associated with a broadcast communication. In an example, a SL DRX group may include one or more QoS attributes such as one or more PQIs. Furthermore, the various SL DRX group examples presented above may be expanded to include QoS attributes such as PQI. For example, a SL DRX communication group may include one or more unicast links, wherein a unicast link is characterized by one or more pairs of Source Layer-2 (L2) ID and Destination L2 ID, and a unicast link or a pair of source L2 ID and destination L2 ID within the unicast link is associated with one or more QoS attributes, such as one or more PQIs. Alternatively, a SL DRX communication group may include one or more destination L2 IDs, wherein a destination ID is associated with a unicast service, and one or more QoS attributes such as one or more PQIs.

In another example, a SL DRX communication group may include one or more unicast links, wherein a unicast link is characterized by one or more pairs of L2 IDs with no consideration for the direction of the SL communication (e.g., no differentiation of which L2 ID is a source L2 ID and which one is a destination L2 ID for a given pair of L2 IDs, and a unicast link or a pair of source L2 ID and destination L2 ID within the unicast link is associated with one or more QoS attributes such as one or more PQIs). In another example, a SL DRX group may include one or more pairs of Source Layer-2 (L2) ID and Destination L2 ID, wherein a destination L2 ID is associated with a groupcast communication, and one or more QoS attributes such as one or more PQIs. Alternatively, a SL DRX group may include one or more destination L2 IDs, wherein a destination L2 ID is associated with a groupcast communication, and one or more QoS attributes, such as one or more PQIs.

In yet another example, a SL DRX group may include one or more pairs of Source Layer-2 (L2) ID and Destination L2 ID, wherein a destination L2 ID is associated with a broadcast communication, and one or more QoS attributes, such as one or more PQIs. Alternatively, a SL DRX group may include one or more Destination L2 IDs, wherein a destination L2 ID is associated with a broadcast communication, and one or more QoS attributes such as one or more PQIs. In one example, the following DRX parameters may be separately configured for each SL DRX group: drx-onDurationTimerSL, drx-InactivityTimerSL drx-HARQ-RTT-TimerSL, while the DRX parameters may be common: drx-SlotOffsetSL, drx-Retransmission TimerSL, drx-LongCycleStartOffsetSL (conditional), drx-ShortCycleSL, drx-ShortCycleTimerSL, drx-CycleSL, drx-StartOffsetSL. In another example, UE 102 may be configured with a common SL DRX configuration parameter set across all SL DRX groups, and one or more dedicated or separated SL DRX configurations parameter sets per SL DRX group.

When a SL DRX cycle is configured, the Active Time for a SL communication or SL communication resources in a SL DRX group includes the time while:
1) drx-onDurationTimerSL, or drx-InactivityTimerSL, configured for the SL DRX group is running; 2) drx-RetransmissionTimerSL is running on any sidelink communication, or any sidelink communication resource in the SL DRX group; or 3) a SL Scheduling Request configured for a SL communication or for a SL communication resource in the DL DRX group is sent on SL PUCCH and is pending.

When SL DRX is configured, the MAC entity shall:
1> if a MAC PDU is received in a configured sidelink assignment:
  2> start the drx-HARQ-RTT-TimerSL for the corresponding SL HARQ process in the first symbol after the end of the corresponding transmission carrying the SL HARQ feedback;
  2> stop the drx-RetransmissionTimerSL for the corresponding SL HARQ process.
1> If a MAC PDU is transmitted in a configured sidelink grant and LBT failure indication is not received from lower layers:
  2> start the drx-HARQ-RTT-TimerSL for the corresponding HARQ process in the first symbol after the end of the first transmission (within a bundle) of the corresponding PSSCH transmission;
1> if a drx-HARQ-RTT-TimerSL expires:
  2> if the data of the corresponding SL HARQ process was not successfully decoded:
    3> start the drx-RetransmissionTimerSL for the corresponding SL HARQ process in the first symbol after the expiry of drx-HARQ-RTT-TimerSL.

======Beginning if use of Short and Long DRX cycles is specified=====

1> if a SL DRX Command MAC CE or a SL Long DRX Command MAC CE is received:

2> stop drx-onDurationTimerSL for each SL DRX group;

2> stop drx-InactivityTimerSL if configured for each SL DRX group.

1> if drx-InactivityTimer (if configured) for a SL DRX group expires:

2> if the SL Short DRX cycle is configured:

3> start or restart drx-ShortCycleTimerSL for this SL DRX group in the first symbol after the expiry of drx-InactivityTimerSL;

3> use the SL Short DRX cycle for this SL DRX group.

2> else:

3> use the SL Long DRX cycle for this SL DRX group.

1> if a SL DRX Command MAC CE is received:

2> if the SL Short DRX cycle is configured:

3> start or restart drx-ShortCycleTimerSL for each SL DRX group in the first symbol after the end of SL DRX Command MAC CE reception;

3> use the SL Short DRX cycle for each SL DRX group.

2> else:

3> use the SL Long DRX cycle for each SL DRX group.

1> if SL drx-ShortCycleTimer for a SL DRX group expires:

2> use the SL Long DRX cycle for this SL DRX group.

1> if a SL Long DRX Command MAC CE is received:

2> stop drx-ShortCycleTimerSL for each SL DRX group;

2> use the SL Long DRX cycle for each SL DRX group.

1> if the SL Short DRX cycle is used for a SL DRX group, and [(SFN×10)+subframe number] modulo (drx-ShortCycleSL)=(drx-StartOffsetSL) modulo (drx-ShortCycleSL):

2> start drx-onDurationTimerSL for this SL DRX group after drx-SlotOffsetSL from the beginning of the subframe.

1> if the SL Long DRX cycle is used for a SL DRX group, and [(SFN×10)+subframe number] modulo (drx-LongCycleSL)=drx-StartOffsetSL:

2> if SCP monitoring is configured for the active SL BWP:

3> if SCP indication associated with the current DRX cycle received from lower layer indicated to start drx-onDurationTimerSL; or 3> ifps-WakeupSL is configured with value true and SCP indication associated with the current SL DRX cycle has not been received from lower layers:

4> start drx-onDurationTimerSL after drx-SlotOffset from the beginning of the subframe.

2> else:

3> start drx-onDurationTimerSL for this SL DRX group after drx-SlotOffsetSL from the beginning of the subframe.

NOTE 1: In case of unaligned SFN across carriers configured into the UE for SL communication, the SFN of the main carrier or the anchor carrier (where in the main carrier or the anchor carrier is configured into the UE) is used to calculate the DRX duration.

=======End if use of Short and Long DRX cycles is specified=====

1> if [(SFN×10)+subframe number] modulo (drx-CycleSL)=(drx-StartOffsetSL) modulo (drx-Cycle) for a SL DRX group:

2> start drx-onDurationTimerSL for this SL DRX group after drx-SlotOffsetSL from the beginning of the subframe.

1> if a SL DRX Command MAC CE is received:

2> stop drx-onDurationTimerSL for each SL DRX group; In another alternative embodiment, stop drx-onDurationTimerSL for the corresponding DRX group;

2> stop drx-InactivityTimerSL (if configured) for each SL DRX group. In another alternative embodiment, stop drx-InactivityTimerSL (if configured) for the corresponding SL DRX group;

1> if drx-InactivityTimer (if configured) for a SL DRX group expires:

2> The UE has opportunity to sleep if no activity for any other sidelink communication or Uu communication prevent a sleep;

1> if a SL DRX group is in Active Time:

2> monitor the PSCCH on the SL communication or SL communication resources in this SL DRX group;

2> if the PSCCH indicates a SL reception:

3> start the drx-HARQ-RTT-TimerSL for the corresponding SL HARQ process in the first symbol after the end of the corresponding transmission carrying the SL HARQ feedback;

3> stop the drx-RetransmissionTimerSL for the corresponding SL HARQ process.

3>

2> if the PSCCH indicates a SL transmission:

3> start the drx-HARQ-RTT-TimerSL (if configured) for the corresponding SL HARQ process in the first symbol after the end of the first transmission (within a bundle) of the corresponding PSSCH transmission;

3> stop the drx-RetransmissionTimerSL (if running) for the corresponding SL HARQ process at the first transmission (within a bundle) of the corresponding PSSCH transmission.

2> if the PSCCH indicates a new SL transmission on a SL communication or a SL communication resource in this SL DRX group:

3> start or restart drx-InactivityTimerSL (if configured) for this SL DRX group in the first symbol after the end of the PSCCH reception.

2> if a SL HARQ process receives sidelink feedback information and acknowledgement is indicated:

3> stop the drx-RetransmissionTimerSL for the corresponding SL HARQ process.

1> if SCP monitoring is configured for the active SL BWP; and

1> if the current symbol n occurs within drx-onDurationTimerSL duration; and

1> if drx-onDurationTimerSL associated with the current DRX cycle is not started as specified in this clause:

2> if the MAC entity would not be in Active Time considering grants/assignments/DRX Command MAC CE/Long DRX Command MAC CE received and Scheduling Request sent until 4 ms prior to symbol n when evaluating all SL DRX Active Time conditions as specified in this clause:

3> not transmit periodic SL CSI-RS and SL semi-persistent CSI-RS;

3> not report semi-persistent SL CSI configured on PSSCH;

3> if ps-TransmitPeriodicL1-RSRP-SL is not configured with value true:

4> not report periodic SL CSI that is SL L1-RSRP on PSCCH.

3> if ps-TransmitOtherPeriodicCSI-SL is not configured with value true:

4> not report periodic SL CSI that is not L1-RSRP on PSCCH.

1> else:

2> in current symbol n, if a SL DRX group would not be in Active Time considering grants/assignments scheduled on Serving Cell(s) in this SL DRX group and DRX Command MAC CE/Long DRX Command MAC CE received and Scheduling Request sent until 4 ms prior to symbol n when evaluating all SL DRX Active Time conditions as specified in this clause:

3> not transmit periodic SL CSI-RS and SL semi-persistent CSI-RS in this SL DRX group;

3> not report SL CSI on PSCCH and semi-persistent SL CSI configured on PSSCH in this SL DRX group.

2> if SL CSI masking (csi-Mask) is setup by upper layers:

3> in current symbol n, if drx-onDurationTimerSL of a SL DRX group would not be running considering grants/assignments scheduled on SL communications or SL communication resources in this SL DRX group and DRX Command MAC CE/Long DRX Command MAC CE received until 4 ms prior to symbol n when evaluating all DRX Active Time conditions as specified in this clause; and 4> not report SL CSI on SL PSSCH in this SL DRX group.

Note 2: csi-Mask if set to true, then UE 102 may limit CSI reports to the on-duration (e.g., period) of the DRX cycle.

Regardless of whether the MAC entity is monitoring PSCCH or not on the SL communications or SL communication resources in a SL DRX group, the MAC entity may transmit SL HARQ feedback, aperiodic SL CSI on PSSCH, or aperiodic SL RS on the SL communications (or SL communication resources) in the SL DRX group when such is expected. The MAC entity need not monitor the PSCCH resources or second-stage PSSCH resources if it is not a complete PSCCH resources or second-stage PSSCH resources occasion (e.g. the Active Time starts or ends in the middle of a PSCCH resources or second-stage PSSCH resources occasion).

SL RNTI usage in support of SL DRX is discussed below.

The RNTIs for the control of UE's reception monitoring activities on the sidelink are summarized in the Table 3. UE 102 may use these RNTIs in any combination for the control of the monitoring of reception activities on sidelink. Additionally, it is understood that RNTI may be defined to combine one or more of the usages defined in Table 3.

TABLE 3

| SL RNTI Usage in support of SL DRX | | | | |
|---|---|---|---|---|
| RNTI | Usage | Physical Channel | Transport Channel | Logical Channel |
| First-stage SCI RNTI | Dynamically scheduled sidelink transmission announcement | PSCCH (Physical SL CCH) | SL-SCH | SCCH, STCH |
| Second-stage SCI-RNTI | For control for SL HARQ procedures, and triggers for CSI feedback | PSSCH (Physical SL SCH) | SL-SCH | SCCH, STCH |
| SL CSI-RNTI | Dynamically scheduled sidelink CSI RS transmission announcement | PSCCH or PSSCH | N/A | N/A |
| SL SP CSI-RNTI over SL | Resource assignment over sidelink for Semi-Persistently scheduled sidelink transmission for V2X sidelink communication (activation, reactivation, and retransmission) | PSCCH or PSSCH | N/A | N/A |
| SL SP CSI-RNTI over SL | Resource assignment over sidelink for Semi-Persistently scheduled sidelink transmission for V2X sidelink communication (Deactivation) | PSCCH or PSSCH | N/A | N/A |
| SL-RNTI over SL | Resource assignment over sidelink for Dynamically scheduled sidelink transmission | PSCCH or PSSCH | SL-SCH | SCCH, STCH |

TABLE 3-continued

SL RNTI Usage in support of SL DRX

| RNTI | Usage | Physical Channel | Transport Channel | Logical Channel |
|---|---|---|---|---|
| SLCS-RNTI over SL | Resource assignment over sidelink for Configured scheduled sidelink transmission (activation, reactivation and retransmission) | PSCCH or PSSCH | SL-SCH | SCCH, STCH |
| SLCS-RNTI over SL | Resource assignment over sidelink for Configured scheduled sidelink transmission (deactivation) | PSCCH or PSSCH | N/A | N/A |
| SL Semi-Persistent Scheduling V-RNTI over SL | Resource assignment over sidelink for Semi-Persistently scheduled sidelink transmission for V2X sidelink communication (activation, reactivation and retransmission) | PSCCH or PSSCH | SL-SCH | SCCH, STCH |
| SL Semi-Persistent Scheduling V-RNTI over SL | Resource assignment over sidelink for Semi-Persistently scheduled sidelink transmission for V2X sidelink communication (deactivation) | PSCCH or PSSCH | N/A | N/A |

Handling of scenarios where TX UE or RX UE are not synchronized is discussed below.

Asynchronous deployment scenarios may be supported, wherein UE 102*a* or UE 102*b* have different timing references for sidelink communication. UE 102A or UE 102B may be TX UE or RX UE. For example, the followings scenarios of asynchronous deployment may be considered. UE 102A and UE 102B synced to two different gNBs, but the 2 gNBs are with different timing. UE 102A and UE 102B synced to two different eNBs, but the 2 eNBs are with different timing. UE 102A synced to eNB, UE 102B synced to gNB, or eNB and gNB are with different timing.

Additionally, the following scenarios may also be considered. UE 102A and UE 102B synced to different Global Navigation Satellite System (GNSS), but the two GNSS are with different timing. In another example, UE 102A synced with a GNSS and UE 102B synced with a base station, but the GNSS and the base station are with different timing. In yet another example, UE 102A synced with a base station or a GNSS, and UE 102B synced with another UE 102C, but the GNSS or the base station, and the another UE 102C are with different timing. Furthermore, the UE 102A or UE 102B may use an internal clock as a timing reference. For a proper SL communication, both the UE 102A and the UE 102B may have the same understanding of the timing of the radio frame, subframe, slot, and symbol. In the case of asynchronous deployment, in addition to UE 102A or UE 102B, using drx-CycleSL and drx-StartOffsetSL to determine the subframe, slot and symbol associated with the start of the DRX cycle, it is disclosed that UE 102A or UE 102B apply an additional timing offset to determine the subframe where the DRX cycle starts. It is also disclosed that UE 102A or UE 102B apply an additional timing offset to determine the start of the drx-onDurationTimerSL. In one example, only UE 102A uses an additional timing offset, here in denoted timing-Offset1, to determine the subframe where the DRX cycle starts, or to determine the delay before starting the drx-onDurationTimerSL. For example, if UE 102A is a TX UE and UE 102B is an RX UE, UE 102A uses timing-Offset1 to determine the subframe where the DRX cycle starts for a SL DRX group of UE 102B, or to determine the delay before starting the drx-onDurationTimerSL for a SL DRX group of UE 102B (e.g., UE 102A uses timing-Offset1 to compensate for the timing difference between UE 102A and UE 102B timing and to have the same understanding of subframe timing as UE 102B).

In another example, only UE 102B uses an additional timing offset, here in denoted timing-Offset2, to determine the subframe where the DRX cycle starts for a SL DRX group of UE 102A, or to determine the delay before starting the drx-onDurationTimerSL for a SL DRX group of UE 102A (e.g., UE 102B uses the timing-Offset2 to compensate for the timing difference between UE 102A and UE 102B timing and to have the same understanding of subframe timing as UE 102A). In any one of these examples, the parameter timing-Offset1 and timing-Offset2 may be set to the same value or different values. One issue of interest is how UE 102A or UE 102B determines the respective additional timing offset to use. In the asynchronous deployment scenarios described above, before UE 102A and UE 102B may engage in sidelink communication, there would have been a synchronization process wherein, UE 102A acquires the timing information of UE 102B, the timing information comprising of for example of frequency synchronization, symbol synchronization, frame/subframe timing, as well as frame synchronization for example SFN or DFN frame number, or UE 102B acquires the timing information of UE 102A, or UE 102A and UE 102B acquire timing information with respect to a common timing reference source. UE 102A may determine timing-Offset1, as an offset to UE 102B timing. Similarly, UE 102B may determine timing-Offset2, as an offset to UE 102A timing. Let's denote radio time unit (RTU) the minimum symbol duration supported by the radio access technology for example ⅟₃₂ milliseconds (ms). The timing offset for example timing-Offset1 or timing-Offset2 may be expressed in unit of subframe and RTU, for example M subframe(s) and N RTU, wherein M is a positive or negative integer including 0, and N=0, 1, 2 . . . , Q−1, wherein Q is an integer number that corresponds to the duration of a radio subframe in unit of RTUs. For example, let's assume UE 102A is an RX UE and UE 102B is a TX UE. The UE 102B may derive the starting subframe of the DRX cycle of a SL DRX group in UE 102A as the subframe that satisfies the following equation: [(SFN× 10)+subframe number+M] modulo (drx-CycleSL)=(drx-StartOffsetSL) modulo (drx-Cycle). The UE 102B may derive the starting symbol of drx-onDurationTimerSL for this SL DRX group of UE 102A, as the symbol after (drx-SlotOffsetSL+N) from the beginning of the subframe.

An example of a MAC specification text may be as follows in Table 4.

during DRX active time. In one scenario, the sensing information has no validity time or timer, meaning UE 102 may use the collected sensing information during DRX active time, to perform resource selection, anytime during outside DRX active time.

In a second scenario, sensing information may include reserved resources and SL_RSRP measurements collected during DRX active time. In this example scenario, a validity time or timer (e.g., how long the sensing information is valid) is associated with the sensing information. The validity time or timer may also include how long the PHY performs no sensing while the sensing validity timer is running. After expiry of the sensing information validity timer, UE 102 may wake-up from DRX, perform sensing, and resume Outside DRX active time after completion of the sensing. In one alternative, UE 102 may continue to perform resource exclusion evaluation, resource selection or re-evaluate resource selection, and then resume outside DRX active time. One same validity timer may be used to control

TABLE 4

```
1> if [(SFN × 10) + subframe number + M] modulo (drx-CycleSL) = (drx-StartOffsetSL)
   modulo (drx-Cycle) for a SL DRX group:
  2> start drx-onDurationTimerSL for this SL DRX group after (drx-SlotOffsetSL +N)
     from the beginning of the subframe.
```

For each SL DRX group in the RX UE, the TX UE RRC maintains the timing of RX UE DRX operation by configuring one or more of the following parameters: drx-onDurationTimerSL, drx-SlotOffsetSL, drx-InactivityTimerSL, drx-RetransmissionTimerSL (per SL HARQ process), drx-LongCycleStartOffsetSL (conditional, e.g., if drx-ShortCycleSL is configured), drx-ShortCycleSL, drx-ShortCycleTimerSL, drx-CycleSL, drx-StartOffsetSL, drx-HARQ-RTT-TimerSL (per SL HARQ process except for the broadcast process), ps-WakeupSL, ps-TransmitOtherPeriodicCSI-SL, or ps-TransmitPeriodicL1-RSRP-SL.

SL Sensing Impact to SL DRX and MAC Resource Allocation Procedure is discussed below.

In sensing-based resource (re)selection, UE 102 performs sensing with the expectation that there may be resource (re)selection any time. Considering resource (re)selection time is bounded by packet delay budget, ideally sensing should run continuously in the background. However, out of concern for battery life, it only makes sense to perform resource (re)selection when there is an expectation of a transmission of sidelink traffic. As a result, UE 102 is expected to perform sensing during DRX active time, as there is an expectation that UE 102 may perform resource (re)selection during DRX active time in support of a sidelink transmission. Additionally, sidelink traffic transmission may be triggered anytime, including outside DRX active time. Few alternatives may be considered for sensing interaction with DRX. UE 102 may only perform sensing during DRX active time or UE 102 may also perform sensing outside DRX active time. The outside DRX active time will be denoted herein interchangeably DRX sleep time, DRX OFF time, or DRX inactive time. UE 102 is in DRX active time or outside DRX active time.

Consideration outside DRX active time is discussed below.

During outside DRX active time, UE 102 may perform resource selection based on one or more of the following scenarios.

In a first scenario, sensing information may include reserved resources and SL_RSRP measurements collected the overall sensing-based resource (re-)selection procedure, including for example MAC resource TX resource (re-)selection check procedure, MAC SL grant reception and SCI transmission procedure. In another alternative, after expiry of the sensing information validity timer, UE 102 may enter DRX active time or UE 102 may enter DRX active after completion of sensing. The DRX active time may include the time while UE 102 is performing sensing. Essentially, UE 102 may use the expiry of the validity timer as a trigger for the start of the on duration timer. For example, after expiry of the sensing information validity timer, UE 102 may start DRX on duration timer. For example, after expiry of the sensing information validity timer, UE 102 may start the DRX on duration timer at a time instant T wherein T may be determined as follow:

if the [(SFN×10)+subframe number] modulo (drx-CycleSL)=drx-StartOffsetSL modulo (drx-CycleSL):

start drx-onDurationTimerSL after drx-SlotOffsetSL from the beginning of the subframe.

In a third scenario, TX resource exclusion decision may be made during DRX active time, meaning resources that are determined to be excluded from the resource candidates during DRX active time may remain excluded during outside DRX active time. In one example, the exclusion decision has no validity time or timer, meaning UE 102 may continue to exclude such resources during outside DRX active time with no further re-evaluation.

In a fourth scenario, TX resource exclusion decision may be made during DRX active time, meaning resources that are determined to be excluded from the resource candidates during DRX active time may remain excluded during outside DRX active time. In this example, the exclusion decision has a validity time or timer, meaning UE 102 may not continue to exclude such resources during outside DRX active time, after expiry of the validity timer. For example, after expiry of the validity timer, UE 102 may perform RSRP measurements and exclude some of the resources from the resources selected during DRX active time or from the candidate resource set selected during DRX active time, if the RSRP is above a configurable threshold, a threshold that is set taking into account the priority of the traffic of the sensing and the transmitting UE. The validity time or timer may also comprise how long the PHY performs no RSRP measurement for evaluation of exclusion of resources. UE 102 may resume outside DRX active time after completion of resource exclusion evaluation. In one alternative UE 102 may complete resource selection or resource selection re-evaluation before resuming outside DRX active time. One validity timer may be used to control the overall sensing-based resource (re-)selection procedure, including for example MAC resource TX resource (re-)selection check procedure, MAC SL grant reception and SCI transmission procedure. In yet another alternative, after expiry of the validity timer, UE 102 enters DRX active time or UE 102 enters DRX active time after completion of resource exclusion evaluation. The DRX active time may include the time while UE 102 is performing resource exclusion evaluation. Essentially, UE 102 may use the expiry of the validity timer as a trigger for the start of the on duration timer. For example, after expiry of the resource exclusion validity timer, UE 102 may start DRX on duration timer. For example, after expiry of the validity timer, UE 102 may start the DRX on duration timer at a time instant T wherein T may be determined as follow:

if the [(SFN×10)+subframe number] modulo (drx-Cy-cleSL)=drx-StartOffsetSL modulo (drx-CycleSL):
start drx-onDurationTimerSL after drx-SlotOffsetSL from the beginning of the subframe.

In a fifth scenario, TX resource pre-emption information collected during DRX active time. In one example scenario, the resource pre-emption information has no validity time or timer, meaning UE 102 may use the collected resource pre-emption information during DRX active time, to perform resource (re-)selection including excluding such resource from candidate resources, or anytime during outside DRX active time. For example, during the MAC TX resource (re-)selection check, the MAC may remove such resource(s) from the selected sidelink grant associated to the Sidelink process, if the resource(s) of the selected sidelink grant is indicated for re-evaluation or pre-emption by the physical layer.

In a sixth scenario, TX resource pre-emption information collected during DRX active time. In this example scenario, the resource pre-emption information has a validity time or timer, meaning UE 102 may not use the collected resource pre-emption information during DRX active time after expiry of the validity timer. For example, after expiry of the validity timer, UE 102 may measure RSRP and perform resource pre-emption evaluation. For example, UE 102 may exclude some of the resources from the resources selected during DRX active time or from the candidate resource set selected during DRX active time, if those resources are determined to be pre-empted by another transmitting UE. This might be the case for example if the measured RSRP by the UE 102 is such that, a higher priority transmission from another UE with sufficiently low SL RSRP, may occupy the resources which are reserved by UE 102 performing resource pre-emption evaluation. Similarly, following resource pre-emption evaluation after expiration of the validity timer, UE 102 may include into the selected resource set or candidate resource set, resources previously pre-empted, if those resources are determined to be no longer pre-empted by another transmitting UE, for example if the measured RSRP is such that, there is no higher priority transmission from another UE with sufficiently low SL RSRP, that may occupy the resources which are reserved by UE 102 performing resource pre-emption evaluation. The validity time or timer may also include how long the PHY performs no RSRP measurement for evaluation of pre-emption. UE 102 may resume outside DRX active time after completion of resource pre-emption evaluation. In one alternative, UE 102 may complete resource selection or resource selection re-evaluation before resuming outside DRX active time. One validity timer may be used to control the overall sensing-based resource (re-)selection procedure, including for example MAC resource TX resource (re-)selection check procedure, MAC SL grant reception and SCI transmission procedure. In yet another alternative, after expiry of the validity timer, UE 102 enters DRX active time or UE 102 enter DRX active time after completion of the resource pre-emption evaluation. The DRX active time may include the time while UE 102 is performing resource pre-emption evaluation. Essentially, UE 102 may use the expiry of the validity timer as a trigger for the start of the on duration timer. For example, after expiry of the validity timer for a resource pre-emption decision, UE 102 may start DRX on duration timer. For example, after expiry of the validity timer, UE 102 may start the DRX on duration timer at a time instant T wherein T may be determined as follow:

if the [(SFN×10)+subframe number] modulo (drx-Cy-cleSL)=drx-StartOffsetSL modulo (drx-CycleSL):
start drx-onDurationTimerSL after drx-SlotOffsetSL from the beginning of the subframe.

In a seventh scenario, TX resource selection re-evaluation performed during RX active time. In one example, the resource re-evaluation outcome has no validity time timer, meaning UE 102 may use the outcome of the candidate resource re-evaluation performed during the DRX active time, to perform resource (re-)selection including excluding re-evaluated resources from candidate resources, anytime in outside DRX active time. For example, any time in outside DRX active time, during the MAC TX resource (re-)selection check, the MAC may remove such resource(s) from the selected sidelink grant associated to the Sidelink process, if the resource(s) of the selected sidelink grant is indicated for re-evaluation or pre-emption by the physical layer.

In an eighth scenario, TX resource selection re-evaluation decisions made during DRX active time, meaning resources that are determined to be excluded from the resource candidates during DRX active time as a result of resource selection re-evaluation during DRX active time may remain excluded during outside DRX active time. In this example scenario, the exclusion decision has a validity time or timer, meaning UE 102 may not continue to exclude such resources during outside DRX active time, after expiry of the validity timer. For example, before transmission, UE 102 may re-evaluate resources selected during DRX active time, or candidate resource set selected during DRX active time. The validity time or timer may also comprise how long the PHY performs no re-evaluation of candidate resource set selected during DRX active time. After expiry of the validity timer, UE 102 may wake-up from DRX, re-evaluate resource selection, and resume Outside DRX active time after completion of the re-evaluation of the selected resources or the candidate resources. One validity timer may be used to control the overall sensing-based resource (re-)selection procedure, including for example MAC resource TX resource (re-)selection check procedure, MAC SL grant reception and SCI transmission procedure. In another alternative, after expiry of the validity timer, UE 102 enters DRX active time, or UE 102 enter DRX active time after completion of re-evaluation of resource selection. The DRX active time may include the time while UE 102 is performing resource selection re-evaluation. Essentially, UE 102 may use the expiry of the validity timer as a trigger for the start of the on duration timer. For example, after expiry of the validity timer, UE 102 may start DRX on duration timer. For example, after expiry of the sensing information validity timer, UE 102 may start the DRX on duration timer at a time instant T wherein T may be determined as follows:

> if the [(SFN×10)+subframe number] modulo (drx-Cy-cleSL)=drx-StartOffsetSL modulo (drx-CycleSL):
> start drx-onDurationTimerSL after drx-SlotOffsetSL from the beginning of the subframe.

In a ninth scenario, TX resource selected or candidate resources may be selected during DRX active time. In one example, the resource selected, or candidate resources selected during DRX active time has no validity time or timer, meaning UE 102 may use the resource selected or candidate resources selected during DRX active time, in outside DRX time. For example, the MAC may use the resources indicated by PHY layer during DRX active time, to determine SL grant during MAC SL grant reception and SCI transmission procedure for SL-SCH data transmission, any time during outside DRX active time. The PHY may indicate to the MAC, candidate resources selected during DRX active time, any time during outside DRX active time.

In a tenth scenario, TX resource selected or candidate resources may be selected during DRX active time. In this example scenario, the resource selected, or candidate resources selected during DRX active time has a validity time or timer, meaning UE 102 may not use the resource selected or candidate resources selected during DRX active time, in outside DRX time after expiry of the validity timer. The validity timer may comprise how long UE 102 perform no resource selection or candidate resource selection. For example, after the expiry of the validity timer, the MAC may not use the resources indicated by PHY layer during DRX active time, to determine SL grant during MAC SL grant reception and SCI transmission procedure for SL-SCH data transmission. Similarly, after the expiry of the validity timer, the PHY may not indicate to the MAC, candidate resources selected during DRX active time. after expiry of the validity timer, UE 102 may wake-up from DRX, perform resource (re-)selection or candidate resource set selection, and resume Outside DRX active time after completion of the selection of resources or candidate resources. One validity timer may be used to control the overall sensing-based resource (re-)selection procedure, including for example MAC resource TX resource (re-)selection check procedure, MAC SL grant reception and SCI transmission procedure. In another alternative, after expiry of the validity timer, UE 102 enters DRX active time, or UE 102 enters the DRX active time after completion of resource (re-)selection or completion of the candidate resource set. The DRX active time may include the time while UE 102 is performing resource (re-)selection or determination of candidate resource set. Essentially, UE 102 may use the expiry of the validity timer as a trigger for the start of the on duration timer. For example, after expiry of the validity timer, UE 102 may start DRX on duration timer. For example, after expiry of the validity timer, UE 102 may start the DRX on duration timer at a time instant T wherein T may be determined as follow:

> if the [(SFN×10)+subframe number] modulo (drx-Cy-cleSL)=drx-StartOffsetSL modulo (drx-CycleSL):
> start drx-onDurationTimerSL after drx-SlotOffsetSL from the beginning of the subframe.

In one example, UE 102 in outside DRX active time may not clear the sensing information, the resource selection re-evaluation information, resource exclusion information resource preemption information, the candidate resource set, or the selected resources for transmission determined during the DRX active time. UE 102 may keep and use this information, during the outside DRX active time, or in subsequent DRX active time. In another example, a validity time or timer is associated with the sensing-based resource (re-)selection information (e.g., the information comprising of the sensing information, the resource selection re-evaluation information, resource exclusion information resource preemption information, the candidate resource set, or the selected resources for transmission determined during the DRX active time). The UE may not use this information after the expiry of the validity timer.

In yet another example, UE 102 may clear this information after entering the outside DRX active time. In this case, UE 102 may wake up a pre-determined amount of time before the beginning of the on-duration time to perform sensing procedure. The pre-determined amount of time may be configurable or may be fixed by specification. In another embodiment, UE 102 may perform sensing if resource (re-)selection is triggered before performing resource (re-) selection. Alternatively, UE 102 may randomly select resource from the allowed candidate pool of resources. The allowed candidate pool of resource may be determined based on RRC configuration, taking into account the QoS attributes of the traffic such as priority, latency, congestion control criteria based on CBR measurement versus configured CBR threshold, CR measurement versus configured CR threshold, or RSRP measurement versus RSRP threshold-based resource exclusion.

The support of these outside DRX Active time behaviors described herein, might be (pre)configured or provisioned into UE 102, and subject to one or more UE capability variable. The configuration may be via AS signaling such as RRC signaling or may be via upper layer signaling for example NAS or sidelink upper layer signaling (e.g., V2X layer signaling). UE 102 may signal to the network one or more capability information with respect to any of the behaviors described above. Similarly, the network (e.g., base station) may signal in common signaling (e.g., broadcast) or dedicated signaling, the support by the network of any of the behaviors described above. The capability signaling may be an RRC signaling or a NAS signaling.

Consideration during DRX active time is discussed below.

After transition from outside active DRX time into DRX active time, for example after UE 102 starts the on-duration timer, UE 102 may do one or more of the following actions. A first action may be to perform re-evaluation of resource selection. A second action may be to transmit information about resources that are selected or reserved or candidate resource set to assist other UEs in their sensing procedure. This information may be transmitted in the first-stage SCI.

A third action may be to cancel the reserved resources whose occasions in time domain are within T3 duration after the start of the on-duration timer, or equal to T3 duration after the start of the on-duration timer. A purpose of this cancellation may be to avoid using for transmission, reserved resources that might have been pre-empted by other UEs, while this UE was in outside DRX active time, e.g., reserved resources that might have been pre-empted by other UEs but whose announcement in first-stage SCI has been missed by this UE, while it was in outside DRX active time. See T3 definition in FIG. 8. The T3 duration is the cut-off time after which reserved resources by neighboring UEs with reservation time at T3 or after T3 from the beginning of the on-duration time will be known to this UE, with enough time to perform resource selection re-evaluation and new selection of resources if needed, for example if those resources reserved by neighboring UEs were to pre-empt this UE's own reserved resources. A fourth action may be if a sensing procedure or resource (re-)selection is underway, complete the procedure before entering outside DRX active time.

At the expiry of SL HARQ RTT timer, UE 102 may perform one or more of the actions described above (e.g., the same actions as when UE 102 starts the SL on-duration timer).

At the expiry of the SL on-duration timer, or the SL DRX inactivity timer, or the SL retransmission timer, UE 102 may perform one or more the following actions.

In a first action, UE 102 may not clear the sensing information, the resource selection re-evaluation information, resource exclusion information resource preemption information, the candidate resource set, or the selected resources for transmission determined during the DRX active time. UE 102 may keep and use this information during the DRX active time. In another example, a validity time or timer is associated with the sensing-based resource (re-)selection information (e.g., the information comprising of the sensing information, the resource selection re-evaluation information, resource exclusion information resource preemption information, the candidate resource set, or the selected resources for transmission determined during the DRX active time). UE 102 may use this information after the expiry of the validity timer.

In a second action, UE 102 may clear this information. In this case, UE 102 may wake up a pre-determined amount of times before the beginning of the on-duration time to perform sensing procedure. The pre-determined amount of time may be configurable or may be fixed by specification. In another example, UE 102 may perform sensing if resource (re-)selection is triggered before performing resource (re-)selection. Alternatively, UE 102 may randomly select resource from the allowed candidate pool of resources. The allowed candidate pool of resource may be determined based on RRC configuration, taking into account the QoS attributes of the traffic such as priority, latency, congestion control criteria based on CBR measurement versus configured CBR threshold, CR measurement versus configured CR threshold, or RSRP measurement versus RSRP threshold-based resource exclusion.

In a third action, if a sensing procedure or resource (re-)selection is underway, compete the procedure before entering outside DRX active time.

The support of UE 102 behaviors described herein in DRX active time, might be (pre)configured or provisioned into UE 102, and subject to one or more UE capability variables. The configuration may be via AS signaling such as RRC signaling or may be via upper layer signaling for example NAS or V2X layer signaling. UE 102 may signal to the network one or more capability information with respect to any of the behaviors described above. Similarly, the network (e.g., base station) may signal in common signaling (e.g., broadcast) or dedicated signaling, the support by the network of any of the behaviors described above. The capability signaling may be an RRC signaling or a NAS signaling.

Support and handling of SL HARQ RTT and SL retransmission timer is discussed below.

After a pre-emption event of selected resources or candidate resources or after re-evaluation of selected resources or candidate resources leading to change in resource selection or in change of candidate resource set, UE 102 may perform the following actions.

A first action may be to extend SL HARQ RTT time or timer. The extension may be equal or greater than the amount of time between the occasion in time domain, of the SL HARQ retransmission resource that was pre-empted or discarded as a result of resource selection re-evaluation, and the occasion in time domain, of next available resource for SL HARQ retransmission. Here UE 102 is allowed to continue to sleep if a SL HARQ retransmission resource is pre-empted or discarded.

A second action may be to restart SL HARQ RTT time or timer or start SL HARQ RTT time or timer at expiry of SL HARQ RTT timer for each occurrence in time domain, where SL HARQ retransmission resource is pre-empted or discarded, or until SL retransmission timer expires. UE 102 is allowed to continue to sleep or return to sleep if a SL HARQ retransmission resource is pre-empted or discarded.

A third action may be to shorten the SL retransmission timer, for example by the amount of time the SL HARQ RTT timer has been extended or the additional amount of time the SL HARQ RTT timer has run for to account for the impact of pre-emption or discarding of SL HARQ retransmission resources.

In one example, both the SL HARQ RTT timer and the SL retransmission timer are supported. In another example, the SL HARQ RTT timer is supported but the SL retransmission timer is not supported. In one embodiment, the SL HARQ RTT timer value is not explicitly configured into UE 102 but is rather implicitly derived by UE 102 based on the time domain occasion of the resources reserved for SL HARQ retransmission(s). For example, UE 102 may set the SL HARQ RTT timer to the periodicity or the minimum time value between occasions in time domain of the resource reserved for SL transmission or for SL HARQ RTT retransmissions. Similarly, the SL retransmission timer may not be explicitly configured into UE 102 but is rather implicitly derived by UE 102 based on the time domain occasion of the resources reserved for SL HARQ retransmission(s). For example, UE 102 may set the SL retransmission timer to match the last occasions in time domain of the resource reserved for SL transmission or for SL HARQ RTT retransmissions.

To enable the interactions between sensing procedure and DRX procedure described herein, the MAC may provide an indication to PHY on the DRX procedure state, and the PHY may provide an indication to MAC, on the sensing procedure state. For example, the MAC may provide indication to PHY about one or more of the following: DRX Active time, Outside DRX Active time, transition from DRX Active to Outside DRX Active, or transition from Outside DRX Active time to DRX Active time. Similarly, for example, the PHY may provide indication to MAC about one or more of the following: collected sensing information, sensing information collection pending, selected candidate resources, candidate resource selection pending, re-evaluated resource, or resource re-evaluation pending, or (re-)selected resources, or resource (re-)selection pending.

Behavior when TX UE or RX UE is (pre)configured SL with resource allocation which is not within the active time of the TX/RX UE is discussed below.

When a TX UE or an RX UE receives from the network (a base station 121, a relay, an RSU 123a, a UE 102, or a core network node such as an AMF node 172, V2X control function node, a prose function node, or equivalent sidelink like service control function node), SL resource grant which is not within the SL DRX active time, UE 102 may do one or more of the following ignore actions, among other things.

An ignore action may be to ignore DRX (e.g., remain awake) use the resource grant and transition into outside DRX if still within the SL DRX cycle.

An ignore action may be to ignore DRX (e.g., remain awake). In one example, UE 102 may use the resource grant and transition into outside DRX if still within the SL DRX cycle. In another example, UE 102 may use the resource grant, and remains awake e.g., in DRX active time until next SL DRX cycle. The decision to remain awake is made based on the priority of the traffic, signaling or MAC CE that would use the grant. For example, a priority threshold may be configured into UE 102 by the network (e.g. base station, a relay, an RSU, a UE, or a core network node such as an AMF node, V2X control function node, a Prose function node or equivalent sidelink alike service control function node), the lower the priority value, the higher the priority of the traffic (e.g. an increasing priority value indicates a lower priority level). In one example, UE 102 may ignore the DRX and remain in the DRX active time if the priority value of the traffic that will use the grant is below or equal to the priority threshold. In another example, UE 102 may ignore the DRX and remain in the DRX active time if the priority value of the traffic that will use the grant is below the priority threshold.

An ignore action may be to ignore the received SL resource grant which belongs to the outside DRX active time.

An ignore action may be to ignore the received SL resource grant which belongs to the outside DRX active time based on the priority or the traffic, signaling, or MAC CE. For example, a priority threshold may be configured, the lower the priority value the higher the priority of the traffic, e.g., an increasing priority value indicates a lower priority level. In one example, UE 102 may ignore the received SL grant and remain in the DRX active time if the priority value of the traffic that will use the grant is above or equal to the priority threshold. In another example, UE 102 may ignore the received SL grant and remain in the DRX active time if the priority value of the traffic that will use the grant is above the priority threshold.

Use of Assistance Information for the Determination of SL DRX Configuration is discussed below.

UE 102 may receive multiple assistance information sets to assist UE 102, or to assist UE 102 in coordination with the serving base station 121 when applicable, or to assist the base station 121 when applicable, in the determination of UE SL DRX configuration. Alternatively, a UE may be configured with multiple DRX configuration sets, for e.g., from its serving base station 121, or as an assistance information from its peer sidelink UEs, e.g., other UEs, this UE has sidelink communication with or may engage in sidelink communication with. Similarly, a base station 121, an RSU, a gNB, a relay node, an IAB node including parent node or child node, or any other RAN node, may receive multiple assistance information sets as assistant information for the determination of SL DRX configuration. For example, UE 102 may be configured with one or more SL DRX configuration sets per PC5 unicast link, per sidelink service (e.g. V2X service), per Destination Layer-2 ID (e.g., multicast, broadcast, or unicast), per PQI, or per resource pool. The issue of which DRX configuration set UE 102 uses as described herein (e.g., use of Assistance Information for the Determination of SL DRX Configuration) need to be addressed. UE 102 may use one or more of the following rules to decide which DRX configuration set to use.

A first rule may be associated with UE 102 selecting as a SL assistance information or as SL DRX configuration for the determination of the UE SL DRX configuration, the received assistance information or SL DRX configuration with the highest priority. In case of a tie of the priority value, UE 102 randomly selects one of the SL assistance information or SL DRX configuration set with the highest priority as the SL assistance information or SL DRX configuration to use for the determination of the UE SL DRX configuration, e.g., UE 102 randomly selects one of the SL assistance information or DRX configuration set with the lowest priority value, as the SL assistance information or SL DRX configuration to use for the determination of the UE SL DRX configuration.

A second rule may be associated with UE 102 selecting a SL DRX configuration based on the received assistance information or DRX configuration with a priority above a priority threshold. In case of a tie, UE 102 selects as an assistance information or as a SL DRX configuration for the determination of the UE SL DRX configuration, the received SL assistance information or SL DRX configuration with the highest priority among the SL assistance information or SL DRX configuration with a priority above a priority threshold. If none of the SL assistance information or SL DRX configuration information has a priority above the priority threshold, or none of the SL assistance information or SL DRX configuration has an associated priority, UE 102 may randomly select a SL assistance information or SL DRX configuration, among the SL assistance information or the SL DRX configurations. In one embodiment, if a SL assistance information or DRX configuration information is not associated with a priority, UE 102 may assign a default priority value to that SL assistance information or SL DRX configuration.

A third rule may be associated with UE 102 selecting a SL assistance information or SL DRX configuration to use for the determination of the UE SL configuration, based on pre-defined rules for example rules that are captured herein. For example, UE 102 may use one or more of the following rules. An example rule may be for UE 102 to select SL assistant information or SL DRX configuration to use for the determination of the UE SL DRX configuration, the SL assistance information or the SL DRX configuration configured into UE 102 by its serving base station.

Another example rule may be the selection of SL assistant information or SL DRX configuration to use for the determination of the UE SL DRX configuration, a common SL assistant information or a SL DRX configuration information, assuming a common SL assistant information or SL DRX configuration information is configured into UE 102. For example, a sidelink assistance information, or a SL DRX configuration information associated with a common reception resource pool may be configured into UE 102. UE 102 may use such a common SL assistance information or SL DRX configuration when the associated resource pool is in use. In another example, a sidelink assistance information, or a SL DRX configuration information associated with a common transmit resource pool may be configured into UE 102. UE 102 may use such a common SL assistance information or SL DRX configuration when the associated resource pool is in use.

Another example rule may be that the UE 102 selects SL assistant information or SL DRX configuration to use for the determination of the UE SL DRX configuration, on the basis of communication cast type. For example, UE 102 may prioritize SL assistant information, or SL DRX configuration associated with a unicast communication over that of multicast or broadcast communication. Similarly, UE 102 may prioritize SL assistant information, or SL DRX configuration associated with a multicast communication over that of broadcast communication.

UE 102 may determine the priority of a SL assistance information used in the determination of DRX communication or the priority of a SL DRX configuration used as assistant information in the determination of which SL DRX configuration according to one or more of the following: 1) Explicit priority (pre)configured into UE 102, as part of the configuration of the SL assistance information or the SL DRX configuration; 2) Explicit priority provisioned into UE 102, as part of the provisioning of the SL assistance information or the SL DRX configuration; or 3) Implicit priority determination.

With reference to implicit priority determination, UE 102 may implicitly determine the priority of a SL DRX configuration based on one or more of the following.

may be achieved by basing the SL DRX configuration on the PQI of the V2X service. In such a case, the SL DRX granularity is said to be per PQI.

However, the SL DRX configuration may be determined based on some known value, known to both the RX UE and TX UE. For the case the V2X service has a standardized PQI, this value may be the PQI value as defined in TS 23.287 clause 5.4.4. In the case V2X services have a non-standardized PQI, no PQI value is defined. Consequently, the TX UE and RX UE do not know the value on which to base the SL DRX configuration. The PQI value may be added for the non-standardized PQI case. The non-standard PQI may be defined with an associated PQI value. The V2X layer may provide the associated PQI and the PC5 QoS parameters to the access stratum. The SL DRX configuration may be based on this associated PQI value. The SL-PQI IE may be modified to include the PQI value, as shown below

```
SL-PQI-r16 ::= CHOICE {
    sl-StandardizedPOI-r16              INTEGER (0..255),
    sl-Non-StandardizedPQI-r16             SEQUENCE {
        sl-nonStandardizedPQI-r16              INTEGER (0..255),
        sl-ResourceType-r16                ENUMERATED {gbr, non-GBR,
        delayCriticalGBR, spare1}           OPTIONAL, -- Need R
        sl-PriorityLevel-r16               INTEGER (1..8)      OPTIONAL, -
        - Need R
        sl-PacketDelayBudget-r16                INTEGER
        (0..1023)                       OPTIONAL, -- Need R
        sl-PacketErrorRate-r16                  INTEGER
        (0..9)                          OPTIONAL, -- Need R
        sl-AveragingWindow-r16                  INTEGER
        (0..4095)                       OPTIONAL, -- Need R
        sl-MaxDataBurstVolume-r16                INTEGER
        (0..4095)                       OPTIONAL, -- Need R
        ...
    }
}
}
```

UE 102 may implicitly determine the priority based on the priority of a Layer-2 Destination ID. The priority of a layer 2 destination may be (pre)configured into UE 102 or provisioned into UE 102.

UE 102 may implicitly determine the priority based on the priority of the cast type. The priority of a cast type may be (pre)configured into UE 102 or provisioned into UE 102.

UE 102 may implicitly determine the priority based on the priority of the resource pool associated with the SL assistance information or the SL DRX configuration. The priority of a resource pool may be (pre)configured into UE 102 or provisioned into UE 102.

UE 102 may implicitly determine the priority based on the priority of the PQI associated with the SL assistance information or the SL DRX configuration. The priority of a PQI may be (pre)configured into UE 102 or provisioned into UE 102.

UE 102 may implicitly determine the priority based on the priority of the service or service type associated with the SL assistance information or the SL DRX configuration. The priority of a service or service type may be (pre)configured into UE 102 or provisioned into UE 102.

UE 102 may implicitly determine the priority based on the priority of the unicast link associated with the SL assistance information or the SL DRX configuration. The priority of a unicast link may be (pre)configured into UE 102 or provisioned into UE 102.

SL DRX Granularity for Groupcast and Broadcast

For sidelink groupcast and broadcast, the TX UEs and the RX UEs need to have the same SL DRX configuration. This Alternatively, the known value may be based on one or more of the existing fields in the sl-Non-StandardizedPQI-r16. For example, the value may be the SL-PriorityLevel, or the sl-PacketErrorRate, etc. Or the value may be based on some combination of the existing fields In addition, a SL DRX configuration may also be used for initial connection establishment signaling (e.g., for the Direct Communication Request). In such cases, the value to use for the SL DRX configuration is not known. This value may be set to the PQI of the unicast V2X service for which the initial connection establishment signaling is being sent. However, this may imply that UE 102 would have many SL DRX configurations to monitor reception of incoming Direct Communication Requests. Alternatively, the network may fix/standardize a default PQI value for the initial connection establishment signaling. This value may be different from the PQI value of the unicast V2X service. This may be one of the provisioning parameters for V2X communications over PC5 reference point. UE 102 may be provisioned with the mapping of V2X service types to default PQI for initial signaling to establish unicast connection. This mapping of V2X service types to default PQI may also be part of the sidelink preconfiguration. The TX UE and RX UE would use the default PQI for determining the SL DRX configuration for the initial connection establishment signaling. Configuration Signaling The support of device behaviors described herein, may be controlled by parameters (e.g., DRX configuration parameters) described herein, wherein the parameters may be configured into the device or preconfigured into the device or provisioned into the device. Moreover, the support of the device behaviors described herein may be controlled by one or more UE capability variables. The configuration of these parameters may be via AS signaling such as RRC signaling, MAC CE signaling, a combination of RRC and MAC signaling, a combination of RRC and PHY, signaling, a combination of MAC and PHY signaling, a combination of RRC, MAC, and PHY signaling, or may be via upper layer signaling for example NAS or sidelink upper layer signaling (e.g., V2X layer signaling). For a device in coverage, the device may use configuration parameters signaled to the device by the network through RRC system information broadcast for example for devices in RRC Idle or RRC Inactive state, or the configuration may be signaled to the device by the network through RRC dedicated signaling. For devices in out-of-coverage, the device may use configuration parameters preconfigured or provisioned into the device. The device may signal to the network one or more capability information with respect to any of the behaviors described herein. Similarly, the network (e.g., base station) may signal in common signaling (e.g., broadcast) or dedicated signaling, the support by the network of any of the behaviors described above. The capability signaling may be through an RRC signaling or a NAS signaling.

The NR sidelink SIB12 may be expanded to include one or more of the parameters described herein (e.g., DRX configuration parameter) for the control of the UE behaviors. An IE SL-DRX-Config like the NR DRX-Config IE signaled to UE 102 for example in the MAC-CellGroupConfig IE as defined in 38.331, but including configuration parameters for the control of UE behaviors as described herein, may be included into the SL-ConfigDedicatedNR IE as part of RRCReconfiguration message.

The current UECapabilityInformationSidelink message included in the SidelinkUEinformationNR message as part of the sl-CapabilityInformationSidelink IE, and used in the legacy NR to transfer UE radio access capabilities to the network for unicast sidelink communication may be extended to include the UE capability information for the UE behaviors described herein, for example as it relates to unicast sidelink communication. In another example, Dedicated IE, or message for capability information as it relates to the UE behaviors as described herein, may be included into the UECapabilityInformationSidelink message, for unicast sidelink communication, groupcast sidelink communication, or broadcast sidelink communication.

The UE behaviors controlling parameters described herein may be configured into UE 102 using RRC signaling or preconfigured or provisioned into UE 102, and then activated for use, through MAC CE or PHY DCI signaling. In another example, UE behaviors controlling parameters described herein may be configured into UE 102 using RRC signaling or preconfigured or provisioned into UE 102, activated by MAC CE, and then brought into use by PHY DCI signaling.

It is understood that the entities performing the steps illustrated herein may be one or more logical or physical entities. The steps may be stored in a memory of, and executing on a processor of, a device, server, or computer system such as those illustrated in FIG. 10F or FIG. 10G. Skipping steps, combining steps, or adding steps between exemplary methods disclosed herein is contemplated. Table 5 provides exemplary abbreviations and definitions.

TABLE 5

| Abbreviations and Definitions | |
|---|---|
| Abbreviations | Definitions |
| 3GPP | 3rd Generation Partnership Project |
| 5QI | 5G QoS Identifier |
| AI-RNTI | Availability Indication RNTI |
| AR/VR | Augmented Reality/Virtual Reality |
| AS | Access Stratum |
| BWP | Bandwidth Part |
| CBR | Channel Busy Ratio |
| CCH | Control Channel |
| C-DRX | Connected mode DRX |
| CE | Control Element |
| CR | Channel usage Ratio |
| C-RNTI | Cell Radio-Network Temporary Identifier |
| CI-RNTI | Cancellation Indication RNTI |
| CS-RNTI | Configured Scheduling RNTI |
| CSI | Channel State Information |
| DCI | Downlink Control Information |
| DCP | DCI with CRC scrambled by PS-RNTI |
| DFN | Direct Frame Number |
| DL | Downlink |
| DRX | Discontinuous Reception |
| gNB | NR NodeB |
| GNSS | Global Navigation Satellite System |
| HARQ | Hybrid Automatic Repeat request |
| ID | Identity or IDentifier |
| IE | Information Element |
| INT-RNTI | Interruption RNTI |
| ITS-AID | Intelligent Transport Systems Application Identifier |
| LDM | Local Dynamic Map |
| LTE | Long Term Evolution |
| MAC | Medium Access Control |
| MCS | Modulation and Coding Scheme |
| NR | New Radio |
| PDB | Packet Delay Budget |
| PDCCH | Physical Downlink Control Channel |
| PDCP | Packet Data Convergence Protocol |
| PDU | Protocol Data Unit |
| PPPP | ProSe Per Packet Priority |
| P-UE or PUE | Pedestrian UE |
| PSCCH | Physical Sidelink Control Channel |
| PSFCH | Physical Sidelink Feedback Channel |
| PSSCH | Physical sidelink shared channel |
| PQI | PC5 5QI |
| PUCCH | Physical Uplink Control Channel |
| PUSCH | Physical Uplink Shared Channel |
| PHY | Physical Layer |
| PRB | Physical Resource Block |
| Qos | Quality of Service |
| RAN | Radio Access Network |
| RB | Resource Block |
| RNTI | Radio Network Temporary Identifier |
| RRC | Radio Resource Control |
| RS | Reference Signal |
| RSRP | RS Received Power |
| RSU | Road Side Unit |
| RTU | Radio Time Unit |
| RTT | Round Trip Time |
| RX | Receive, or Transmitter |
| SCCH | Sidelink Control Channel |
| SCH | Shared Channel |
| SCI | Sidelink Control Information |
| SCP | SCI with CRC scrambled by SL-PS-RNTI |
| SFI-RNTI | Slot Format Indication RNTI |
| SFN | System Frame Number |
| SL | SideLink |
| SLCS-RNTI | Sidelink Configured Scheduling RNTI |
| SP-CSI-RNTI | Semi-Persistent CSI RNTI |
| STCH | Sidelink Traffic Channel |
| TB | Transport Block |
| TX | Transmit, Transmitter |
| TPC-PUCCH-RNTI | Transmit Power Control PUCCH RNTI |
| TPC PUSCH-RNTI | Transmit Power Control PUSCH RNTI |
| TPC-SRS-RNTI | Transmit Power Control-Sounding Reference Symbols-RNTI |
| UE | User Equipment |

TABLE 5-continued

Abbreviations and Definitions

| Abbreviations | Definitions |
| --- | --- |
| UL | Uplink |
| V2P | Vehicle-to-Pedestrian |
| V2X | Vehicle-to-Everything |

Figure 9:
FIG. 9 illustrates an exemplary display (e.g., graphical user interface) that may be generated based on the methods, systems, and devices for NR Sidelink Discontinuous Reception.

FIG. 9 illustrates an exemplary display (e.g., graphical user interface) that may be generated based on the methods, systems, and devices for NR sidelink discontinuous reception, as discussed herein. Display interface 901 (e.g., touch screen display) may provide text in block 902 associated with NR sidelink discontinuous reception. Progress of any of the steps (e.g., sent messages or success of steps) discussed herein may be displayed in block 902. In addition, graphical output 902 may be displayed on display interface 901. Graphical output 903 may be the topology of the devices implementing the methods, systems, and devices for NR sidelink discontinuous reception, a graphical output of the progress of any method or systems discussed herein, or the like.

FIG. 11 is an exemplary method for NR SL DRX. At step 220, a first apparatus or a second apparatus may receive an indication to start a DRX procedure. At step 221, a first apparatus (e.g., WTRU 102e or base station 114a) may send a second apparatus (e.g., WTRU 102e or base station 114a), configuration parameters for the control (e.g., use) of a discontinuous reception procedure. The configuration parameters may be sent in response to a received request (which may be based on a trigger event) to start a DRX procedure. The configuration parameters may include drx-onDurationTimerSL, drx-SlotOffsetSL, or other parameters herein (e.g., Table 2). The configuration parameters may include a common SL DRX parameter set and a dedicated SL DRX configuration parameter set. The configuration parameters may include a SL DRX group. The SL DRX group may be a group of sidelink communications or a group of sidelink communication resources with the same SL DRX active time. The group of sidelink communications may include a unicast communication, a multicast communication, or broadcast communication. The group of sidelink communication resources may include a group of component carriers, a group of carrier frequencies, or a group of services. The group of sidelink communication resources may include a group of resource pools or a group of bandwidth parts. The configuration parameters for the control of the DRX procedure may be preconfigured in the first apparatus.

The first apparatus or second apparatus may perform the DRX procedure using the configuration parameters, which may include executing one or more of step 221-step 225.

At step 222, the first apparatus or second apparatus may determine the duration at the beginning of the SL DRX cycle or the duration after the PUCCH occasion carrying the first-stage SL control information configured for a SL DRX group is running.

At step 223, the first apparatus or second apparatus may determine a timer prescribed for the maximum duration until a SL retransmission is received is running for a SL communication or a sidelink (SL) communication resource in a SL DRX group.

At step 224, the first or second apparatus may determine a SL Scheduling Request configured for a SL communication or for a SL communication resource in the DL DRX group is sent on a SL PUCCH and is pending.

At step 225, in response to determining step 222, step 223, ore step 224, then sending an indication of time in an active time for a SL communication or SL communication resources in a SL DRX group.

FIG. 12 is an exemplary method for NR SL DRX. At step 230, WTRU 102e may receive from a device (e.g., WTRU 102d or base station 114a) configuration parameters for a first sidelink (SL) discontinuous reception (DRX) group. The configuration parameters may include a common SL DRX parameter set or a first dedicated SL DRX configuration parameter set which is for the first SL DRX group.

With continued reference to step 230, the first dedicated SL DRX configuration parameter set may include one or more timers for SL, such as an on-duration timer or inactivity timer, among other things (e.g., other parameters herein as disclosed in Table 2). The on-duration timer may be for at the beginning of a sidelink DRX cycle of WTRU 102e. The inactivity timer may be for after an occasion of a physical sidelink control channel (PSCCH) carrying a first-stage SL control information (SCI) that indicates a new sidelink transmission for a media access control (MAC) entity of WTRU 102e. The inactivity timer may be for after an occasion of a physical sidelink shared channel (PSSCH) carrying a second-stage SCI indicates a new sidelink transmission for the MAC entity of WTRU 102e.

At step 231, WTRU 102e may receive from a device (e.g., WTRU 102d or base station 114a) configuration parameters for a second sidelink (SL) discontinuous reception (DRX) group. The configuration parameters may include the common SL DRX parameter set of step 230 or a second dedicated SL DRX configuration parameter set which is for the second SL DRX group.

At step 232, WTRU 102e may Tra for receiving information on the sidelink based on the configuration parameters for the first sidelink DRX group, and in a second sidelink active time for receiving information on the sidelink based on the configuration parameter for the second sidelink DRX group. At step 233, WTRU 102e may indicate that it is to remain awake (e.g., receive) based on the determination of step 232 and listen for communications.

The disclosed subject matter may allow for the ability for a WTRU (e.g., a UE) to have separate sidelink configuration parameters in which the WTRU may access to determine when to be active and when to be asleep depending on which communication the WTRU is engaging in (e.g., for example, different groupings for different traffic profiles for SL communication).

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), LTE-Advanced standards, and New Radio (NR), which is also referred to as "5G". 3GPP NR standards development is expected to continue and include the definition of next generation radio access technology (new RAT), which is expected to include the provision of new flexible radio access below 7 GHz, and the provision of new ultra-mobile broadband radio access above 7 GHz. The flexible radio access is expected to include a new, non-backwards compatible radio access in new spectrum below 6 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 7 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (eMBB) ultra-reliable low-latency Communication (URLLC), massive machine type communications (mMTC), network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, virtual reality, home automation, robotics, and aerial drones to name a few. All of these use cases and others are contemplated herein.

FIG. 10A illustrates an example communications system 100 in which the methods and apparatuses of NR sidelink discontinuous reception, such as the systems and methods illustrated in FIG. 1 through FIG. 8 described or claimed herein may be used. The communications system 100 may include wireless transmit/receive units (WTRUs) 102a, 102b, 102c, 102d, 102e, 102f, or 102g (which generally or collectively may be referred to as WTRU 102 or WTRUs 102 or referred herein as UE 102). The communications system 100 may include, a radio access network (RAN) 103/104/105/103b/104b/105b, a core network 106/107/109, a public switched telephone network (PSTN) 108, the Internet 110, other networks 112, and Network Services 113. Network Services 113 may include, for example, a V2X server, V2X functions, a ProSe server, ProSe functions, IoT services, video streaming, or edge computing, etc.

It will be appreciated that the concepts disclosed herein may be used with any number of WTRUs, base stations, networks, or network elements. Each of the WTRUs 102a, 102b, 102c, 102d, 102e, 102f, or 102g may be any type of apparatus or device configured to operate or communicate in a wireless environment. Although each WTRU 102a, 102b, 102c, 102d, 102e, 102f, or 102g may be depicted in FIG. 10A, FIG. 10B, FIG. 10C, FIG. 10D, FIG. 10E, or FIG. 10F as a hand-held wireless communications apparatus, it is understood that with the wide variety of use cases contemplated for 5G wireless communications, each WTRU may comprise or be embodied in any type of apparatus or device configured to transmit or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, bus, truck, train, or airplane, and the like.

The communications system 100 may also include a base station 114a and a base station 114b. In the example of FIG. 10A, each base stations 114a and 114b is depicted as a single element. In practice, the base stations 114a and 114b may include any number of interconnected base stations or network elements. Base stations 114a may be any type of device configured to wirelessly interface with at least one of the WTRUs 102a, 102b, and 102c to facilitate access to one or more communication networks, such as the core network 106/107/109, the Internet 110, Network Services 113, or the other networks 112. Similarly, base station 114b may be any type of device configured to wiredly or wirelessly interface with at least one of the Remote Radio Heads (RRHs) 118a, 118b, Transmission and Reception Points (TRPs) 119a, 119b, or Roadside Units (RSUs) 120a and 120b to facilitate access to one or more communication networks, such as the core network 106/107/109, the Internet 110, other networks 112, or Network Services 113. RRHs 118a, 118b may be any type of device configured to wirelessly interface with at least one of the WTRUs 102, e.g., WTRU 102c, to facilitate access to one or more communication networks, such as the core network 106/107/109, the Internet 110, Network Services 113, or other networks 112

TRPs 119a, 119b may be any type of device configured to wirelessly interface with at least one of the WTRU 102d, to facilitate access to one or more communication networks, such as the core network 106/107/109, the Internet 110, Network Services 113, or other networks 112. RSUs 120a and 120b may be any type of device configured to wirelessly interface with at least one of the WTRU 102e or 102f, to facilitate access to one or more communication networks, such as the core network 106/107/109, the Internet 110, other networks 112, or Network Services 113. By way of example, the base stations 114a, 114b may be a Base Transceiver Station (BTS), a Node-B, an eNode B, a Home Node B, a Home eNode B, a Next Generation Node-B (gNode B), a satellite, a site controller, an access point (AP), a wireless router, and the like.

The base station 114a may be part of the RAN 103/104/105, which may also include other base stations or network elements (not shown), such as a Base Station Controller (BSC), a Radio Network Controller (RNC), relay nodes, etc. Similarly, the base station 114b may be part of the RAN 103b/104b/105b, which may also include other base stations or network elements (not shown), such as a BSC, a RNC, relay nodes, etc. The base station 114a may be configured to transmit or receive wireless signals within a particular geographic region, which may be referred to as a cell (not shown). Similarly, the base station 114b may be configured to transmit or receive wired or wireless signals within a particular geographic region, which may be referred to as a cell (not shown) for methods, systems, and devices of NR sidelink discontinuous reception, as disclosed herein. Similarly, the base station 114b may be configured to transmit or receive wired or wireless signals within a particular geographic region, which may be referred to as a cell (not shown). The cell may further be divided into cell sectors. For example, the cell associated with the base station 114a may be divided into three sectors. Thus, in an example, the base station 114a may include three transceivers, e.g., one for each sector of the cell. In an example, the base station 114a may employ multiple-input multiple output (MIMO) technology and, therefore, may utilize multiple transceivers for each sector of the cell.

The base stations 114a may communicate with one or more of the WTRUs 102a, 102b, 102c, or 102g over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114*b* may communicate with one or more of the RRHs 118*a*, 118*b*, TRPs 119*a*, 119*b*, or RSUs 120*a*, 120*b*, over a wired or air interface 115*b*/116*b*/117*b*, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115*b*/116*b*/ 117*b* may be established using any suitable radio access technology (RAT).

The RRHs 118*a*, 118*b*, TRPs 119*a*, 119*b* or RSUs 120*a*, 120*b*, may communicate with one or more of the WTRUs 102*c*, 102*d*, 102*e*, 102*f* over an air interface 115*c*/116*c*/117*c*, which may be any suitable wireless communication link (e.g., radio frequency (RF), microwave, infrared (IR), ultraviolet (UV), visible light, cmWave, mmWave, etc.). The air interface 115*c*/116*c*/117*c* may be established using any suitable radio access technology (RAT).

The WTRUs 102*a*, 102*b*, 102*c*, 102*d*, 102*e*, or 102*f* may communicate with one another over an air interface 115*d*/ 116*d*/117*d*, such as Sidelink communication, which may be any suitable wireless communication link (e.g., radio frequency (RF), microwave, infrared (IR), ultraviolet (UV), visible light, cmWave, mmWave, etc.). The air interface 115*d*/116*d*/117*d* may be established using any suitable radio access technology (RAT).

The communications system 100 may be a multiple access system and may employ one or more channel access schemes, such as CDMA, TDMA, FDMA, OFDMA, SC-FDMA, and the like. For example, the base station 114*a* in the RAN 103/104/105 and the WTRUs 102*a*, 102*b*, 102*c*, or RRHs 118*a*, 118*b*, TRPs 119*a*, 119*b* and RSUs 120*a*, 120*b*, in the RAN 103*b*/104*b*/105*b* and the WTRUs 102*c*, 102*d*, 102*e*, 102*f*, may implement a radio technology such as Universal Mobile Telecommunications System (UMTS) Terrestrial Radio Access (UTRA), which may establish the air interface 115/116/117 or 115*c*/116*c*/117*c* respectively using wideband CDMA (WCDMA). WCDMA may include communication protocols such as High-Speed Packet Access (HSPA) or Evolved HSPA (HSPA+). HSPA may include High-Speed Downlink Packet Access (HSDPA) or High-Speed Uplink Packet Access (HSUPA).

In an example, the base station 114*a* and the WTRUs 102*a*, 102*b*, 102*c*, or RRHs 118*a*, 118*b*, TRPs 119*a*, 119*b*, or RSUs 120*a*, 120*b* in the RAN 103*b*/104*b*/105*b* and the WTRUs 102*c*, 102*d*, may implement a radio technology such as Evolved UMTS Terrestrial Radio Access (E-UTRA), which may establish the air interface 115/116/117 or 115*c*/ 116*c*/117*c* respectively using Long Term Evolution (LTE) or LTE-Advanced (LTE-A). In the future, the air interface 115/116/117 or 115*c*/116*c*/117*c* may implement 3GPP NR technology. The LTE and LTE-A technology may include LTE D2D and V2X technologies and interfaces (such as Sidelink communications, etc.). Similarly, the 3GPP NR technology includes NR V2X technologies and interface (such as Sidelink communications, etc.).

The base station 114*a* in the RAN 103/104/105 and the WTRUs 102*a*, 102*b*, 102*c*, and 102*g* or RRHs 118*a*, 118*b*, TRPs 119*a*, 119*b* or RSUs 120*a*, 120*b* in the RAN 103*b*/ 104*b*/105*b* and the WTRUs 102*c*, 102*d*, 102*e*, 102*f* may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95

(IS-95), Interim Standard 856 (IS-856), Global System for Mobile communications (GSM), Enhanced Data rates for GSM Evolution (EDGE), GSM EDGE (GERAN), and the like.

The base station 114*c* in FIG. 10A may be a wireless router, Home Node B, Home eNode B, or access point, for example, and may utilize any suitable RAT for facilitating wireless connectivity in a localized area, such as a place of business, a home, a vehicle, a train, an aerial, a satellite, a manufactory, a campus, and the like, for implementing the methods, systems, and devices of NR sidelink discontinuous reception, as disclosed herein. In an example, the base station 114*c* and the WTRUs 102, e.g., WTRU 102*e*, may implement a radio technology such as IEEE 802.11 to establish a wireless local area network (WLAN). similarly, the base station 114*c* and the WTRUs 102*d*, may implement a radio technology such as IEEE 802.15 to establish a wireless personal area network (WPAN). In yet another example, the base station 114*c* and the WTRUs 102, e.g., WTRU 102*e*, may utilize a cellular-based RAT (e.g., WCDMA, CDMA2000, GSM, LTE, LTE-A, NR, etc.) to establish a picocell or femtocell. As shown in FIG. 10A, the base station 114*c* may have a direct connection to the Internet 110. Thus, the base station 114*c* may not be required to access the Internet 110 via the core network 106/107/109.

The RAN 103/104/105 or RAN 103*b*/104*b*/105*b* may be in communication with the core network 106/107/109, which may be any type of network configured to provide voice, data, messaging, authorization and authentication, applications, or voice over internet protocol (VoIP) services to one or more of the WTRUs 102*a*, 102*b*, 102*c*, 102*d*. For example, the core network 106/107/109 may provide call control, billing services, mobile location-based services, pre-paid calling, Internet connectivity, packet data network connectivity, Ethernet connectivity, video distribution, etc., or perform high-level security functions, such as user authentication.

Although not shown in FIG. 10A, it will be appreciated that the RAN 103/104/105 or RAN 103*b*/104*b*/105*b* or the core network 106/107/109 may be in direct or indirect communication with other RANs that employ the same RAT as the RAN 103/104/105 or RAN 103*b*/104*b*/105*b* or a different RAT. For example, in addition to being connected to the RAN 103/104/105 or RAN 103*b*/104*b*/105*b*, which may be utilizing an E-UTRA radio technology, the core network 106/107/109 may also be in communication with another RAN (not shown) employing a GSM or NR radio technology.

The core network 106/107/109 may also serve as a gateway for the WTRUs 102*a*, 102*b*, 102*c*, 102*d*, 102*e* to access the PSTN 108, the Internet 110, or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned or operated by other service providers. For example, the networks 112 may include any type of packet data network (e.g., an IEEE 802.3 Ethernet network) or another core network connected to one or more RANs, which may employ the same RAT as the RAN 103/104/105 or RAN 103*b*/104*b*/105*b* or a different RAT.

Some or all of the WTRUs 102*a*, 102*b*, 102*c*, 102*d*, 102*e*, and 102*f* in the communications system 100 may include multi-mode capabilities, e.g., the WTRUs 102a, 102b, 102c, 102d, 102e, and 102f may include multiple transceivers for communicating with different wireless networks over different wireless links for implementing methods, systems, and devices of NR sidelink discontinuous reception, as disclosed herein. For example, the WTRU 102g shown in FIG. 10A may be configured to communicate with the base station 114a, which may employ a cellular-based radio technology, and with the base station 114c, which may employ an IEEE 802 radio technology.

Although not shown in FIG. 10A, it will be appreciated that a User Equipment may make a wired connection to a gateway. The gateway may be a Residential Gateway (RG). The RG may provide connectivity to a Core Network 106/107/109. It will be appreciated that much of the subject matter included herein may equally apply to UEs that are WTRUs and UEs that use a wired connection to connect with a network. For example, the subject matter that applies to the wireless interfaces 115, 116, 117 and 115c/116c/117c may equally apply to a wired connection.

FIG. 10B is a system diagram of an example RAN 103 and core network 106 that may implement methods, systems, and devices of NR sidelink discontinuous reception, as disclosed herein. As noted above, the RAN 103 may employ a UTRA radio technology to communicate with the WTRUs 102a, 102b, and 102c over the air interface 115. The RAN 103 may also be in communication with the core network 106. As shown in FIG. 10B, the RAN 103 may include Node-Bs 140a, 140b, and 140c, which may each include one or more transceivers for communicating with the WTRUs 102a, 102b, and 102c over the air interface 115. The Node-Bs 140a, 140b, and 140c may each be associated with a particular cell (not shown) within the RAN 103. The RAN 103 may also include RNCs 142a, 142b. It will be appreciated that the RAN 103 may include any number of Node-Bs and Radio Network Controllers (RNCs.)

As shown in FIG. 10B, the Node-Bs 140a, 140b may be in communication with the RNC 142a. Additionally, the Node-B 140c may be in communication with the RNC 142b. The Node-Bs 140a, 140b, and 140c may communicate with the respective RNCs 142a and 142b via an Iub interface. The RNCs 142a and 142b may be in communication with one another via an Iur interface. Each of the RNCs 142a and 142b may be configured to control the respective Node-Bs 140a, 140b, and 140c to which it is connected. In addition, each of the RNCs 142a and 142b may be configured to carry out or support other functionality, such as outer loop power control, load control, admission control, packet scheduling, handover control, macro-diversity, security functions, data encryption, and the like.

The core network 106 shown in FIG. 10B may include a media gateway (MGW) 144, a Mobile Switching Center (MSC) 146, a Serving GPRS Support Node (SGSN) 148, or a Gateway GPRS Support Node (GGSN) 150. While each of the foregoing elements are depicted as part of the core network 106, it will be appreciated that any one of these elements may be owned or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, and 102c with access to circuit-switched networks, such as the PSTN 108, to facilitate communications between the WTRUs 102a, 102b, and 102c, and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, and 102c with access to packet-switched networks, such as the Internet 110, to facilitate communications between and the WTRUs 102a, 102b, and 102c, and IP-enabled devices.

The core network 106 may also be connected to the other networks 112, which may include other wired or wireless networks that are owned or operated by other service providers.

FIG. 10C is a system diagram of an example RAN 104 and core network 107 that may implement methods, systems, and devices of NR sidelink discontinuous reception, as disclosed herein. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, and 160c, though it will be appreciated that the RAN 104 may include any number of eNode-Bs. The eNode-Bs 160a, 160b, and 160c may each include one or more transceivers for communicating with the WTRUs 102a, 102b, and 102c over the air interface 116. For example, the eNode-Bs 160a, 160b, and 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink or downlink, and the like. As shown in FIG. 10C, the eNode-Bs 160a, 160b, and 160c may communicate with one another over an X2 interface.

The core network 107 shown in FIG. 10C may include a Mobility Management Gateway (MME) 162, a serving gateway 164, and a Packet Data Network (PDN) gateway 166. While each of the foregoing elements are depicted as part of the core network 107, it will be appreciated that any one of these elements may be owned or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, and 102c, bearer activation/deactivation, selecting a particular serving gateway during an initial attach of the WTRUs 102a, 102b, and 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, and 102c. The serving gateway 164 may also perform other functions, such as anchoring user planes during inter-eNode B handovers, triggering paging when downlink data is available for the WTRUs 102a, 102b, and 102c, managing and storing contexts of the WTRUs 102a, 102b, and 102c, and the like.

The serving gateway 164 may also be connected to the PDN gateway 166, which may provide the WTRUs 102a, 102b, and 102c with access to packet-switched networks, such as the Internet 110, to facilitate communications between the WTRUs 102a, 102b, 102c, and IP-enabled devices.

The core network 107 may facilitate communications with other networks. For example, the core network 107 may provide the WTRUs 102a, 102b, and 102c with access to circuit-switched networks, such as the PSTN 108, to facilitate communications between the WTRUs 102a, 102b, and 102c and traditional land-line communications devices. For example, the core network 107 may include, or may communicate with, an IP gateway (e.g., an IP Multimedia Subsystem (IMS) server) that serves as an interface between the core network 107 and the PSTN 108. In addition, the core network 107 may provide the WTRUs 102a, 102b, and 102c with access to the networks 112, which may include other wired or wireless networks that are owned or operated by other service providers.

FIG. 10D is a system diagram of an example RAN 105 and core network 109 that may implement methods, systems, and devices of NR sidelink discontinuous reception, as disclosed herein. The RAN 105 may employ an NR radio technology to communicate with the WTRUs 102a and 102b over the air interface 117. The RAN 105 may also be in communication with the core network 109. A Non-3GPP Interworking Function (N3IWF) 199 may employ a non-3GPP radio technology to communicate with the WTRU 102c over the air interface 198. The N3IWF 199 may also be in communication with the core network 109.

The RAN 105 may include gNode-Bs 180a and 180b. It will be appreciated that the RAN 105 may include any number of gNode-Bs. The gNode-Bs 180a and 180b may each include one or more transceivers for communicating with the WTRUs 102a and 102b over the air interface 117. When integrated access and backhaul connection are used, the same air interface may be used between the WTRUs and gNode-Bs, which may be the core network 109 via one or multiple gNBs. The gNode-Bs 180a and 180b may implement MIMO, MU-MIMO, or digital beamforming technology. Thus, the gNode-B 180a, for example, may use multiple antennas to transmit wireless signals to, and receive wireless signals from, the WTRU 102a. It should be appreciated that the RAN 105 may employ of other types of base stations such as an eNode-B. It will also be appreciated the RAN 105 may employ more than one type of base station. For example, the RAN may employ eNode-Bs and gNode-Bs.

The N3IWF 199 may include a non-3GPP Access Point 180c. It will be appreciated that the N3IWF 199 may include any number of non-3GPP Access Points. The non-3GPP Access Point 180c may include one or more transceivers for communicating with the WTRUs 102c over the air interface 198. The non-3GPP Access Point 180c may use the 802.11 protocol to communicate with the WTRU 102c over the air interface 198.

Each of the gNode-Bs 180a and 180b may be associated with a particular cell (not shown) and may be configured to handle radio resource management decisions, handover decisions, scheduling of users in the uplink or downlink, and the like. As shown in FIG. 10D, the gNode-Bs 180a and 180b may communicate with one another over an Xn interface, for example.

The core network 109 shown in FIG. 10D may be a 5G core network (5GC). The core network 109 may offer numerous communication services to customers who are interconnected by the radio access network. The core network 109 comprises a number of entities that perform the functionality of the core network. As used herein, the term "core network entity" or "network function" refers to any entity that performs one or more functionalities of a core network. It is understood that such core network entities may be logical entities that are implemented in the form of computer-executable instructions (software) stored in a memory of, and executing on a processor of, an apparatus configured for wireless or network communications or a computer system, such as system 90 illustrated in FIG. 10G.

In the example of FIG. 10D, the 5G Core Network 109 may include an access and mobility management function (AMF) 172, a Session Management Function (SMF) 174, User Plane Functions (UPFs) 176a and 176b, a User Data Management Function (UDM) 197, an Authentication Server Function (AUSF) 190, a Network Exposure Function (NEF) 196, a Policy Control Function (PCF) 184, a Non-3GPP Interworking Function (N3IWF) 199, a User Data Repository (UDR) 178. While each of the foregoing elements are depicted as part of the 5G core network 109, it will be appreciated that any one of these elements may be owned or operated by an entity other than the core network operator. It will also be appreciated that a 5G core network may not consist of all of these elements, may consist of additional elements, and may consist of multiple instances of each of these elements. FIG. 10D shows that network functions directly connect with one another, however, it should be appreciated that they may communicate via routing agents such as a diameter routing agent or message buses.

In the example of FIG. 10D, connectivity between network functions is achieved via a set of interfaces, or reference points. It will be appreciated that network functions could be modeled, described, or implemented as a set of services that are invoked, or called, by other network functions or services. Invocation of a Network Function service may be achieved via a direct connection between network functions, an exchange of messaging on a message bus, calling a software function, etc.

The AMF 172 may be connected to the RAN 105 via an N2 interface and may serve as a control node. For example, the AMF 172 may be responsible for registration management, connection management, reachability management, access authentication, access authorization. The AMF may be responsible forwarding user plane tunnel configuration information to the RAN 105 via the N2 interface. The AMF 172 may receive the user plane tunnel configuration information from the SMF via an N11 interface. The AMF 172 may generally route and forward NAS packets to/from the WTRUs 102a, 102b, and 102c via an N1 interface. The N1 interface is not shown in FIG. 10D.

The SMF 174 may be connected to the AMF 172 via an N11 interface. Similarly the SMF may be connected to the PCF 184 via an N7 interface, and to the UPFs 176a and 176b via an N4 interface. The SMF 174 may serve as a control node. For example, the SMF 174 may be responsible for Session Management, IP address allocation for the WTRUs 102a, 102b, and 102c, management and configuration of traffic steering rules in the UPF 176a and UPF 176b, and generation of downlink data notifications to the AMF 172.

The UPF 176a and UPF 176b may provide the WTRUs 102a, 102b, and 102c with access to a Packet Data Network (PDN), such as the Internet 110, to facilitate communications between the WTRUs 102a, 102b, and 102c and other devices. The UPF 176a and UPF 176b may also provide the WTRUs 102a, 102b, and 102c with access to other types of packet data networks. For example, Other Networks 112 may be Ethernet Networks or any type of network that exchanges packets of data. The UPF 176a and UPF 176b may receive traffic steering rules from the SMF 174 via the N4 interface. The UPF 176a and UPF 176b may provide access to a packet data network by connecting a packet data network with an N6 interface or by connecting to each other and to other UPFs via an N9 interface. In addition to providing access to packet data networks, the UPF 176 may be responsible packet routing and forwarding, policy rule enforcement, quality of service handling for user plane traffic, downlink packet buffering.

The AMF 172 may also be connected to the N3IWF 199, for example, via an N2 interface. The N3IWF facilitates a connection between the WTRU 102c and the 5G core network 170, for example, via radio interface technologies that are not defined by 3GPP. The AMF may interact with the N3IWF 199 in the same, or similar, manner that it interacts with the RAN 105.

The PCF 184 may be connected to the SMF 174 via an N7 interface, connected to the AMF 172 via an N15 interface, and to an Application Function (AF) 188 via an N5 interface. The N15 and N5 interfaces are not shown in FIG. 10D. The PCF 184 may provide policy rules to control plane nodes such as the AMF 172 and SMF 174, allowing the control plane nodes to enforce these rules. The PCF 184, may send policies to the AMF 172 for the WTRUs 102a, 102b, and 102c so that the AMF may deliver the policies to the WTRUs 102a, 102b, and 102c via an N1 interface. Policies may then be enforced, or applied, at the WTRUs 102a, 102b, and 102c.

The UDR 178 may act as a repository for authentication credentials and subscription information. The UDR may connect with network functions, so that network function can add to, read from, and modify the data that is in the repository. For example, the UDR 178 may connect with the PCF 184 via an N36 interface. Similarly, the UDR 178 may connect with the NEF 196 via an N37 interface, and the UDR 178 may connect with the UDM 197 via an N35 interface.

The UDM 197 may serve as an interface between the UDR 178 and other network functions. The UDM 197 may authorize network functions to access of the UDR 178. For example, the UDM 197 may connect with the AMF 172 via an N8 interface, the UDM 197 may connect with the SMF 174 via an N10 interface. Similarly, the UDM 197 may connect with the AUSF 190 via an N13 interface. The UDR 178 and UDM 197 may be tightly integrated.

The AUSF 190 performs authentication related operations and connect with the UDM 178 via an N13 interface and to the AMF 172 via an N12 interface.

The NEF 196 exposes capabilities and services in the 5G core network 109 to Application Functions (AF) 188. Exposure may occur on the N33 API interface. The NEF may connect with an AF 188 via an N33 interface and it may connect with other network functions in order to expose the capabilities and services of the 5G core network 109.

Application Functions 188 may interact with network functions in the 5G Core Network 109. Interaction between the Application Functions 188 and network functions may be via a direct interface or may occur via the NEF 196. The Application Functions 188 may be considered part of the 5G Core Network 109 or may be external to the 5G Core Network 109 and deployed by enterprises that have a business relationship with the mobile network operator.

Network Slicing is a mechanism that could be used by mobile network operators to support one or more 'virtual' core networks behind the operator's air interface. This involves 'slicing' the core network into one or more virtual networks to support different RANs or different service types running across a single RAN. Network slicing enables the operator to create networks customized to provide optimized solutions for different market scenarios which demands diverse requirements, e.g. in the areas of functionality, performance and isolation.

3GPP has designed the 5G core network to support Network Slicing. Network Slicing is a good tool that network operators can use to support the diverse set of 5G use cases (e.g., massive IoT, critical communications, V2X, and enhanced mobile broadband) which demand very diverse and sometimes extreme requirements. Without the use of network slicing techniques, it is likely that the network architecture would not be flexible and scalable enough to efficiently support a wider range of use cases need when each use case has its own specific set of performance, scalability, and availability requirements. Furthermore, introduction of new network services should be made more efficient.

Referring again to FIG. 10D, in a network slicing scenario, a WTRU 102a, 102b, or 102c may connect with an AMF 172, via an N1 interface. The AMF may be logically part of one or more slices. The AMF may coordinate the connection or communication of WTRU 102a, 102b, or 102c with one or more UPF 176a and 176b, SMF 174, and other network functions. Each of the UPFs 176a and 176b, SMF 174, and other network functions may be part of the same slice or different slices. When they are part of different slices, they may be isolated from each other in the sense that they may utilize different computing resources, security credentials, etc.

The core network 109 may facilitate communications with other networks. For example, the core network 109 may include, or may communicate with, an IP gateway, such as an IP Multimedia Subsystem (IMS) server, that serves as an interface between the 5G core network 109 and a PSTN 108. For example, the core network 109 may include, or communicate with a short message service (SMS) service center that facilities communication via the short message service. For example, the 5G core network 109 may facilitate the exchange of non-IP data packets between the WTRUs 102a, 102b, and 102c and servers or applications functions 188. In addition, the core network 170 may provide the WTRUs 102a, 102b, and 102c with access to the networks 112, which may include other wired or wireless networks that are owned or operated by other service providers.

The core network entities described herein and illustrated in FIG. 10A, FIG. 10C, FIG. 10D, or FIG. 10E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIG. 10A, FIG. 10B, FIG. 10C, FIG. 10D, or FIG. 10E are provided by way of example only, and it is understood that the subject matter disclosed and claimed herein may be embodied or implemented in any similar communication system, whether presently defined or defined in the future.

FIG. 10E illustrates an example communications system 111 in which the systems, methods, apparatuses that implement NR sidelink discontinuous reception, described herein, may be used. Communications system 111 may include Wireless Transmit/Receive Units (WTRUs) 102A, 102B, 102C, 102D, 102E, 102F, a base station gNB 121, a V2X server 124, and Road Side Units (RSUs) 123a and 123b. In practice, the concepts presented herein may be applied to any number of WTRUs, base station gNBs, V2X networks, or other network elements. One or several or all WTRUs 102A, 102B, 102C, 102D, 102E, and 102F may be out of range of the access network coverage 131. WTRUs 102A, 102B, and 102C form a V2X group, among which WTRU 102A is the group lead and WTRUs 102B and 102C are group members.

WTRUs 102A, 102B, 102C, 102D, 102E, and 102F may communicate with each other over a Uu interface 129 via the gNB 121 if they are within the access network coverage 131. In the example of FIG. 10E, WTRUs 102B and 102F are shown within access network coverage 131. WTRUs 102A, 102B, 102C, 102D, 102E, and 102F may communicate with each other directly via a Sidelink interface (e.g., PC5 or NR PC5) such as interface 125a, 125b, or 128, whether they are under the access network coverage 131 or out of the access network coverage 131. For instance, in the example of FIG. 10E, WRTU 102D, which is outside of the access network coverage 131, communicates with WTRU 102F, which is inside the coverage 131.

WTRUs 102A, 102B, 102C, 102D, 102E, and 102F may communicate with RSU 123a or 123b via a Vehicle-to-Network (V2N) 133 or Sidelink interface 125b. WTRUs 102A, 102B, 102C, 102D, 102E, and 102F may communicate to a V2X Server 124 via a Vehicle-to-Infrastructure (V2I) interface 127. WTRUs 102A, 102B, 102C, 102D, 102E, and 102F may communicate to another UE via a Vehicle-to-Person (V2P) interface 128.

FIG. 10F is a block diagram of an example apparatus or device WTRU 102 that may be configured for wireless communications and operations in accordance with the systems, methods, and apparatuses that implement NR sidelink discontinuous reception, described herein, such as a WTRU 102 of FIG. 10A, FIG. 10B, FIG. 10C, FIG. 10D, or FIG. 10E, or FIG. 1-FIG. 8. As shown in FIG. 10F, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements. Also, the base stations 114a and 114b, or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, a next generation node-B (gNode-B), and proxy nodes, among others, may include some or all of the elements depicted in FIG. 10F and may be an exemplary implementation that performs the disclosed systems and methods for NR sidelink discontinuous reception described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, or any other functionality that enables the WTRU 102 to operate in a wireless environment. The processor 118 may be coupled to the transceiver 120, which may be coupled to the transmit/receive element 122. While FIG. 10F depicts the processor 118 and the transceiver 120 as separate components, it will be appreciated that the processor 118 and the transceiver 120 may be integrated together in an electronic package or chip.

The transmit/receive element 122 of a UE may be configured to transmit signals to, or receive signals from, a base station (e.g., the base station 114a of FIG. 10A) over the air interface 115/116/117 or another UE over the air interface 115d/116d/117d. For example, the transmit/receive element 122 may be an antenna configured to transmit or receive RF signals. The transmit/receive element 122 may be an emitter/detector configured to transmit or receive IR, UV, or visible light signals, for example. The transmit/receive element 122 may be configured to transmit and receive both RF and light signals. It will be appreciated that the transmit/receive element 122 may be configured to transmit or receive any combination of wireless or wired signals.

In addition, although the transmit/receive element 122 is depicted in FIG. 10F as a single element, the WTRU 102 may include any number of transmit/receive elements 122. More specifically, the WTRU 102 may employ MIMO technology. Thus, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, for example NR and IEEE 802.11 or NR and E-UTRA, or to communicate with the same RAT via multiple beams to different RRHs, TRPs, RSUs, or nodes.

The processor 118 of the WTRU 102 may be coupled to, and may receive user input data from, the speaker/microphone 124, the keypad 126, or the display/touchpad/indicators 128 (e.g., a liquid crystal display (LCD) display unit or organic light-emitting diode (OLED) display unit. The processor 118 may also output user data to the speaker/microphone 124, the keypad 126, or the display/touchpad/indicators 128. In addition, the processor 118 may access information from, and store data in, any type of suitable memory, such as the non-removable memory 130 or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. The processor 118 may access information from, and store data in, memory that is not physically located on the WTRU 102, such as on a server that is hosted in the cloud or in an edge computing platform or in a home computer (not shown). The processor 118 may be configured to control lighting patterns, images, or colors on the display or indicators 128 in response to whether the setup of the NR sidelink discontinuous reception in some of the examples described herein are successful or unsuccessful, or otherwise indicate a status of NR sidelink discontinuous reception and associated components. The control lighting patterns, images, or colors on the display or indicators 128 may be reflective of the status of any of the method flows or components in the FIG.'s illustrated or discussed herein (e.g., FIG. 1-FIG. 8, etc.). Disclosed herein are messages and procedures of NR sidelink discontinuous reception. The messages and procedures may be extended to provide interface/API for users to request resources via an input source (e.g., speaker/microphone 124, keypad 126, or display/touchpad/indicators 128) and request, configure, or query NR sidelink discontinuous reception related information, among other things that may be displayed on display 128.

The processor 118 may receive power from the power source 134 and may be configured to distribute or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114*a*, 114*b*) or determine its location based on the timing of the signals being received from two or more nearby base stations. It will be appreciated that the WTRU 102 may acquire location information by way of any suitable location-determination method.

The processor 118 may further be coupled to other peripherals 138, which may include one or more software or hardware modules that provide additional features, functionality, or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be included in other apparatuses or devices, such as a sensor, consumer electronics, a wearable device such as a smart watch or smart clothing, a medical or eHealth device, a robot, industrial equipment, a drone, a vehicle such as a car, truck, train, or an airplane. The WTRU 102 may connect with other components, modules, or systems of such apparatuses or devices via one or more interconnect interfaces, such as an interconnect interface that may comprise one of the peripherals 138.

FIG. 10G is a block diagram of an exemplary computing system 90 in which one or more apparatuses of the communications networks illustrated in FIG. 10A, FIG. 10C, FIG. 10D and FIG. 10E as well as NR sidelink discontinuous reception, such as the systems and methods illustrated in FIG. 1 through FIG. 8 described and claimed herein may be embodied, such as certain nodes or functional entities in the RAN 103/104/105, Core Network 106/107/109, PSTN 108, Internet 110, Other Networks 112, or Network Services 113. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, or any other functionality that enables the computing system 90 to operate in a communications network. Coprocessor 81 is a processor, distinct from main processor 91, that may perform additional functions or assist processor 91. Processor 91 or coprocessor 81 may receive, generate, and process data related to the methods and apparatuses disclosed herein for NR sidelink discontinuous reception.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally include stored data that cannot easily be modified. Data stored in RAM 82 may be read or changed by processor 91 or other hardware devices. Access to RAM 82 or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may include peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may include communication circuitry, such as for example a wireless or wired network adapter 97, that may be used to connect computing system 90 to an external communications network or devices, such as the RAN 103/104/105, Core Network 106/107/109, PSTN 108, Internet 110, WTRUs 102, or Other Networks 112 of FIG. 10A, FIG. 10B, FIG. 10C, FIG. 10D, or FIG. 10E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform or implement the systems, methods and processes described herein. Specifically, any of the steps, operations, or functions described herein may be implemented in the form of such computer executable instructions, executing on the processor of an apparatus or computing system configured for wireless or wired network communications. Computer readable storage media includes volatile and nonvolatile, removable and non-removable media implemented in any non-transitory (e.g., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

In describing preferred methods, systems, or apparatuses of the subject matter of the present disclosure—NR sidelink discontinuous reception—as illustrated in the Figures, specific terminology is employed for the sake of clarity. The claimed subject matter, however, is not intended to be limited to the specific terminology so selected.

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effectuate the methods described herein. As used herein, the terms "apparatus," "network apparatus," "node," "device," "network node," or the like may be used interchangeably. In addition, the use of the word "or" is generally used inclusively unless otherwise provided herein.

This written description uses examples for the disclosed subject matter, including the best mode, and also to enable any person skilled in the art to practice the disclosed subject matter, including making and using any devices or systems and performing any incorporated methods. The disclosed subject matter may include other examples that occur to those skilled in the art (e.g., skipping steps, combining steps, or adding steps between exemplary methods disclosed herein).

Methods, systems, and apparatuses, among other things, as described herein may provide for NR sidelink discontinuous reception. The disclosed subject matter may allow for the ability for a WTRU (e.g., a UE) to have separate sidelink configuration parameters in which the WTRU may access to determine when to be active and when to be asleep depending on which communication the WTRU is engaging in. A method, system, computer readable storage medium, or apparatus may provide for receiving from a second apparatus, configuration parameters for the control of the discontinuous reception (DRX) procedure, the configuration parameters comprise drx-onDurationTimerSL (e.g., duration at the beginning of a SL DRX cycle), drx-SlotOffsetSL (e.g., the delay before starting the drx-onDurationTimerSL), drx-InactivityTimerSL (e.g., the duration after the PSCCH occasion carrying the first-stage), drx-RetransmissionTimerSL (per SL HARQ process) (e.g., the maximum duration until a SL retransmission is received), drx-LongCycleStartOffsetSL (e.g., SL Long DRX cycle and drx-StartOffsetSL which defines the subframe where the SL Long and Short DRX cycle starts), drx-ShortCycleSL (e.g., the SL Short DRX cycle), drx-ShortCycleTimerSL (e.g., the duration the UE shall follow the SL Short DRX cycle), drx-CycleSL (e.g., the SL DRX cycle), drx-HARQ-RTT-TimerSL (e.g., the SL DRX cycle start offset), ps-WakeupSL (e.g., the configuration to start associated SL-drx-onDurationTimer in case SCP is monitored but not detected), ps-TransmitOtherPeriodicCSI-SL, drx-StartOffsetSL, or ps-TransmitPeriodicL1-RSRP-SL; and performing the DRX procedure using the configuration parameters. The method, system, computer readable storage medium, or apparatus provides for receiving a configuration comprising a common sidelink (SL) DRX parameter set or a dedicated SL DRX configuration parameter set. The method, system, computer readable storage medium, or apparatus provides for receiving a configuration comprising a sidelink (SL) DRX group, wherein the SL DRX group is a group of sidelink communications or a group of sidelink communication resources with a same SL DRX Active time. The method, system, computer readable storage medium, or apparatus provides for receiving a configuration comprising a sidelink (SL) DRX group, wherein the SL DRX group is a group of sidelink communications or a group of sidelink communication resources with the same SL DRX Active time, wherein the group of sidelink communications comprises a unicast communication, a multicast communication, or broadcast communication. The method, system, computer readable storage medium, or apparatus provides for receiving a configuration comprising a sidelink (SL) DRX group, wherein the SL DRX group is a group of sidelink communications or a group of sidelink communication resources with the same SL DRX Active time, wherein the group of sidelink communication resources comprise a group of component carriers, a group of carrier frequencies, or a group of services. The method, system, computer readable storage medium, or apparatus provides for receiving a configuration comprising a sidelink (SL) DRX group, wherein the SL DRX group is a group of sidelink communications or a group of sidelink communication resources with the same SL DRX Active time, wherein the group of sidelink communication resources comprise a group of resource pools or a group of bandwidth parts. All combinations in this paragraph and the below paragraph (including the removal or addition of steps) are contemplated in a manner that is consistent with the other portions of the detailed description.

The configuration parameters for the control of the DRX procedure may be preconfigured in the apparatus. The method, system, computer readable storage medium, or apparatus provides for when drx-onDurationTimerSL or drx-InactivityTimerSL configured for a sidelink (SL) DRX group is running, receiving an indication of time in an active time for a SL communication or SL communication resources in the SL DRX group. The method, system, computer readable storage medium, or apparatus provides for when drx-RetransmissionTimerSL is running for a sidelink (SL) communication or a sidelink (SL) communication resource in a SL DRX group, receiving an indication of time in an active time for the SL communication or SL communication resources in the SL DRX group. The method, system, computer readable storage medium, or apparatus provides for when a sidelink (SL) Scheduling Request is sent on a SL Physical Uplink Control Channel (PUCCH) and is pending, receiving an indication of time in an active time for a SL communication or SL communication resources in a SL DRX group. The apparatus may be a base station, a relay, user equipment, a roadside unit, or a core network node. The alternative of the scenarios disclosed herein are considered. For example, at the expiration of the SL on-duration timer, or the SL DRX inactivity timer, or the SL retransmission timer, the first apparatus may not clear the one or more of the following information: sensing information, reserved resources, candidate resources, SL RSRP measurement, CBR measurement, CR measurement, resource exclusion decision, resource preemption information, resource selection re-evaluation decision, transmit resources, or candidate resources. The second apparatus may send (e.g., transmit) configuration information as disclosed herein. All combinations in this paragraph and the previous paragraphs (including the removal or addition of steps) are contemplated in a manner that is consistent with the other portions of the detailed description.

Methods, systems, and apparatuses, among other things, as described herein may provide for receiving, from a second apparatus (e.g., a base station or UE) via a sidelink transmission, first configuration parameters for a first sidelink DRX group and second configuration parameters for a second sidelink DRX group, wherein the first configuration parameters for the first sidelink DRX group comprise 1) a common SL DRX parameter set that is shared with the second configuration parameters for the second sidelink DRX group and a first dedicated SL DRX configuration parameter set. The first dedicated DRX parameter set may include a first on duration (e.g., drx-onDurationTimerSL) at the beginning of a sidelink (SL) discontinuous reception (DRX) cycle of the first apparatus and a first duration (e.g., drx-InactivityTimerSL). The first duration (e.g., an inactivity timer) may be after an occasion of a Physical Sidelink Control Channel (PSCCH) carrying a first-stage SL control information (SCI) indicates a new sidelink transmission for the MAC entity of the first apparatus, or after an occasion of a Physical Sidelink Shared Channel (PSSCH) carrying a second-stage SCI indicates a new sidelink transmission for the MAC entity of the first apparatus. Methods, systems, and apparatuses, among other things, as described herein may provide for determining that the first apparatus is in a first sidelink active time for receiving information on the sidelink based on the first configuration parameters for the first sidelink DRX group, and in a second sidelink active time for receiving information on the sidelink based on the second configuration parameter for the second sidelink DRX group. Methods, systems, and apparatuses, among other things, as described herein may provide for the first apparatus receiving (e.g., remaining awake/active) based on the determined first sidelink active time. All combinations in this paragraph and the previous paragraphs (including the removal or addition of steps) are contemplated in a manner that is consistent with the other portions of the detailed description.

Methods, systems, and apparatuses, among other things, as described herein may provide for the second configuration parameters for the second sidelink DRX group comprise a second dedicated SL DRX configuration parameter set, wherein the second dedicated SL DRX configuration parameter set comprises a second drx-onDurationTimerSL or a second drx-InactivityTimerSL. The first sidelink DRX group may include a first group of sidelink communication resources, and the second sidelink DRX group may include a second group of sidelink communication resources, wherein the first group of sidelink communication resources may include a first set of time resources and carrier frequency resources, or wherein the second group of sidelink communication resources may include a second set of time resources and carrier frequency resources. The first sidelink DRX group may be a first pair of a first sidelink source layer-2 (L2) identifier (ID) and a first sidelink destination L2 ID, and the second sidelink DRX group may be a second pair of a second source L2 ID and a second sidelink destination L2 ID. The first sidelink DRX configuration group may be a first sidelink QoS configuration parameters set, and the second sidelink DRX group may be a second QoS configuration parameters set. The carrier frequency resources of the first set of time and carrier frequency resources or the second set of time and carrier frequency resources comprise a component carrier or bandwidth part. the first configuration parameters for the control of the DRX procedure may be are preconfigured in the first apparatus. Methods, systems, and apparatuses, among other things, as described herein may provide for if the first-stage SCI or the second-stage SCI indicates a new SL transmission, starting or restarting the first duration. Methods, systems, and apparatuses, among other things, as described herein may provide for stopping drx-onDurationTimerSL or drx-InactivityTimerSL. The first configuration parameters of the first DRX group may include one or more of the parameters of Table 2. All combinations in this paragraph and the previous paragraphs (including the removal or addition of steps) are contemplated in a manner that is consistent with the other portions of the detailed description. In addition, the use of the word "or" is generally used inclusively unless otherwise provided herein.

What is claimed is:

1. A first apparatus that performs wireless communication comprising:

a processor; and memory coupled with the processor, the memory comprising executable instructions stored thereon that when executed by the processor cause the processor to effectuate operations comprising:

receiving, from a second apparatus via a sidelink (SL) transmission, a first dedicated configuration parameter set for a first SL sidelink discontinuous reception (DRX) group, second dedicated configuration parameter set for a second SL DRX group, and a common SL DRX configuration parameter set, wherein:

the first dedicated configuration parameter set comprises:

a first on duration at the beginning of a SL DRX cycle of the first apparatus, and a first duration:

after an occasion of a physical sidelink control channel (PSCCH) carrying a first-stage SL control information (SCI) indicates a new SL transmission for a media access control (MAC) entity of the first apparatus in the first SL DRX group, and after an occasion of a physical sidelink shared channel (PSSCH) carrying a second-stage SCI indicates a new SL transmission for the MAC entity of the first apparatus in the first SL DRX group; and the second dedicated configuration parameter set comprises:

a second on duration at the beginning of the SL DRX cycle of the first apparatus, and a second duration:

after an occasion of a PSCCH carrying a first-stage SL control information (SCI) indicates a new SL transmission for a MAC entity of the first apparatus in the second SL DRX group, and after an occasion of a PSSCH carrying a second-stage SCI indicates a new SL transmission for the MAC entity of the first apparatus in the second SL DRX group; and the common SL DRX configuration parameter set comprises:

the SL DRX cycle of the first apparatus, or a third duration until a SL retransmission is received;

determining a first active time based on the common SL DRX configuration parameter set or the first dedicated configuration parameter set;

determining a second active time based on the common SL DRX configuration parameter set or the second dedicated configuration parameter set; and determining a first device active time, wherein the first device active time comprises the first active time or the second active time.

2. The first apparatus of claim 1, the operations further comprising receiving a first SL DRX command MAC control element (CE) for the first SL DRX group or a second SL DRX command MAC CE for the second SL DRX group, and executing a stop of the first on duration and the first duration based on receiving the first SL MAC CE, or executing a stop of the first on duration and the first duration based on receiving the second SL MAC CE.

3. The first apparatus of claim 1, wherein the first SL DRX group comprises a first group of SL communication resources, and the second SL DRX group comprises a second group of SL communication resources, wherein the first group of SL communication resources comprises a first set of time resources and carrier frequency resources, or wherein the second group of SL communication resources comprises a second set of time resources and carrier frequency resources.

4. The first apparatus of claim 1, wherein the first SL DRX group is a first pair of a first SL source layer-2 (L2) identifier (ID) and a first SL destination L2 ID, and the second SL DRX group is a second pair of a second source L2 ID and a second SL destination L2 ID.

5. The first apparatus of claim 1, wherein the first SL DRX group is a first SL quality of service (QOS) configuration parameters set, and the second SL DRX group is a second QoS configuration parameters set.

6. The first apparatus of claim 3, wherein the carrier frequency resources of the first set of time and carrier frequency resources or the second set of time and carrier frequency resources comprise a component carrier or bandwidth part.

7. The first apparatus of claim 1, wherein the first dedicated configuration parameter for the control of a DRX procedure are preconfigured in the first apparatus.

8. The first apparatus of claim 1, the operations further comprising monitoring, during the first device active time, the first-stage SCI and the second-stage SCI in SL DRX.

9. The first apparatus of claim 8, wherein the first dedicated configuration parameter of the first DRX group comprises a minimum duration before a SL assignment for SL hybrid automatic repeat request (HARQ) retransmission is expected by the MAC entity, and if the first-stage SCI or the second-stage SCI indicate a SL transmission, the first apparatus starts the minimum duration before a SL assignment for SL HARQ retransmission is expected by the MAC entity.

10. The first apparatus of claim 8, the operations further comprising if the first-stage SCI and the second-stage SCI indicates a new SL transmission, starting or restarting the first duration for the first SL DRX group in a first symbol after an end of reception of the first-stage SCI and the second-stage SCI.

11. The first apparatus of claim 1, the operations further comprising if a DRX hybrid automatic repeat request-round-trip time-TimerSL (drx-HARQ-RTT-TimerSL) expires, the first apparatus starts a drx-RetransmissionTimerSL for the corresponding SL HARQ process.

12. The first apparatus of claim 1, wherein the first apparatus comprises a user equipment or a roadside unit.

13. The first apparatus of claim 1, wherein the second apparatus comprises a base station, a relay, user equipment, a roadside unit, or a core network node.

14. A method comprising:

receiving, by a first apparatus from a second apparatus via a sidelink (SL) transmission, a first dedicated configuration parameter set for a first SL sidelink discontinuous reception (DRX) group, second dedicated configuration parameter set for a second SL DRX group, and a common SL DRX configuration parameter set, wherein:

the first dedicated configuration parameter set comprises:

a first on duration at the beginning of a SL DRX cycle of the first apparatus, and a first duration:

after an occasion of a physical sidelink control channel (PSCCH) carrying a first-stage SL control information (SCI) indicates a new SL transmission for a media access control (MAC) entity of the first apparatus in the first SL DRX group, and after an occasion of a physical sidelink shared channel (PSSCH) carrying a second-stage SCI indicates a new SL transmission for the MAC entity of the first apparatus in the first SL DRX group; and the second dedicated configuration parameter set comprises:

a second on duration at the beginning of the SL DRX cycle of the first apparatus, and a second duration:

after an occasion of a PSCCH carrying a first-stage SL control information (SCI) indicates a new SL transmission for a MAC entity of the first apparatus in the second SL DRX group, and after an occasion of a PSSCH carrying a second-stage SCI indicates a new SL transmission for the MAC entity of the first apparatus in the second SL DRX group; and the common SL DRX configuration parameter set comprises:

the SL DRX cycle of the first apparatus, or a third duration until a SL retransmission is received;

determining a first active time based on the common SL DRX configuration parameter set or the first dedicated configuration parameter set;

determining a second active time based on the common SL DRX configuration parameter set or the second dedicated configuration parameter set; and determining a first device active time, wherein the first device active time comprises the first active time or the second active time.

15. The method of claim 14, the operations further comprising receiving a first SL DRX command MAC control element (CE) for the first SL DRX group or a second SL DRX command MAC CE for the second SL DRX group, and executing a stop of the first on duration and the first duration based on receiving the first SL MAC CE, or executing a stop of the first on duration and the first duration based on receiving the second SL MAC CE.

16. The method of claim 14, wherein the first SL DRX group is a first pair of a first SL source layer-2 (L2) identifier (ID) and a first SL destination L2 ID, and the second-SL DRX group is a second pair of a second source L2 ID and a second SL destination L2 ID.

17. The method of claim 14, wherein the first SL DRX group is a first SL quality of service (QOS) configuration parameters set, and the second SL DRX group is a second QoS configuration parameters set.

18. The method of claim 14, wherein the first SL DRX group comprises a first group of SL communication resources, and the second SL DRX group comprises a second group of SL communication resources, wherein the first group of SL communication resources comprises a first set of time resources and carrier frequency resources, or wherein the second group of SL communication resources comprises a second set of time resources and carrier frequency resources.

19. The method of claim 14, wherein the first dedicated configuration parameters for the control of a DRX procedure are preconfigured in the first apparatus.

20. A non-transitory computer readable storage medium storing computer executable instructions that when executed by a computing device cause the computing device to effectuate operations comprising:

receiving, by a first apparatus from a second apparatus via a sidelink (SL) transmission, a first dedicated configuration parameter set for a first SL sidelink discontinuous reception (DRX) group, second dedicated configuration parameter set for a second SL DRX group, and a common SL DRX configuration parameter set, wherein:

the first dedicated configuration parameter set comprises:

a first on duration at the beginning of a SL DRX cycle of the first apparatus, and a first duration:

after an occasion of a physical sidelink control channel (PSCCH) carrying a first-stage SL control information (SCI) indicates a new SL transmission for a media access control (MAC) entity of the first apparatus in the first SL DRX group, and after an occasion of a physical sidelink shared channel (PSSCH) carrying a second-stage SCI indicates a new SL transmission for the MAC entity of the first apparatus in the first SL DRX group; and the second dedicated configuration parameter set comprises:

a second on duration at the beginning of the SL DRX cycle of the first apparatus, and a second duration:

after an occasion of a PSCCH carrying a first-stage SL control information (SCI) indicates a new SL transmission for a MAC entity of the first apparatus in the second SL DRX group, and after an occasion of a PSSCH carrying a second-stage SCI indicates a new SL transmission for the MAC entity of the first apparatus in the second SL DRX group; and the common SL DRX configuration parameter set comprises:

the SL DRX cycle of the first apparatus, or a third duration until a SL retransmission is received;

determining a first active time based on the common SL DRX configuration parameter set or the first dedicated configuration parameter set;

determining a second active time based on the common SL DRX configuration parameter set or the second dedicated configuration parameter set;

determining a first device active time, wherein the first device active time comprises the first active time or the second active time; and receiving information on the first apparatus based on the first apparatus being in the first device active time.

* * * * *